US009753868B2

(12) United States Patent
Yamada et al.

(10) Patent No.: US 9,753,868 B2
(45) Date of Patent: *Sep. 5, 2017

(54) MEMORY MANAGEMENT DEVICE AND NON-TRANSITORY COMPUTER READABLE STORAGE MEDIUM

(71) Applicant: KABUSHIKI KAISHA TOSHIBA, Minato-ku (JP)

(72) Inventors: Naoko Yamada, Yokohama (JP); Mikio Hashimoto, Tokyo (JP); Ryotaro Hayashi, Hiratsuka (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 121 days.

This patent is subject to a terminal disclaimer.

(21) Appl. No.: 14/744,616

(22) Filed: Jun. 19, 2015

(65) Prior Publication Data

US 2015/0370728 A1 Dec. 24, 2015

(30) Foreign Application Priority Data

Jun. 20, 2014 (JP) ................................. 2014-127563

(51) Int. Cl.
*G06F 12/00* (2006.01)
*G06F 12/02* (2006.01)
(Continued)

(52) U.S. Cl.
CPC ...... *G06F 12/1416* (2013.01); *G06F 12/1009* (2013.01); *G06F 21/64* (2013.01); *G06F 21/79* (2013.01); *G06F 2212/1052* (2013.01)

(58) Field of Classification Search
CPC .......... G06F 12/00; G06F 12/08; G06F 12/10; G06F 12/14; G06F 12/1416; G06F 21/64
(Continued)

(56) References Cited

U.S. PATENT DOCUMENTS 4,309,569 A 1/1982 Merkle
7,031,956 B1 * 4/2006 Lee .................. G06F 17/30595
(Continued)

FOREIGN PATENT DOCUMENTS

JP 2004-511956 A 4/2004
JP 2006-202270 A 8/2006
(Continued)

OTHER PUBLICATIONS

Ravi Bhargava, et al., "Accelerating Two-Dimensional Page Walks for Virtualized Systems" ASPLOS Architectural Support for Programming Languages and Operating Systems, Mar. 2008, pp. 26-35.

(Continued)

*Primary Examiner* — Tuan Thai
(74) *Attorney, Agent, or Firm* — Oblon, McClelland, Maier & Neustadt, L.L.P.

(57) ABSTRACT

In one embodiment, a device executes reading and writing for a storage unit storing a table tree and verifier tree. The table tree includes a parent table and child table. The verifier tree includes a parent verifier associated with the parent table, and a child verifier associated with the child table. The parent verifier is used for verifying the child table and the child verifier. The device stores a secure table tree being a part of the table tree and used for address translation, and a secure verifier tree being a part of the verifier tree, to a secure storage unit. The device, when data has a read-only attribute, calculates verification information based on the data and a secure value varying according as the data is updated, and executes verification based on a verifier corresponded to the data and the verification information.

7 Claims, 25 Drawing Sheets

(51) Int. Cl.
*G06F 12/14* (2006.01)
*G06F 21/64* (2013.01)
*G06F 21/79* (2013.01)
*G06F 12/1009* (2016.01)

(58) Field of Classification Search
USPC .................................. 711/100, 154, 162, 163
See application file for complete search history.

(56) References Cited

U.S. PATENT DOCUMENTS

| | | | |
|---|---|---|---|
| 2003/0055835 A1* | 3/2003 | Roth | G06F 19/28 |
| 2003/0223338 A1* | 12/2003 | Sasaki | G11B 7/00736 |
| | | | 369/53.21 |
| 2004/0039949 A1 | 2/2004 | Vollmer et al. | |
| 2004/0160875 A1* | 8/2004 | Sasaki | G11B 7/00456 |
| | | | 369/53.15 |
| 2005/0033973 A1 | 2/2005 | Kamada et al. | |
| 2008/0235064 A1* | 9/2008 | Gulko | G06Q 10/087 |
| | | | 705/4 |
| 2010/0153732 A1 | 6/2010 | Su | |
| 2012/0079283 A1 | 3/2012 | Hashimoto et al. | |
| 2013/0073851 A1 | 3/2013 | Hashimoto et al. | |
| 2013/0212575 A1 | 8/2013 | Ito et al. | |
| 2015/0370727 A1 | 12/2015 | Hashimoto et al. | |

FOREIGN PATENT DOCUMENTS

| | | |
|---|---|---|
| JP | 2008-43009 A | 2/2008 |
| JP | 4074620 B2 | 4/2008 |
| JP | 2009-199530 A | 9/2009 |
| JP | 2012-68959 A | 4/2012 |
| JP | 2012-530983 A | 12/2012 |
| JP | 5159849 B2 | 3/2013 |
| JP | 2013-69053 A | 4/2013 |
| JP | 2013-522702 A | 6/2013 |
| JP | 5260081 B2 | 8/2013 |
| WO | WO 03/104948 A1 | 12/2003 |
| WO | WO 2010/070959 A1 | 6/2010 |
| WO | WO 2012/160760 A1 | 11/2012 |
| WO | WO 2013/100964 A1 | 7/2013 |

OTHER PUBLICATIONS

Xiaoxin Chen, et al., "Overshadow: A Virtualization-Based Approach to Retrofitting Protection in Commodity Operating Systems" ASPLOS Architectural Support for Programming Languages and Operating Systems, Mar. 2008, pp. 2-13.

G. Edward Suh, et al., "AEGIS: Architecture for Tamper-Evident and Tamper-Resistant Processing" ACM International Conference on Supercomputing $25^{th}$ Anniversary Volume, Jun. 2003, pp. 357-368.

Siddhartha Chhabra, et al., "SecureME: A Hardware-Software Approach to Full System Security", Proceedings of the International Conference on Supercomputing (ICS'11), May 31, 2011, pp. 108-119.

Ryotaro Hayashi, et al., "Secure Software Development Environment DFITS (Data Flow Isolation Technology for Security)", IPSJ SIG Technical Report (vol. 2009, No. 20), Feb. 26, 2009, pp. 247-252 (with computer generated English translation).

* cited by examiner

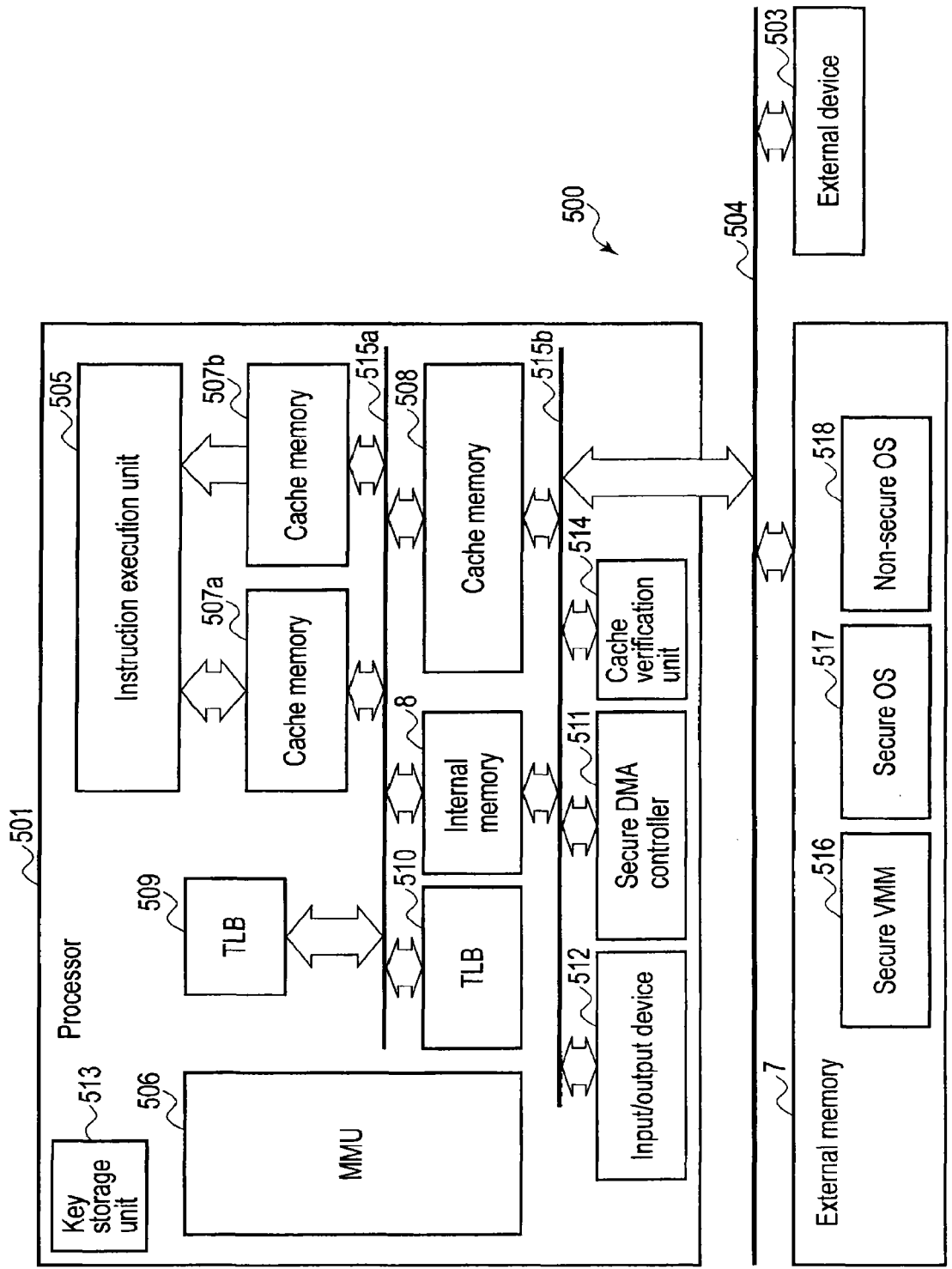
F I G. 2

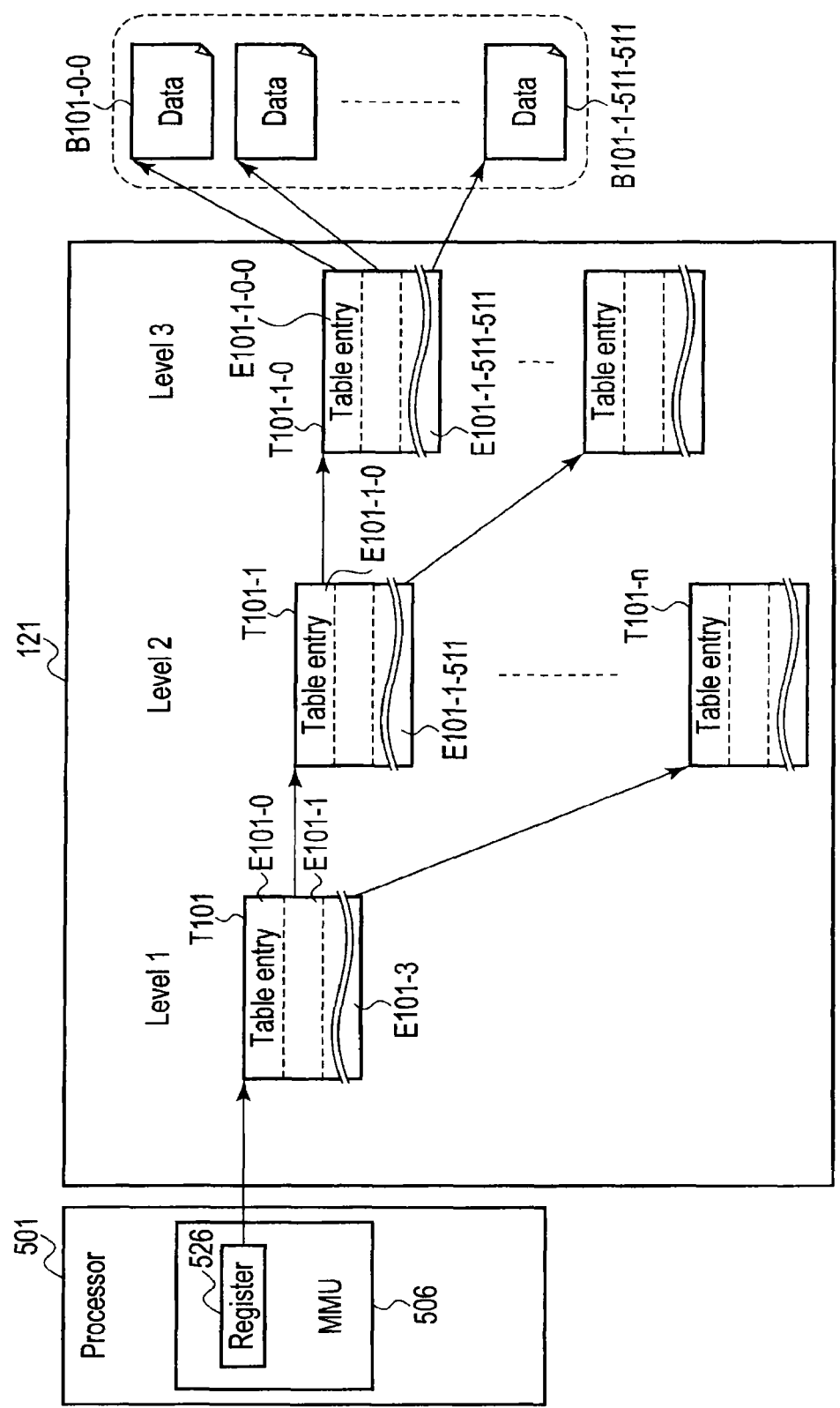
F I G. 4

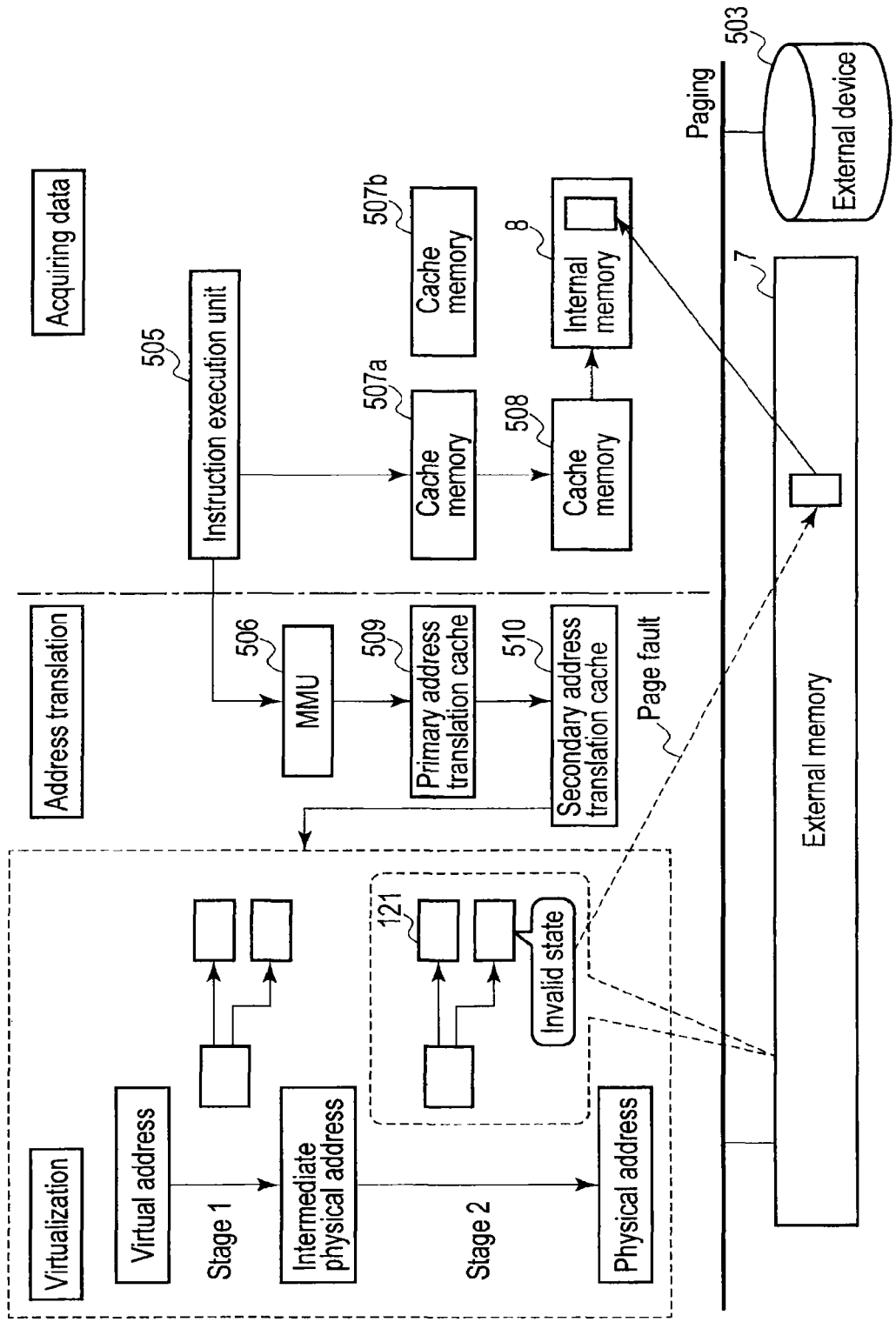
F I G. 6

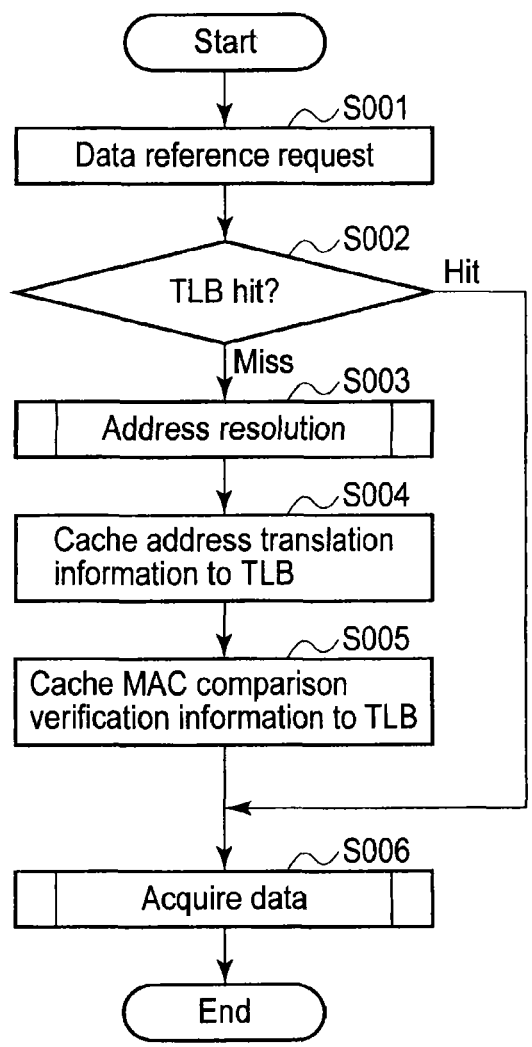
F I G. 11

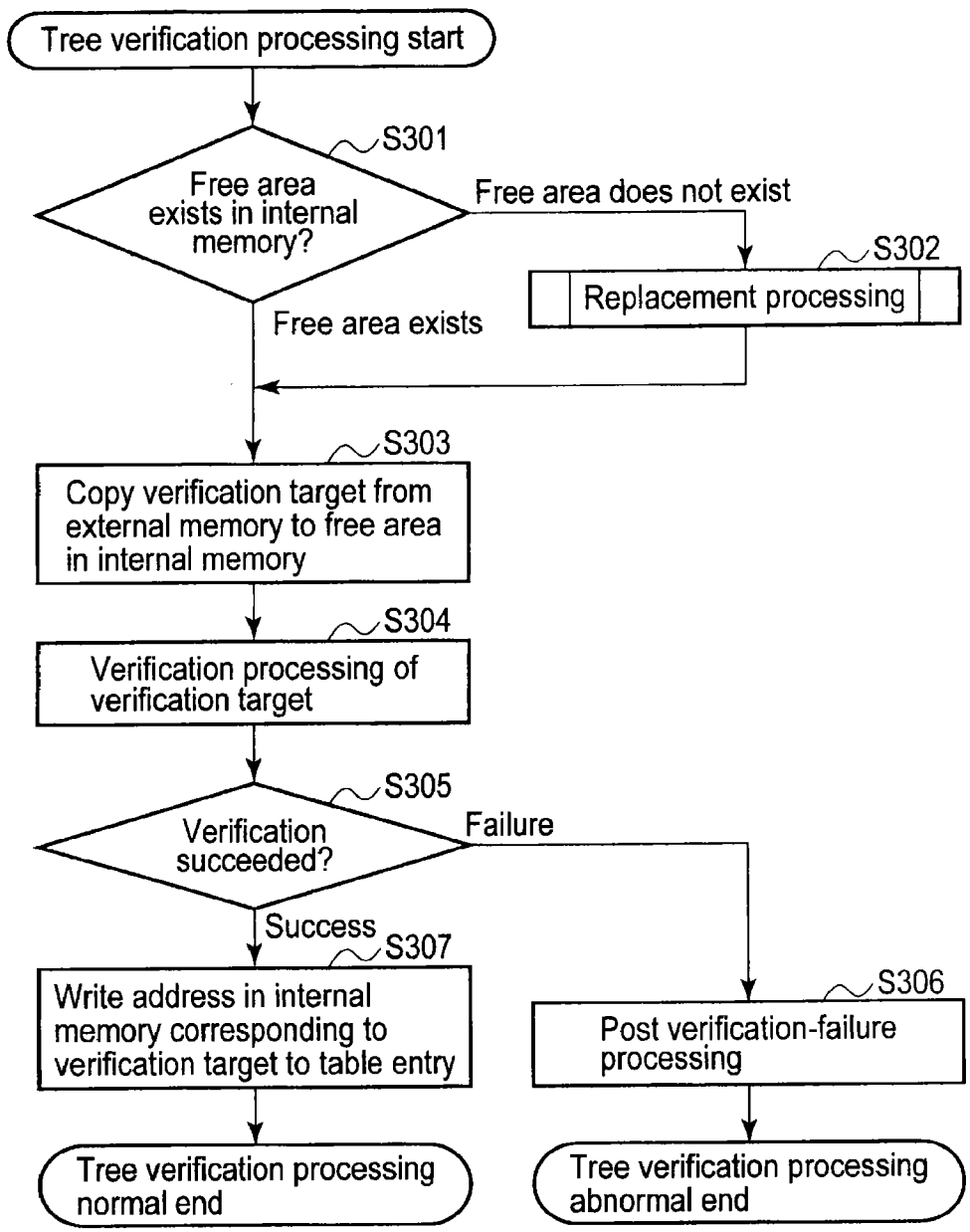
F I G. 15

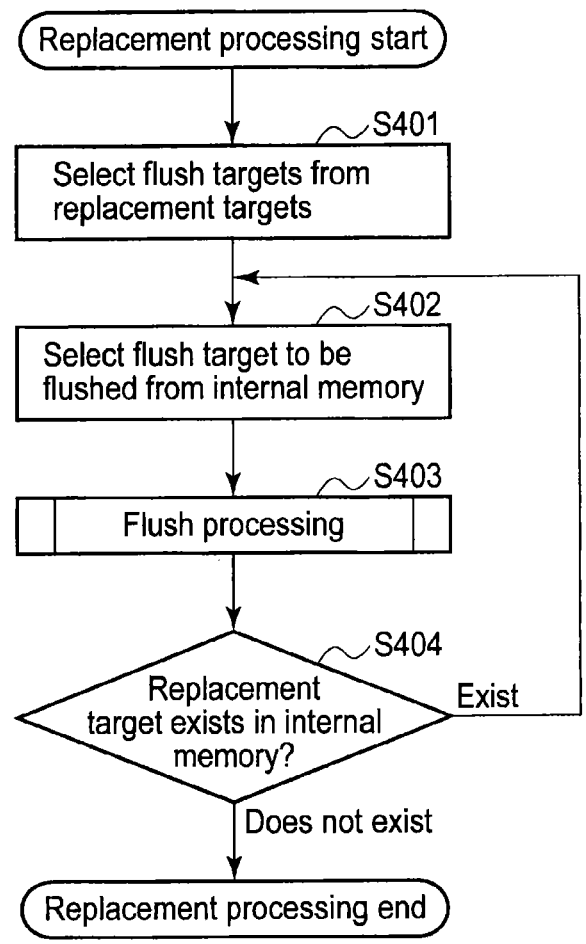
F I G. 16

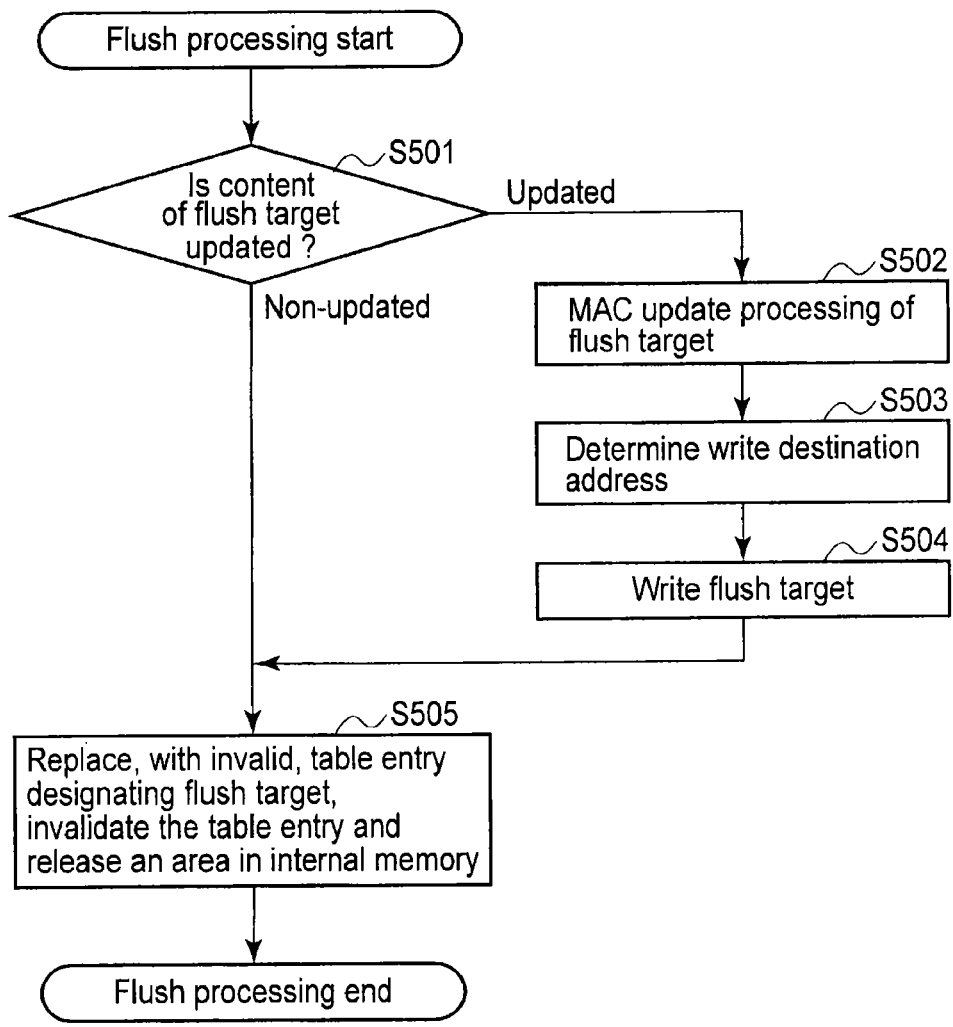
F I G. 17

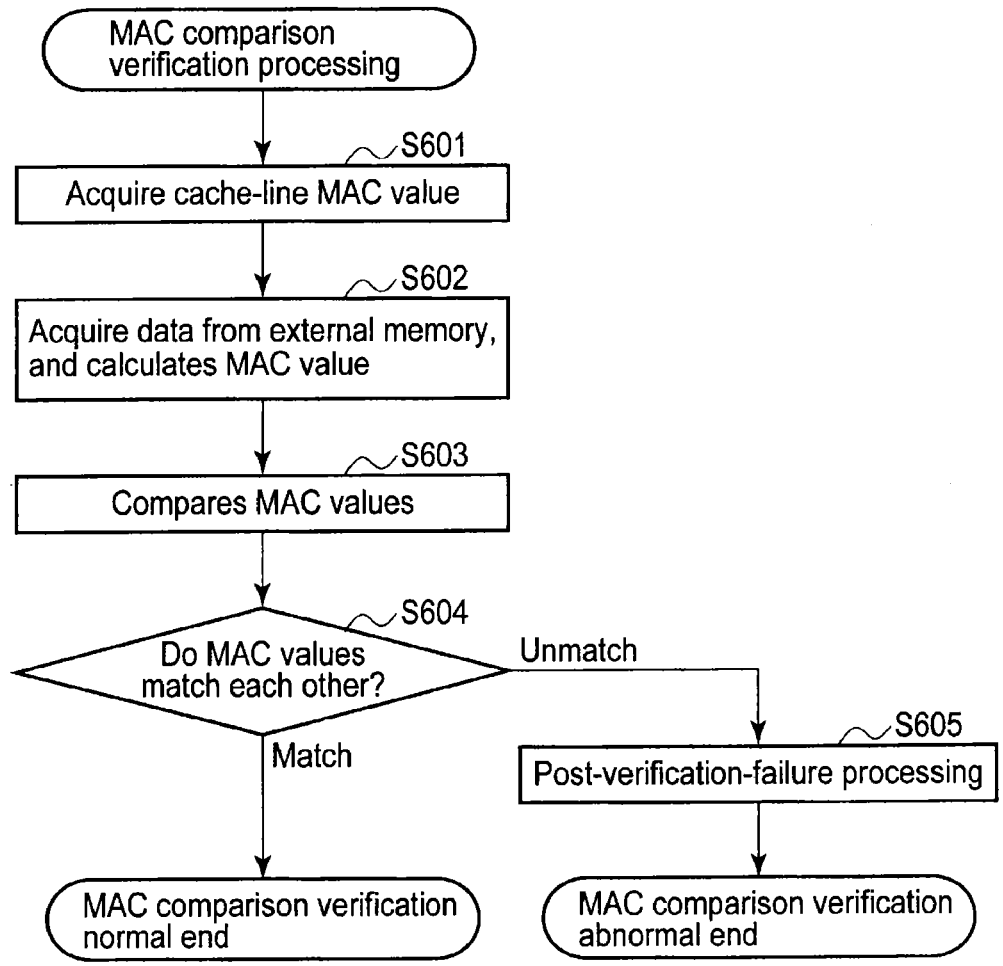
F I G. 18

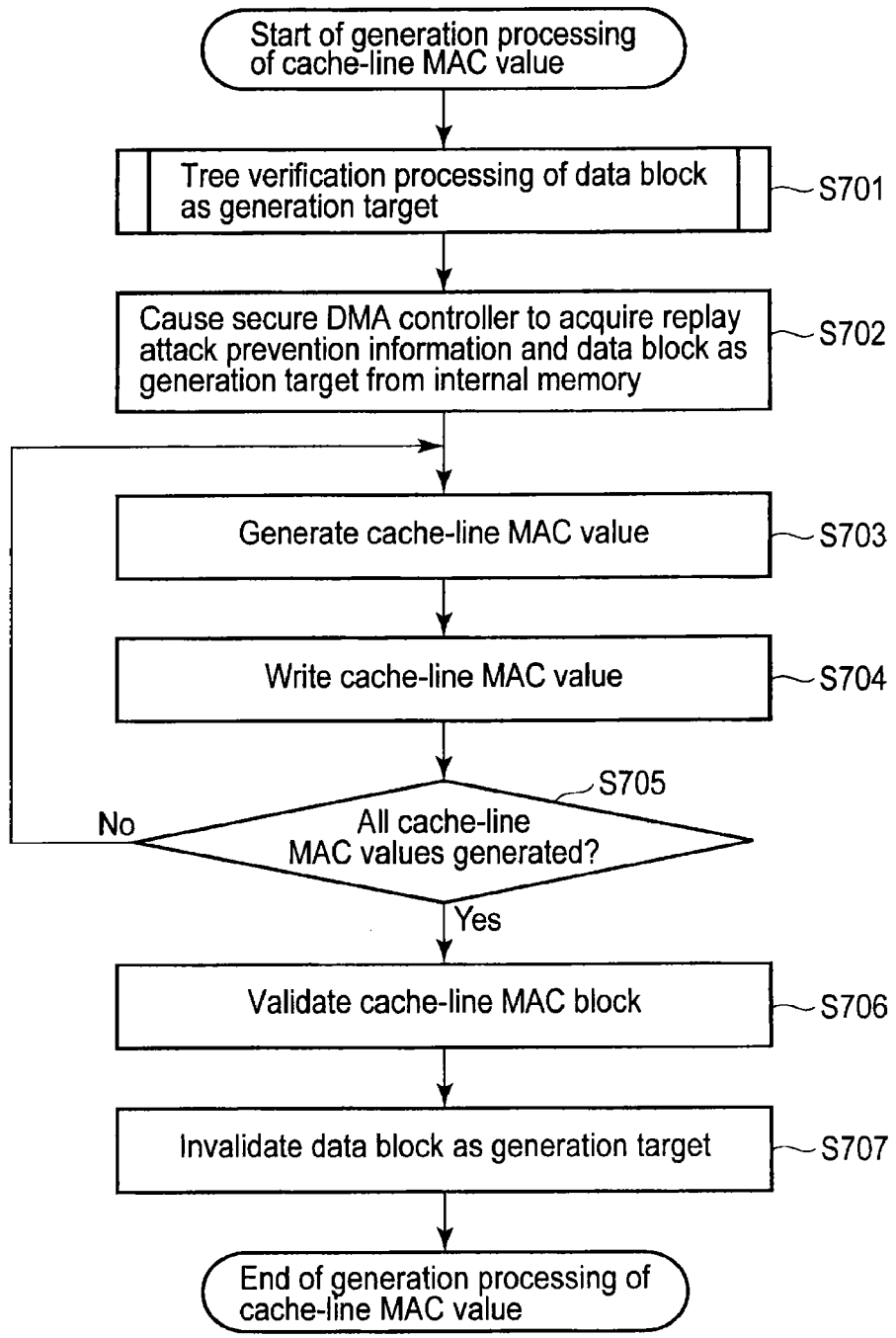
F I G. 20

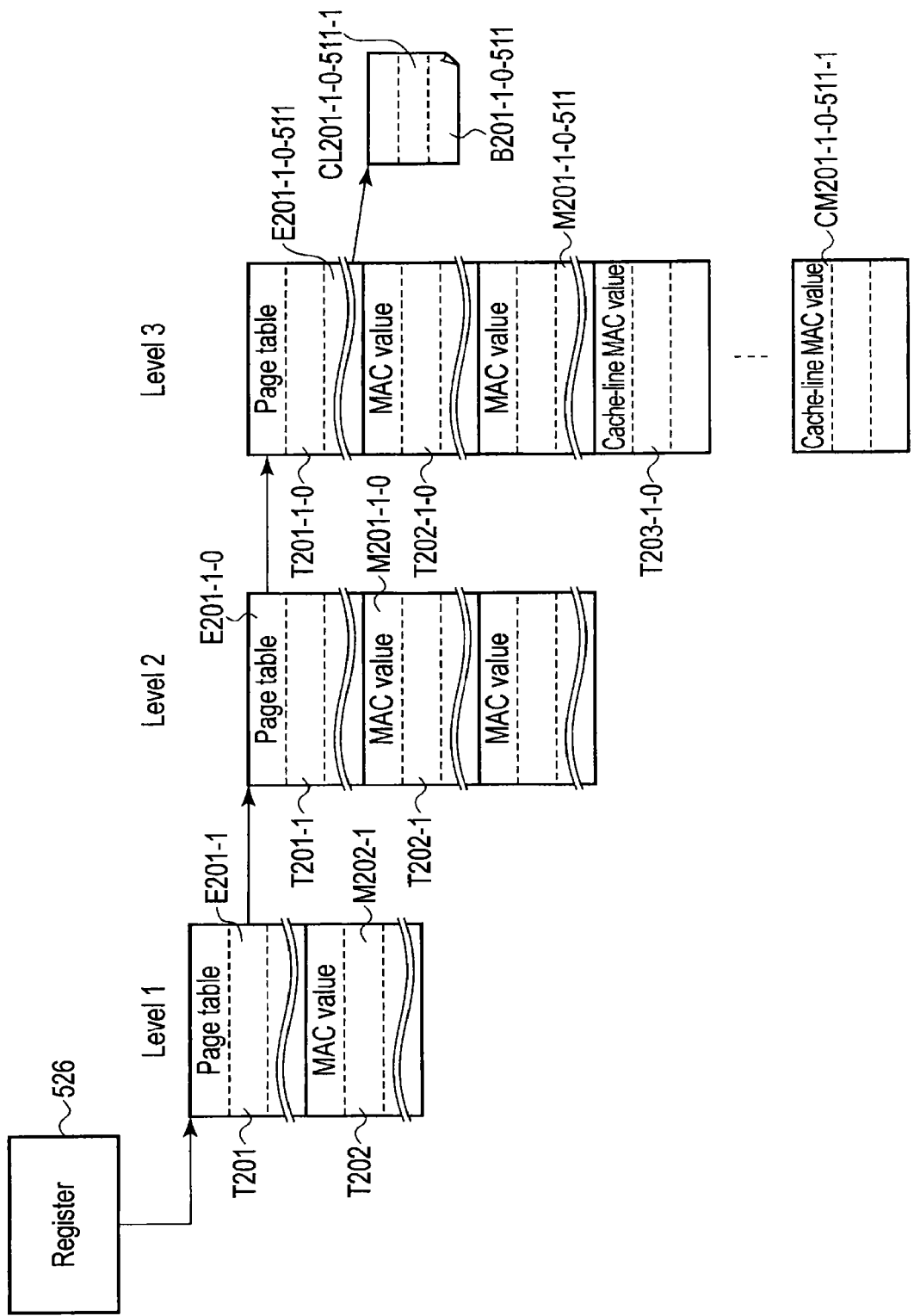
F I G. 22

MEMORY MANAGEMENT DEVICE AND NON-TRANSITORY COMPUTER READABLE STORAGE MEDIUM

CROSS-REFERENCE TO RELATED APPLICATIONS

This application is based upon and claims the benefit of priority from Japanese Patent Application No. 2014-127563, filed Jun. 20, 2014, the entire contents of which are incorporated herein by reference.

FIELD

Embodiments described herein relate generally to a memory management device and a non-transitory computer readable storage medium.

BACKGROUND

A nonvolatile memory contributes to high-speed boot of an information processing device, and low energy consumption by a normally-off function. However, in a term of data security, the nonvolatile memory may be attacked in a manner different from an attack on volatile memory.

For instance, when power to currently working information processing device is interrupted, data in the volatile memory of the device will disappear. Therefore, even if the volatile memory is physically accessed after the power down, data stored in the volatile memory before the power down cannot be thieved or falsified.

In contrast, a nonvolatile memory still store data even during power down. Accordingly, it is possible to remove the nonvolatile memory from an information processing device during the power down, thieve or falsify data therein using an external device, then return the nonvolatile memory to the information processing device, and restart the information processing device. As a result, an operation of the information processing device can be illegally changed. Such a memory attack will especially be significant threat to an information processing device used outside or at a location where a person can illegally access it.

As a countermeasure against illegal data falsifying, various verification techniques, such as hashing or Message Authentication Code (MAC), are used. In general, a hash value and a MAC value for verification target data are called verifiers. In data falsifying verification, it is determined whether verification target data is falsified according to whether a first verifier calculated at a first time based on the verification target data matches a second verifier calculated at a second time based on the verification target data. When a verifier is calculated for verification target data and verification is executed based on the verifier, the verification target data itself may be stored in a place where it may be falsified. However, it is necessary to store the verifier and a secret key in a secure place where neither of falsifying and reference is possible.

BRIEF DESCRIPTION OF THE DRAWINGS

FIG. 2 is a block diagram showing an example of a hardware configuration of the information processing device according to a second embodiment;

FIG. 4 is a block diagram showing an example of a hardware structure for executing address translation and data reference, and a data structure of a secure page table tree according to the second embodiment;

FIG. 6 is a block diagram showing an example of a concept of a data acquisition and address translation by an information processing device according to the second embodiment;

FIG. 11 is a flowchart showing an example of data reference processing according to the second embodiment;

FIG. 15 is a flowchart showing an example of tree verification processing according to the second embodiment;

FIG. 16 is a flowchart showing an example of replacement processing according to the second embodiment;

FIG. 17 is a flowchart showing an example of flush processing according to the second embodiment;

FIG. 18 is a flowchart showing an example of MAC comparison verification processing according to the second embodiment;

FIG. 20 is a flowchart showing an example of generation processing of the cache-line MAC value according to the second embodiment;

FIG. 22 is a data structure diagram showing an example of a secure verifier tree according to a fourth embodiment;

DETAILED DESCRIPTION

Figure 1:
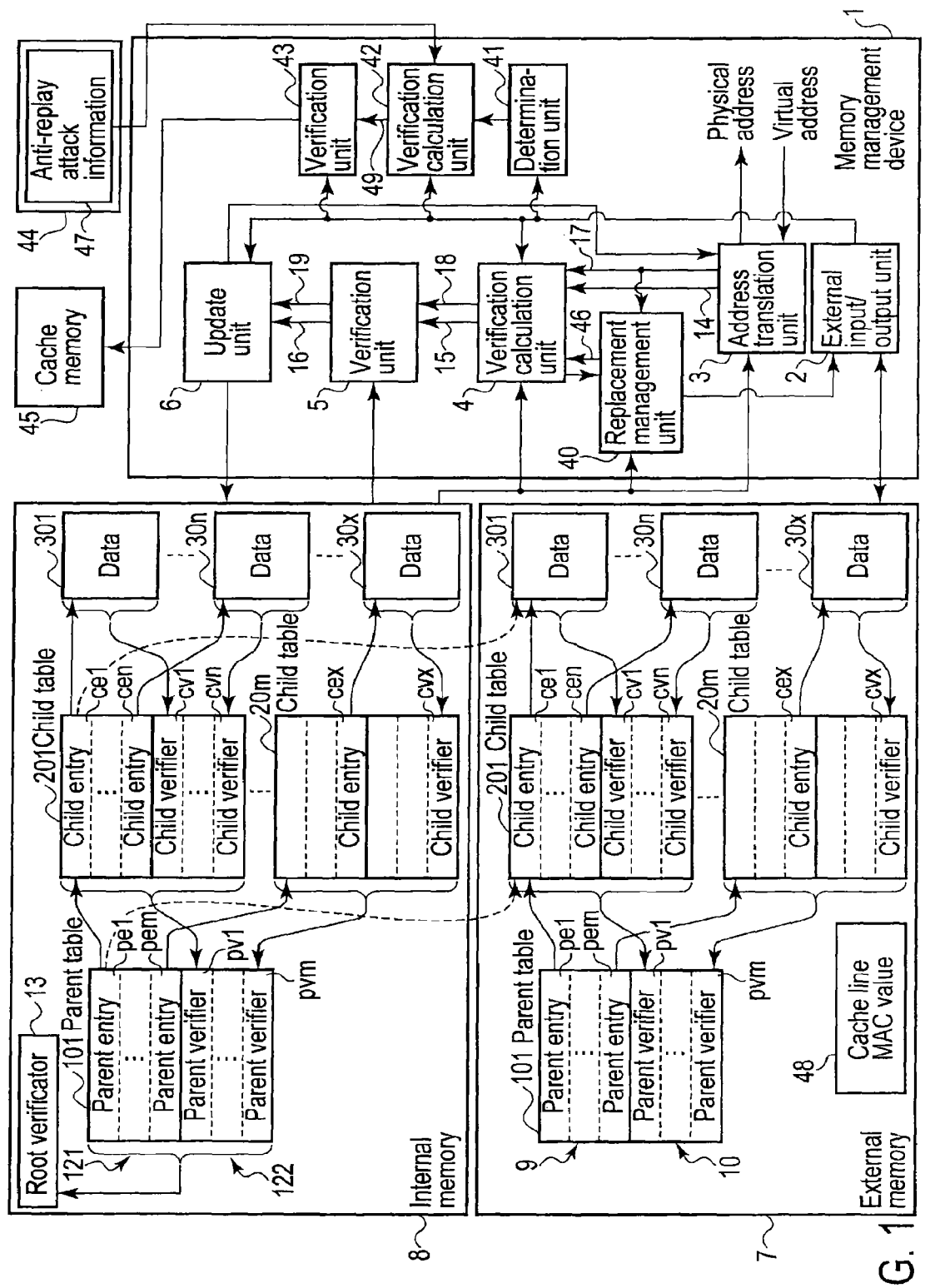
FIG. 1 is a block diagram showing an example of a structure of a memory management device according to a first embodiment.

In general, according to one embodiment, a memory management device includes an external input/output unit, an address translation unit, a first verification calculation unit, a first verification unit, an update unit, a determination unit, a second verification calculation unit, and a second verification unit. The external input/output unit executes reading and writing for a first storage unit. The first storage unit stores a table tree including a parent table and a child table, and a verifier tree including a parent verifier associated with the parent table and a child verifier associated with the child table. The parent verifier is used for verifying the child table and child verifier. The address translation unit translates a first address into a second address, based on a secure table tree which is a part of the table tree and is stored in a secure second storage unit. The secure second storage unit stores a secure verifier tree which is a part of the verifier tree. The first verification calculation unit calculates first verification information, when a first child table included in the table tree and needed for translating the first address into the second address is not included in the secure table tree, based on the first child table in the table tree and a first child verifier included in the verifier tree and associated with the first child table. The first verification unit executes first verification, based on the first verification information and a first parent verifier included in the secure verifier tree and associated with a first parent table referring to the first child table. The update unit incorporates the first child table and the first child verifier into the secure table tree and the secure verifier tree, respectively, when a result of the first verification designates validity. The determination unit determines whether data as a reference target is first data having a read-only attribute or second data having a read/write attribute. The second verification calculation unit calculates second verification information, based on the first data read from the first storage unit and a secure value which varies according as the first data is updated, if the data is the first data. The second verification unit executes second verification, based on a verifier stored in at least one of the first and second storage units and corresponding to the first data, and the second verification information, and stores the first data in a third storage unit when a result of the second verification designates validity.

Embodiments will be described with reference to the accompanying drawings. In the descriptions below, similar reference numbers denote elements similar in function and structure, and duplicate descriptions will be given only when necessary.

First Embodiment

Data used by an information processing device includes read-only (RO) data and read/write (R/W) data.

The RO data is data that has an RO attribute, and is permitted to be read but not permitted to be written. Alternatively, the RO data may be permitted occasionally to be written, although it is not permitted, in principle, to be written.

The RW data is data that has an RW attribute, and is permitted to be read and written.

The RO data may be changed to the RW data, and the RW data may be changed to the RO data.

In the present embodiment, the RO data is detected and stored in a cache memory. As verification of the RO data stored in the cache memory, verification that does not include protection from a replay attack is executed. The RW data is stored in an internal memory. For the RW data, verification including protection from the replay attack is executed. For the RO data, spatial integrity is guaranteed, for the RW data, temporal integrity is guaranteed in addition to the integrity of the spatial integrity.

FIG. 1 is a block diagram showing an example of a structure of the memory management device according to the present embodiment. Each structural element of the memory management device 1 may be realized by hardware or a processor controlled by a program.

The memory management device 1 includes an external input/output unit 2, an address translation unit 3, a verification calculation unit 4, a verification unit 5, an update unit 6 and a replacement management unit 40, a determination unit 41, a verification calculation unit 42 and a verification unit 43.

The memory management device 1 executes reading and writing to an external memory 7 as a first storage unit, an internal memory 8 as a second storage unit, an address translation buffer 44 and a chase memory 45.

The external memory 7 is, for example, a nonvolatile memory device. More specifically, the external memory 7 may be a nonvolatile semiconductor memory, such as a NAND flash memory, a NOR flash memory, a magnetoresistive random access memory (MRAM), a phase-change random access memory (PRAM), a resistive random access memory (ReRAM) or a ferroelectric random access memory (FeRAM). The external memory 7 may be used as a main storage device, or as an auxiliary storage device, such as a hard disk, or a solid-state drive (SSD).

The external memory 7 stores a page table tree 9 having a hierarchical structure, and a verifier tree 10 having a hierarchical structure. In the present embodiment, the page table tree 9 and the verifier tree 10 each have a two-stage hierarchy. However, it is a matter of course that the page table tree 9 and the verifier tree 10 may each have a three-stage or more hierarchy.

The page table tree 9 is formed by a hierarchical structure including a plurality of page tables. The page table tree 9 includes a parent table 101 and child tables 201 to 20$m$. When a table entry E includes address information X, and address information X designates an intermediate table T for determining an access destination of target data D, or data D itself, this means that the table entry E refers to the table T or data D. A reference destination address in the table entry E is the address information X. A reference source of the table T or data D is the table entry E. Parent entries pe1 to pem included in the parent table 101 are used for referring to the child tables 201 to 20$m$. Child entries ce1 to cex included in the child tables 201 to 20$m$ are used for referring to data 301 to 30$x$.

In the present embodiment, a description will be given of a typical case where the data 301 is accessed via the parent entry pe1 in the parent table 101 and the child entry ce1 in the child table 201 in the page table tree 9. However, a similar description also applies to a case where data is accessed via another parent table, another parent entry, another child table, or another child entry.

The verifier tree 10 has a hierarchical structure including parent verifiers pv1 to pvm and child verifiers cv1 to cvx. The parent verifiers pv1 to pvm are associated with the parent table 101. The child verifiers cv1 to cvn are associated with the child table 201. A similar description to a relationship between child verifiers cv1 to cvn and the child table 201 also applies to a relationship between other child verifiers and a corresponding child table.

In the present embodiment, the child verifiers cv1 to cvn associated with the child table 201 are used for verifying data 301 to 30$n$ referred to by the child entries ce1 to cen included in the child table 201, respectively.

The parent verifier pv1 associated with the parent table 101 is used for verifying the child table 201 referred to by the parent entry pe1 included in the parent table 101, and the child verifiers cv1 to cvn associated with the child table 201. A similar description to a relationship between the parent verifier pv1 and combination of the child table 201 and child verifiers cv1 to cvn also applies to a relationship between another parent verifier and combination of a corresponding child table and corresponding child verifiers.

The internal memory 8 is a storage device that cannot directly be accessed externally and is protected from illegal access. For example, the internal memory 8 is a storage device in a processor package. For instance, the internal memory 8 is, for example, hardware integrated with the package of a processor 501 as one body, as is shown in FIG. 2 directed to a second embodiment described below. Data transfer is performed between the internal memory 8 and an external bus 504 via internal bus 515b. The data transfer is performed based on an instruction executed by an instruction execution unit 505 in the processor 501. It is supposed that a content of the internal memory 8 cannot directly be read or rewritten via the external bus 504. A memory having a similar feature to that of the internal memory 8 is regarded as secure memory. In contrast, in the external memory 7, reading and writing for an arbitrary address and reading and writing data corresponding to the address are possible via the external bus 504. Therefore, the external memory 7 is not regarded as a secure memory.

The internal memory 8 and the external memory 7 are arranged in a same physical address space. The internal memory 8 can be accessed from software executed by the instruction execution unit 505, like the external memory 7.

The internal memory 8 stores a secure page table tree 121 for translation of an first address into a second address as a part of the page table tree 9, and a secure verifier tree 122 as a part of the verifier tree 10. In the present embodiment, the first address is set as a virtual address, and the second address is set as a physical address. However, the first address may be, for example, an intermediate physical address. The internal memory 8 stores root verification information 13 used for verifying the parent table 101 and parent verifiers pv1 to pvm.

The address translation unit 3 determines physical addresses of the data 301 to 30x via parent entries pe1 to pem in the parent tale 101 and child entries ce1 to cex in the child tables 201 to 20m, stored in the internal memory 8, If data as a reference target is RW data.

When the parent table 101 is copied (moved or read-in) from the external memory 7 to the internal memory 8, the parent verifiers pv1 to pvm associated with the parent table 101 are also copied from the external memory 7 to the internal memory 8.

In the present embodiment, a page table or data is copied from the external memory 7 to the internal memory 8 that is protected from falsification, and is verified. When a page table or data in the internal memory 8 is changed and then deleted from the internal memory 8, the changed page table or data in the internal memory 8 is written to the external memory 7. When a page table or data in the internal memory 8 is deleted from the internal memory 8 without any change, the page table or data in the internal memory 8 may be written to the external memory 7 or may be directly discarded. In the description below, copy of a page table or data between the external and internal memories 7 and 8 may be expressed as moving, reading-in or writing-out. For instance, change of a reference destination of a page table to the page table or data copied to the internal memory 8 may be expressed as moving or reading of the page table or data. In this case, the page table or data as a copy source in the external memory 7 may not be deleted.

When the child table 201 is copied from the external memory 7 to the internal memory 8, the child verifiers cv1 to cvn associated with the child table 201 are also copied from the external memory 7 to the internal memory 8.

The external input/output unit 2 executes reading and writing for the page table tree 9 and the verifier tree 10 stored in the external memory 7.

Firstly, a description will be given of a case where the child table 201 and child verifiers cv1 to cvn are copied from the external memory 7 to the internal memory 8.

The address translation unit 3 translates a virtual address into a physical address, based on the secure page table tree 121 stored in the internal memory 8. When the child table 201 needed to translate a virtual address into a physical address is not included in the secure page table tree 121, the address translation unit 3 sends a table-missing notification (fault) 14 to the verification calculation unit 4, and translates the virtual address into the physical address, based on the updated secure page table tree 121.

When the verification calculation unit 4 receives the table-missing notification 14 from the address translation unit 3, the verification calculation unit 4 reads, from the external memory 7 via the external input/output unit 2, the child table 201 in the page table tree 9 and child verifiers cv1 to cvn in the verifier tree 10, calculates verification information 15, based on the read child table 201 and child verifiers cv1 to cvn, and sends the verification information 15 to the verification unit 5.

The verification unit 5 executes verification, that is, determines whether the verification information 15 calculated by the verification calculation unit 4 matches the parent verifier pv1 in the secure page table tree 121 associated with the parent table 101 that includes a reference source entry pe1 in the secure page table tree 121. Subsequently, the verification unit 5 sends a verification result 16 to the update unit 6.

When the update unit 6 receives the verifier result 16 from the verification unit 5 and the verifier result 16 designates validity, the update unit 6 sets the child table 201 in the secure page table tree 121 in the internal memory 8 and sets child verifiers cv1 to cvn in the secure verifier tree 122 in the internal memory 8. More specifically, assume here that before updating, the parent entry pe1 in the parent table 101 refers to the child table 201 included in the page table tree 9 in the external memory 7. The update unit 6 updates the parent entry pe1 to be updated in the parent table 101 in the secure page table tree 121 to cause it to refer to the child table 201 included in the secure page table tree 121 in the internal memory 8.

In the memory management device 1 of the present embodiment, for example, the external input/output unit 2 may read, before a confirmation of the verification result 16, the child table 201 and child verifiers cv1 to cvn into the internal memory 8, and set the child table 201 and child verifiers cv1 to cvn in the secure page table tree 121 and the secure verifier tree 122 if the verification result 16 designates validity.

As described above, in the present embodiment, when the child table 201 is not stored in the internal memory 8, and the child table 201 and verifiers cv1 to cvn are copied from the external memory 7 to the internal memory 8, and the child table 201 and verifiers cv1 to cvn are copied from the external memory 7 to the internal memory 8, the parent entry pe1 in the parent table 101 refers to the child table 201 in the external memory 7. When the child table 201 is stored in the internal memory 8, the parent entry pe1 in the parent table 101 is updated to refer to the child table 201 in the internal memory 8.

In the present embodiment, when the parent table 101 is not stored in the internal memory 8, and the child table 201 and verifiers cv1 to cvn are copied from the external memory 7 to the internal memory 8, the verification calculation unit 4 generates verification information, based on the parent table 101 and parent verifiers pv1 to pvn read from the external memory 7, and physical addresses stored in the parent table 101 in the external memory 7. By generating the verification information using the physical addresses of the parent table 101 in the external memory 7, a protection from an attack of exchanging the parent table 101, can be realized. The verification unit 5 executes verification based on the root verification information 13 and the generated verification information. When a verification result designates validity, the update unit 6 sets, in the secure page table tree 121, the parent table 101 read from the external memory 7, and sets, in the secure verifier tree 122, the parent verifiers pv1 to pvn read from the external memory 7.

Secondly, a description will be given of an example case where the data 301 is copied from the external memory 7 to the internal memory 8.

The address translation unit 3 sends a data read notification 17 to the verification calculation unit 4 and the replacement management unit 40 when a physical address obtained by translating a virtual address refers to the external memory 7.

When the verification calculation unit 4 receives the data read notification 17 from the address translation unit 3, the verification calculation unit 4 reads the data 301, referred to by a physical address, from the external memory 7 via the external input/output unit 2, calculates data verification information 18, based on the read data 301 and the physical address in the external memory 7 corresponding to the data 301, and sends the data verification information 18 to the verification unit 5. By thus generating the data verification information 18 using a physical address of data in the external memory 7, a protection from an attack of exchanging the data 301, can be realized.

The verification unit 5 executes data verification as to whether the data verification information 18 calculated by the verification calculation unit 4 matches the child verifier cv1 associated with the child table 201 as a reference source in the secure page table tree 121, and sends a data verification result 19 to the update unit 6.

The update unit 6 receives the data verification result 19 from the verification unit 5, and sets data 301 in the secure page table tree 121 in the internal memory 8 when the data verification result 19 designates validity. More specifically, assume here that before updating, the child entry ce1 in the child table 201 refers to data 301 included in the page table tree 9 in the external memory 7. The update unit 6 updates the child entry ce1 to be updated in the child table 201 in the secure page table tree 121 to cause it to refer to data 301 in the internal memory 8.

In the memory management device 1 according to the present embodiment, for example, the external input/output unit 2 may read, before a confirmation of the data verification result 19, data 301 into the internal memory 8, and set the data 301 in the secure page table tree 121 when the data verification result 19 designates validity.

As described above, when in the present embodiment, data 301 is not stored in the internal memory 8, and is copied from the external memory 7 to the internal memory 8, the child entry ce1 in the child table 201 refers to data 301 in the external memory 7. When the data 301 is stored in the internal memory 8, the child entry ce1 in the child table 201 is updated to refer to data 301 in the internal memory 8.

A virtual address is translated to a physical address corresponding to the data 301 via the parent entry pe1 in the parent table 101 and child entry ce1 in the child table 201. The data 301 to be referred to is stored in an area in the secure internal memory 8 designated by the physical address. All data and tables to be referred to by such address resolution are determined valid by the verification, and are arranged in the secure internal memory 8.

Thirdly, a description will be given of a case where the data 301 is copied (written) from the internal memory 8 to the external memory 7.

The verification calculation unit 4 calculates the child verifier (data verification information) cv1, based on the data 301 in the internal memory 8, when the data 301 stored in the internal memory 8 is written to the external memory 7.

The external input/output unit 2 stores the data 301 in the external memory 7.

The update unit 6 updates, to a storage position of the data 301 in the external memory 7, a reference destination (physical address) of the child entry ce1 in the child table 201 in the secure page table tree 121. Further, the update unit 6 associates the child verifier cv1 calculated by the verification calculation unit 4 with the child table 201 in the secure page table tree 121, and sets the child verifier cv1 to the secure page table tree 121.

In the present embodiment, the update unit 6 sets the parent entry pe1 in the parent table 101 invalid when the secure page table tree 121 does not include the child table 201, and sets the parent entry pe1 in the parent table 101 valid when the child table 201 is incorporated in the secure page table tree 121.

The update unit 6 sets the child entry ce1 in the child table 201 invalid when the internal memory 8 does not store the data 301, and sets the child entry ce1 in the child table 201 valid when the internal memory 8 stores the data 301.

In the above-described first and second cases, the replacement management unit 40 confirms a capacity of a free area in the internal memory 8, when a table or data is to be stored in the internal memory 8, for example, when the data read notification 17 is received from the address translation unit 3. When the capacity of the free area in the internal memory 8 is not enough, the replacement management unit 40 sends, to the verification calculation unit 4, a verification information request 46 for a table or data in the internal memory 8 selected to be deleted. In a response to the verification information request 46, the replacement management unit 40 receives, from the verification calculation unit 4, a verifier corresponding to the selected table or data in the internal memory 8. Then, the replacement management unit 40 writes the selected table or data in the internal memory 8 and its verifier to the external memory 7 via the external input/output unit 2, thereby releasing an area of the selected table or data in the internal memory 8 to increase the free area in the internal memory 8.

The address buffer 44 stores address translation information that associates the virtual address with the physical address. The address buffer 44 further stores anti-replay attack information 47. The anti-replay attack information 47 may be stored in a storage unit other than the address translation buffer 44.

The anti-replay attack information 47 is a secure value that varies in accordance with update of data. As the anti-replay attack information 47, for example, a counter value that is incremented whenever data is updated is used.

A cache line MAC value 48 is a verifier for each cache line. Although in the present embodiment, the cache line MAC value 48 is stored in the external memory 7, it may be stored in another storage unit, such as the internal memory 8.

The determination unit 41 determines whether data 301 as a reference target is RO data or RW data.

If the data 301 is the RW data, first to third processes, for example, based on the secure page table tree 121 and the secure verifier tree 122 are executed, as described above.

If the data 301 is determined to be RO data, the verification calculation unit 42 calculates verification information 49, based on the RO data and the anti-replay attack information 47 corresponding to the RO data, and transmits verification information 49 to the verification unit 43.

The verification unit 43 executes verification, based on cache line MAC values 48 set on a cache-line-by-cache-line and corresponding to the RO data, and the verification information 49. If the verification has succeeded, the RO data is stored in the cache memory 45. In contrast, if the verification has failed, the verification unit 43 executes verification failure processing.

As described above, in the present embodiment, if the data 301 as a reference target is RO data, the verification unit 43 stores the data 301 in the cache memory 45 without executing verification based on the secure verifier tree 122 stored in the internal memory 8.

The verification unit 5 executes verification based on the secure verifier tree 122 stored in the internal memory 8 if the data 301 as the reference target is RW data, and stores the data 301 in the internal memory 8 if the result of the verification designates validity.

In the above-described embodiment, verification based on the secure verifier tree 122 is executed on RW data, and verification based on the cache line MAC value 48 is executed on RO data, whereby the strength of resistance against replay attacks is adjusted between the RO data and RW data to enable efficient verification.

In the description below, verification based on the secure verifier tree 122 will be referred to as tree verification, and verification based on the cache line MAC value 48 will be referred to as MAC comparison verification. Namely, tree verification is executed on RW data, and MAC comparison verification is executed on RO data.

In the present embodiment, any necessary portion of the page table tree 9, verifier tree 10 and data 301 to 30*x* stored in the external memory 7 can be selectively verified, and the verified necessary portion can be stored in the internal memory 8 smaller in capacity than the external memory 7. As a result, a physical attack against the external memory 7 can be detected, and data integrity can be verified to thereby prevent falsification of data. In the present embodiment, falsification of the page table tree 9, the verifier tree 10 and data 301 to 30*x* can be detected by falsification verification, thereby enhancing a security level of the information processing device.

Verification according to the present embodiment is applicable to a virtualization technique, and can be easily applied without changing a guest operating system (OS) and application by referring to the secure page table tree 121 and the secure verifier tree 122 stored in the internal memory 8.

In the present embodiment, the page tables coincide with the verifiers in hierarchical structure, and the page tables and verifiers are verified as one body. In other words, the page table tree 9 and the verifier tree 10 have the same graph structure. As a result, even if a verifier is a paging target, it is not necessary to resolve a destination address of the verifier. Further, since the page tables and the verifiers are managed using a hierarchical structure, the secure page table tree 121, the secure verifier tree 122, the page table tree 9 and the verifier tree 10 can be allocated in memory areas of a discontinuous address space. This enables efficient memory use. In the present embodiment, management of verifiers using a hierarchical structure enables efficient management.

In the present embodiment, a non-verified page table and non-verified data are detected by a page fault of an existing address translation mechanism. Therefore, it is not necessary to add new hardware. Further, in the present embodiment, each page table and a corresponding verifier are copied not separately but integrally between the external memory 7 and the internal memory 8. Accordingly, even when a page fault has occurred, increase in overhead can be suppressed.

In the present embodiment, whether a page table and data are stored in the internal memory 8 is managed depending upon whether an entry in the upper-level page table corresponding to the page table and data is valid. As a result, it can be determined efficiently whether the page table and data are stored in the internal memory 8, using an address translation mechanism as general-purpose hardware.

Second Embodiment

In a present embodiment, an information processing device including the memory management device 1 according to the first embodiment will be described in detail. This information processing device may be a computer system.

FIG. 2 is a block diagram showing an example of a hardware structure of the information processing device according to the present embodiment.

The information processing device 500 includes a processor 501, an external memory 7, an external device 503 and an external bus 504. The processor 501, the external memory 7 and the external device 503 can transmit and receive data, signal or instruction therebetween via the external bus 504.

A virtualization assisting mechanism included in the information processing device 500 executes address translation in two stages, for example.

The processor 501 includes an instruction execution unit (processor core) 505, a memory management unit (MMU) 506, cache memories 507*a*, 507*b* and 508, address translation caches (Translation Look-aside Buffer: TLB) 509 and 510, the internal memory 8, a secure direct memory access (DMA) controller 511, an input/output device 512, a key storage unit 513, a cache verification unit 514, and internal buses 515*a* and 515*b*. The structural elements 8, 505 to 514 of the processor 501 can transmit and receive data, signal or instruction therebetween via the internal buses 515*a* and 515*b*.

The external memory 7 stores a secure Virtual Machine Monitor (VMM) 516, a secure OS 517 and a non-secure OS 518.

In the present embodiment, the secure OS 517 and the non-secure OS 518 are guest OSs managed by the secure VMM 516.

The external device 503 is a nonvolatile memory device, such as a hard disk.

The instruction execution unit 505 of the processor 501 executes data reference, using cache memories 507*a*, 507*b* and 508 that have a hierarchical structure. In a following explanation, data reference executed after address translation will be described firstly, and then the address translation will be described.

The cache memory 507a is a primary cache memory for data. The cache memory 507b is a primary cache memory for data and instruction. The cache memory 508 is a secondary cache memory for data and instruction.

The instruction execution unit 505 can refer to the data or instruction stored in the cache memory 508 more quickly than to those stored in the internal memory 8 or external memory 7. Further, the instruction execution unit 505 can access cache memories 507a and 507b quicker than the cache memory 508.

The instruction execution unit 505 reads data or instruction from the cache memory 507a, 507b, and/or 508, or the internal memory 8, and executes processing.

When reference target data is stored in cache memory 507a or 507b, data reference to the cache memory 508 or the internal memory 8 is not performed.

When reference target data is not stored in cache memory 507a or 507b, and is stored in the cache memory 508, data reference to the internal memory 8 is not performed. This enables data reference to be performed in a short time.

The data read from the internal memory 8 may be stored to cache memory 507a or 507b not through the cache memory 508.

The key storage unit 513 stores the root verification information 13, and key information used for an encryption or verification in the information processing device 500.

The secure DMA controller 511 executes data transfer between various structural elements. The secure DMA controller 511 may be realized by, for example, hardware and execute MAC-value calculation. However, the MAC-value calculation may be carried out by software.

The cache verification unit (hardware verification mechanism) 514 incorporated in the processor 501 generates MAC values for verification-requested RO data cache-line-by-cache-line, and executes verification by comparing the generated MAC values. The cache verification unit 514 stores, in the cache memory 508, RO data whose result of verification designates validity.

The information processing device 500 executes virtual storage management in cooperation with memory verification processing. In the present embodiment, a nonvolatile semiconductor memory is used as a main storage device. In the present embodiment, the page table tree 9 having a hierarchical structure and the verifier tree 10 having a hierarchical structure are generated. The page table tree 9 and the verifier tree 10 match each other in the hierarchical structure. The page table tree 9 and the verifier tree 10 are stored in the nonvolatile external memory 7, and portions of the trees are stored in the internal memory 8 when necessary. Since the external memory 7 is a nonvolatile storage device, the external memory 7 maintains a storage state before power is turned off, when the power is turned off and then again turned on.

For instance, in integrated hardware realized by integrating a package of a processor, such as a central processing unit (CPU) or a micro-processing unit (MPU), and a main storage device, it is difficult to perform the above-mentioned data theft, falsification, and physical attack. However, the integrated hardware is generally expensive, and hence there is a demand for a technique of realizing secure processing by a combination of a general-purpose processor package and a general-purpose memory.

In the present embodiment, it is supposed that the internal memory 8 provided within a package of the processor 501 is protected from a physical attack. However, it is also supposed that an attack of causing data to be illegally output from the internal memory 8, using illegal software, is possible. It is further supposed that an attacker against the information processing device 500 can freely renew an arbitrary area at an arbitrary time in the external memory 7.

In the present embodiment, a memory area protected from data falsification, and an encrypted memory area, are referred to as protected memory areas.

In order to prevent an attack against the main storage device of the information processing device 500 and eliminate a threat, the following first to fifth conditions must be satisfied in view of security and system configuration:

The first condition relates to a security. As the first condition, data falsification including a replay attack must be perfectly detectable.

The second condition relates to a hardware configuration. As the second condition, dedicated hardware for verification on the RW data does not have to be required. More specifically, as the second condition, it is required that hardware dedicated to verification of memory falsification is not needed. The second condition requires that an attack is prevented and a threat is eliminated, based on an address translation mechanism, a virtualization assisting mechanism, a general-purpose internal memory in a processor, a speed-up auxiliary mechanism, and/or, a high-speed encryption engine that cooperates with a DMA controller, included in a large number of processors. The second condition requires that processing based on software, such as firmware, is possible. The second condition requires that the hardware configuration is easily compatible with a virtualization technique. The second condition requires that the hardware configuration is operable even if a memory size of the secure internal memory 8 is small such as approximately one megabyte.

The third condition relates to a memory. The third condition requires that a large-capacity memory, such as a memory having a 32-bit address space or more, is usable. The third condition requires that a memory verification target area is selectable. The third condition requires that memory areas as protection targets can be arranged in some discontinuous areas in a memory map, and that only a necessary portion of the memory can be set as a falsification verification target. The third condition requires that data itself, which defines an area of the memory selected as the falsification verification target, can also be protected from an attack. The third condition requires that even when memory areas as protection targets are discontinuous, only selected area can be verified, and a memory area dedicated to a verifier is not required in an area other than those selected, thereby enabling the memory to be used efficiently.

The fourth condition relates to a software configuration and security. The fourth condition requires that the entire OS can be set as a protection target. The fourth condition requires that hardware, which is dedicated to communication with an external device and does not need falsification verification, can be excluded from a falsification verification target and can be set as a non-selected area. The fourth condition requires that the software configuration has transparency, namely, the OS and application do not have to be modified. The fourth condition requires that if an OS is malfunctioned and an illegal instruction is executed, a memory falsification verification function is security and sturdy against a verification detour or damage of control information although the damage of the OS itself and an erroneous operation of the OS are permitted.

The fifth condition relates to efficiency of processing. The fifth condition requires that efficiency of processing should be increased by executing frequently occurring processing, such as determination as to whether falsification verification should be executed for each memory access, using hardware as far as possible.

The present embodiment realizes an information processing device 500, in which a nonvolatile main storage device is supposed to be used, verification is executed based on the secure verifier tree 122, multi-stage address translation is executed based on the secure page table tree 121, a virtualization technique is supposed to be employed, and the above-mentioned first to fifth conditions are satisfied.

The present embodiment has three important points. The first important point will firstly be described.

The first point relates to securing of address transparency, and provision of a detection function of non-verified data reference. More specifically, when reference to data by a guest OS is occurred, the secure VMM 516 confirms a page table entry, and stores data in the external memory 7 to a buffer memory dynamically allocated in the internal memory 8 when verification via the internal memory 8 is needed.

When the verification via the internal memory 8 is succeeded, the secure VMM 516 rewrites a managed secure page table tree 121 (for example, state-2 page table tree) so that data in a physical memory as a data reference destination of the guest OS is changed from original data in the external memory 7 to data of a destination address in the internal memory.

In contrast, if the instruction execution unit 505 acquires data from the external memory 7 via the cache memory 507a, 507b and/or 508, verification is executed when data is copied from the external memory 7 to the cache memory 507a, 507b and/or 508, without changing the reference destination of the page entry.

The guest OS does not have to recognize change of the reference destination. Accordingly, even when the verification according to the present embodiment is introduced, the guest OS does not have to be changed, and hence the transparency of the guest OS can be obtained.

To prevent falsification, detection of reference to the external memory 7, execution of verification, copying of verified data to the secure internal memory 8, and change of a reference destination are needed. When a hardware cache is used, change of a reference destination corresponding to reading to the cache memory 508 is executed by a dedicated hardware mechanism without any software, which guarantees address transparency to the guest OS. In contrast, in verification using firmware, an allocated destination of verified data differs from an address of original data. Since thus, the guest OS must be changed unless change of a reference destination is hidden from the guest OS in some way. Namely, address transparency to the guest OS is not guaranteed.

In order to protect verified data from an attack, such as falsification, and to hide copying of the data to the internal memory 8 from the guest OS, the present embodiment uses a virtualization assisting mechanism in which two-stage address translation is performed, whereby the address transparency to the guest OS is realized by changing a data reference destination in the secure page table tree 121 after writing data from the external memory 7 to the internal memory 8.

Further, in the present embodiment, reference to non-verified data is detected. Then, in the present embodiment, an entry in the secure page table tree 121 is set "invalid" in an initial state, and the entry in the secure page table tree 121 is set "valid" when verification and reading-in of a page table or data corresponding to the entry is succeeded. This enables a non-read page table or non-read data to be efficiently detected using the address translation mechanism as general-purpose hardware.

The second point of the present embodiment will then be described.

The second point relates to a technique of matching the hierarchical structure of the secure page table tree 121 with that of the secure verifier tree 122. In the present embodiment, to enable verification of large-scale data, a state of writing from the external memory 7 to the internal memory 8 is managed. In the present embodiment, to realize transparent falsification verification by firmware processing, the address translation mechanism is used. When an operation of the address translation mechanism is interrupted, and such an illegal operation as in which the external memory 7 is erroneously accessed instead of access to the internal memory 8 is performed, the above-described verification and protection of reading data cannot correctly be executed. In view of this, in the present embodiment, the operation of the address translation mechanism is protected from an attack.

The address translation mechanism executes referring to a page table, and address translation. The page table is provided in the internal memory 8, and is definition information for translating a virtual address into a physical address. When the address space is enlarged, a large memory size is needed for storing a page table. For instance, when entire address space of one page table is simply stored, a memory size of 2 gigabytes is needed, assuming that a memory of one terabytes should be protected. Then, simply securing the address space of each page table in a physical memory in a fixed manner imposes a heavy load on the information processing device. There are two methods for reducing the address space of a page table. In a first method, page tables are hierarchized, the resultant hierarchical page tables in the internal memory 8 are referred to, and each page table itself is set as a paging target. A second method relates to hierarchization in the first method. In the second method, a table definition state of a portion in the memory space in the internal memory 8, to which no reference is needed, is maintained undefined, and a discontinuous memory space definition is permitted to thereby reduce the data amount of a table.

The address translation mechanism is a general-purpose mechanism employed in many processors. However, unlimited permission of paging or undefined state of a page table may induce attacks, such as replacement of a legitimate page table or data with an illegitimate page table or data during paging, or re-initialization after rewriting a defined page table or data to an undefined one. In particular, in a nonvolatile memory system, data of all memories other than the internal memory 8 may be falsified. Therefore, all page tables or data to be referred to by an MMU need to be arranged in the internal memory 8 after they are verified. As mentioned above, the data size of the page table is large. The internal memory 8 of the processor requires, for example, several hundreds kilobytes to several tens megabytes. Accordingly, paging processing including verification of page tables is needed. When page tables are hierarchized, state management associated with determination to determine up to a page table of which level, verification and reading-in is completed, and state management associated with the frequency of reference to each page table, are needed.

Further, for verification processing of each page table or data, the internal memory 8 of a limited capacitance must be used as a work area. It is possible to use, as a simple verification method, a method of providing a verifier dedicated to a page table aside from a verifier for data. However, the hierarchical page tables are defined based on a reference relationship on the memory, and are not always allocated in a continuous address area. For instance, in view of a specification, it is possible that a first entry of a page table is located in a position with a lowest address number in an address space, a second entry is located in a position with a highest address number, and the first and second entries have a reference relationship. It is inefficient to apply, to a discontinuous page table, verifiers stored in a continuous address area. In addition, when the verifiers have a hierarchical structure like the page tables, it is necessary to detect up to what stage of the verifiers verification is completed, and to perform state management for reusing verified ones of the verifiers.

In view of the above, in the present embodiment, the hierarchical structure of the page tables are made to match the hierarchical structure of the verifiers as the second point. By matching the hierarchical structure of the page tables with that of the verifiers as the second point, a page table and a verifier corresponding thereto are protected by another verifier. In the present embodiment, since the page tables match in hierarchical structure with the verifiers, a read-in state and a verification state of the page tables and the verifiers are managed in common, thereby reducing a processing load required for data management of a hierarchical structure. The information processing device 500 efficiently allocates verifiers to widely and discontinuously defined address areas, and manages them in security.

For instance, the three-stage secure page table tree 121, which stores 512 entries in one page table, has a three-stage graph structure having 512 branches. The secure verifier tree 122 corresponding to the secure page table tree 121 is made to have the same graph structure as the secure page table tree 121, i.e., has a three-stage graph structure having 512 branches, thereby matching both the table trees in structure. As a result, the secure page table tree 121 and the secure verifier tree 122 match each other in the unit of management for a reading-in state and a verification state.

In processing of a VMM, if reference, by the external memory 7, to not-read page table or data in the internal memory 8, and reference, by the external memory 7, to not-read verifier in the internal memory 8, are detected separately, switching from a guest OS to the VMM is performed whenever reference to a page table or data and reference to a verifier occur, which increases a switching overhead. In the present embodiment, the page table and the verifier are matched in hierarchical structure, whereby reference to two types of control data, i.e., a non-read page table and a non-read verifier, is simultaneously detected. This control reduces the number of times of switching from a guest OS to the secure VMM 68, and hence reduces the processing load.

The third point of the first embodiment will now be described.

An excessive number of verification inevitably increases the overhead, and hence the number of verification is reduced in the present embodiment.

When tree verification performed page-by-page is executed on all protection data, the number of paging operations to the internal memory 8 increases in accordance with an increase in the data area to be accessed, thereby increasing the number of verification. The tree verification is verification based on the secure verifier tree 122. In the present embodiment, the load of verification processing is reduced by matching the page table tree 9 with the verifier tree 10 in hierarchical structure and matching the secure page table tree 121 with the secure verifier tree 122 in hierarchical structure. Further, in the present embodiment, the overhead due to verification per one instruction (hereinafter, referred to as verification overhead) is reduced. When the scale of the information processing device 500 is large, an increase in data access area is inevitable, and hence an increase in the number of time of the tree verification is suppressed.

To suppress the increase in the number of time of the tree verification, part of data may be, for example, excluded from the tree verification and verified by another method. The data in the external memory 7 includes RO data and RW data. In the present embodiment, tree verification is executed on RW data to be updated, as a replay attack countermeasure. In contrast, RO data not to be updated can have sufficient protection strength even by simple verification, and is therefore excluded from the tree verification. The instruction execution unit 505 uses the RO data, excluded from the tree verification, via the cache memory 507a, 507b and/or 508. As a result, RO data that occupies a greater part of the OS data is excluded from the internal memory 8, and the number of times of the tree verification can be significantly reduced. The OS data may be switched in property with time between RO data and RW data, and hence it is necessary to also take replay attack countermeasures on the RO data. In general, to exclude replay attacks, it is necessary to generate a verifier using a value (anti-replay attack information) unknown to attackers and changed whenever data update is performed. In the tree verification of the present embodiment, verifiers each generated based on the anti-replay attack information are imparted for respective page tables to match the page tables with the verifiers in hierarchical structure, thereby reducing the amount of data needed for verification and suppressing the verification overhead. However, if the anti-replay attack information is imparted for the simple verification performed via the cache memory 507a, 507b and/or 508, a problem may occur in storage place and management method for the verifiers, which will cause a greater amount of verification overhead than the verification overhead occurring when all data is subjected to the tree verification. To avoid this, in the present embodiment, integrity protection of the data in the external memory 7 is realized by executing the simple verification in cooperation with the tree verification only on RO data via cache memory 507a, 507b and/or 508. In other words, in the present embodiment, the verifier tree 10 for all data exists in a form that matches the page table tree 9. The RW data is verified by the tree verification via the internal memory 8. The RO data is verified by verifiers, which are effective only to the RO data, via the cache memory 507a, 507b and/or 508.

In the present embodiment, for both the RO data and RW data, verifiers are generated based on the anti-replay attack information imparted to each page protected by the tree verification. The verifiers for the RW data exist page-by-page. The verifiers for the RO data exist cache-line-by-cache-line. The RO data that is not updated is verified cache-line-by-cache-line. In other words, in the present embodiment, certain data is verified cache-line-by-cache-line during RO access, and is verified and updated page-by-page during RW access.

A description will be given of how the use of two types of data—RW data and RO data—contributes to the enhancement of the performance of the information processing device 500. In the cache-line verification of RO data, an initial cost for calculating a large number of verifiers respectively corresponding to cache lines is needed. However, in exchange of this initial cost, the cache-line verification can be executed faster than the verification performed page-by-page when reading and writing of RO data repeatedly occur. In this regard, however, another initial cost is necessary for re-calculating verifiers corresponding to the cache lines included in each page, if RO data in each page is frequently rewritten. Accordingly, there is a case where verification using one verifier per each page is more advantageous than verification on the cache-memory basis. In a typical information processing device, instruction data is little rewritten, and a large number of references are made thereto. Therefore, overhead due to frequent reference to RO data is suppressed by treating the instruction data as RO data, although some initial cost is required for the instruction data.

Further, since in the present embodiment, a unit of access to RO data is reduced, enhancement of data use efficiency per verification can be expected. In general, if the unit of access is smaller, useless reading less occurs and hence the data use efficiency per one access is higher. A similar description also applies to integrity verification processing. Namely, by verifying only data of small units, occurrence of verification overhead due to useless verification can be suppressed.

(Two-Stage Address Translation)

Figure 3:
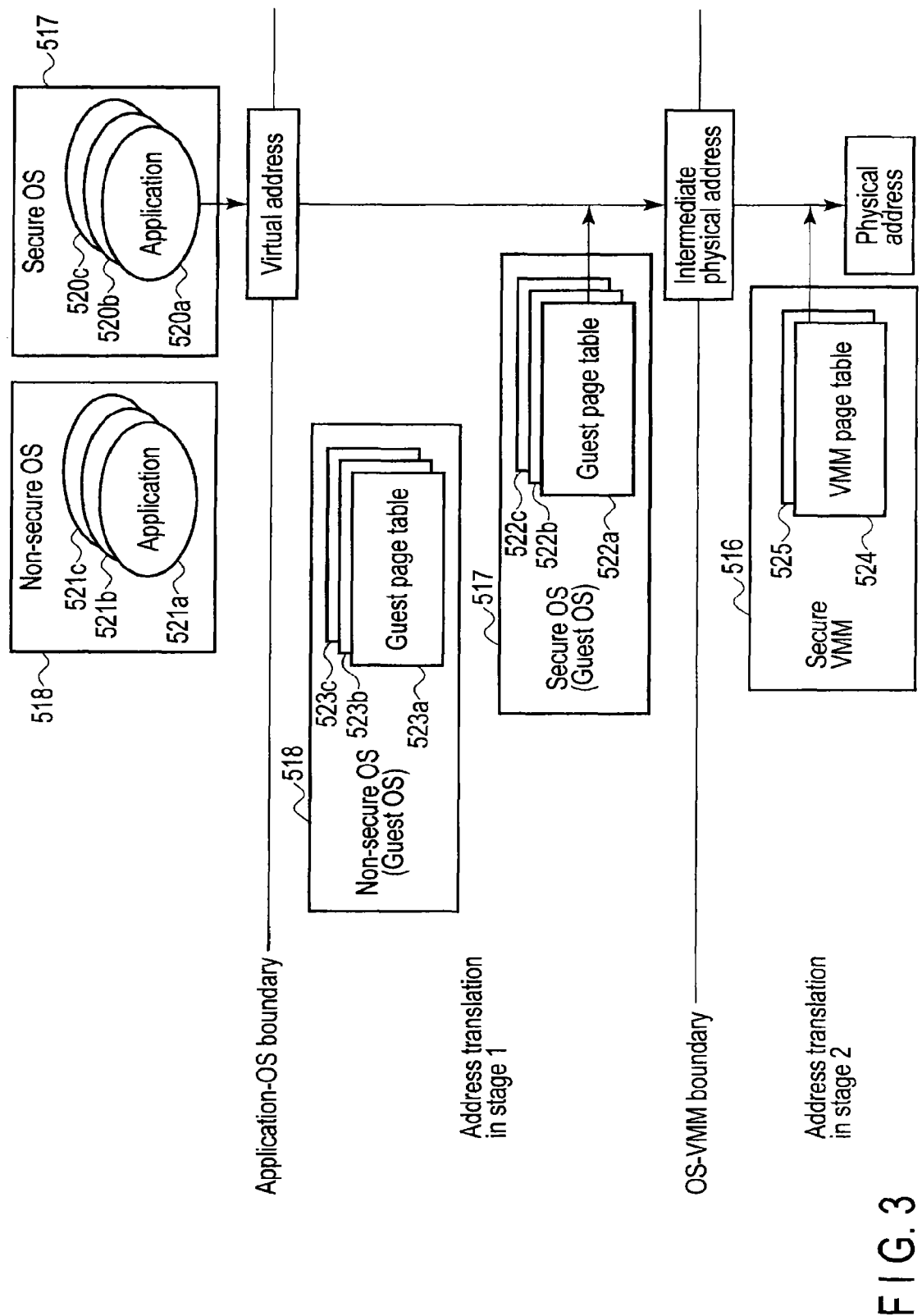
FIG. 3 is a block diagram showing an example of a configuration for executing two-stage address translation.

FIG. 3 is a block diagram showing an example of a structure for executing two-stage address translation.

Applications 520a to 520c are executed on the secure OS 517, and applications 521a to 521c are executed on the non-secure OS 518.

Guest page tables 522a to 522c of the secure OS 517 define translation of the applications 520a to 520c from virtual addresses to intermediate physical addresses, respectively.

Based on the guest page tables 522a to 522c, the secure OS 517 translates virtual addresses to intermediate physical addresses.

Guest page tables 523a to 523c of the non-secure OS 518 define translation of the applications 521a to 521c from virtual addresses to intermediate physical addresses, respectively.

Based on the guest page tables 523a to 523c, the non-secure OS 518 translates the virtual addresses to the intermediate physical addresses.

A VMM page table 524 of the secure VMM 516 defines translation by the secure OS 517 from intermediate physical addresses to physical addresses.

A VMM page table 525 of the secure VMM 516 defines translation by the non-secure OS 518 from intermediate physical addresses to physical addresses.

Based on the VMM page tables 524 and 525, the secure VMM 516 translates the intermediate physical addresses to the physical addresses.

Only address translation based on the application 520a included in the applications 520a to 520c and 521a to 521c will now be described. However, address translation based on other applications 520a to 520c and 521a to 521c are performed in the same way.

In the two-stage address translation, firstly, in stage 1, address translation by the secure OS 517 is executed, and then in stage 2, address translation by the secure VMM 516 is executed. The secure OS 517 is a guest OS managed by the secure VMM 516. The application 520a controlled by the secure OS 517 is associated with the guest page table 522a.

The application 520a issues an instruction read request and a data access request as virtual addresses. The secure OS 517 translates a virtual address into an intermediate physical address, based on the definition of the guest page table 522a. A memory area for the intermediate physical address is allocated in advance to each guest OS by the secure VMM 516. Based on the definition of each guest page table, each guest OS allocates the allocated memory area to a currently operating application.

The secure VMM 516 translates an intermediate physical address into a physical address, based on the definition of the VMM page table 524 managed by the secure VMM 516. A request issued as the virtual address is processed using this physical address.

(Data Structure of Secure Page Table Tree 121)

FIG. 4 is a block diagram showing an example of a hardware structure for executing address translation and data reference, and a data structure of the secure page table tree 121.

The secure page table tree 121 shown in FIG. 4 has a virtual address space of, for example, 4 gigabytes. A data structure of the secure page table tree 121 is applicable to various architectures. In a particular architecture, page table size differs between stages 1 and 2 because of physical page expansion. However, in the present embodiment, a case where page tables of the same format are used between stages 1 and 2 will be described.

The processor 501 includes the MMU 506. The MMU 506 includes a register 526 designating a highest-level table of the secure table tree 121.

The register 526 designates the upper 20 bits of a highest-level page table T101, using a physical address. Lower 12 bits of a page table constituted in units of 4 kilobytes are omitted. The highest-level page table T101 indexed by the register 526 includes table entries E101-0 to E101-3. Each table entry is of 8 bytes, and has an index for a page table of a subsequent level, and a valid/invalid bit designating whether the page table of the subsequent level is valid or invalid.

Reference by each table entry to a page table of a subsequent level is performed using a pointer. Accordingly, page tables T101, T101-1 and T101-0 may be arranged in the memory in an arbitrary order. Similarly, the page tables of the same level, for example, tables T101-1 to T101-n (n is a natural number not less than 2) of level 2, may be arranged in the memory in an arbitrary order.

Table entries E101-1-0 to E101-1-511 in page table T101-1-0 refer to data B101-0-0 to B101-511-511.

Figure 5:
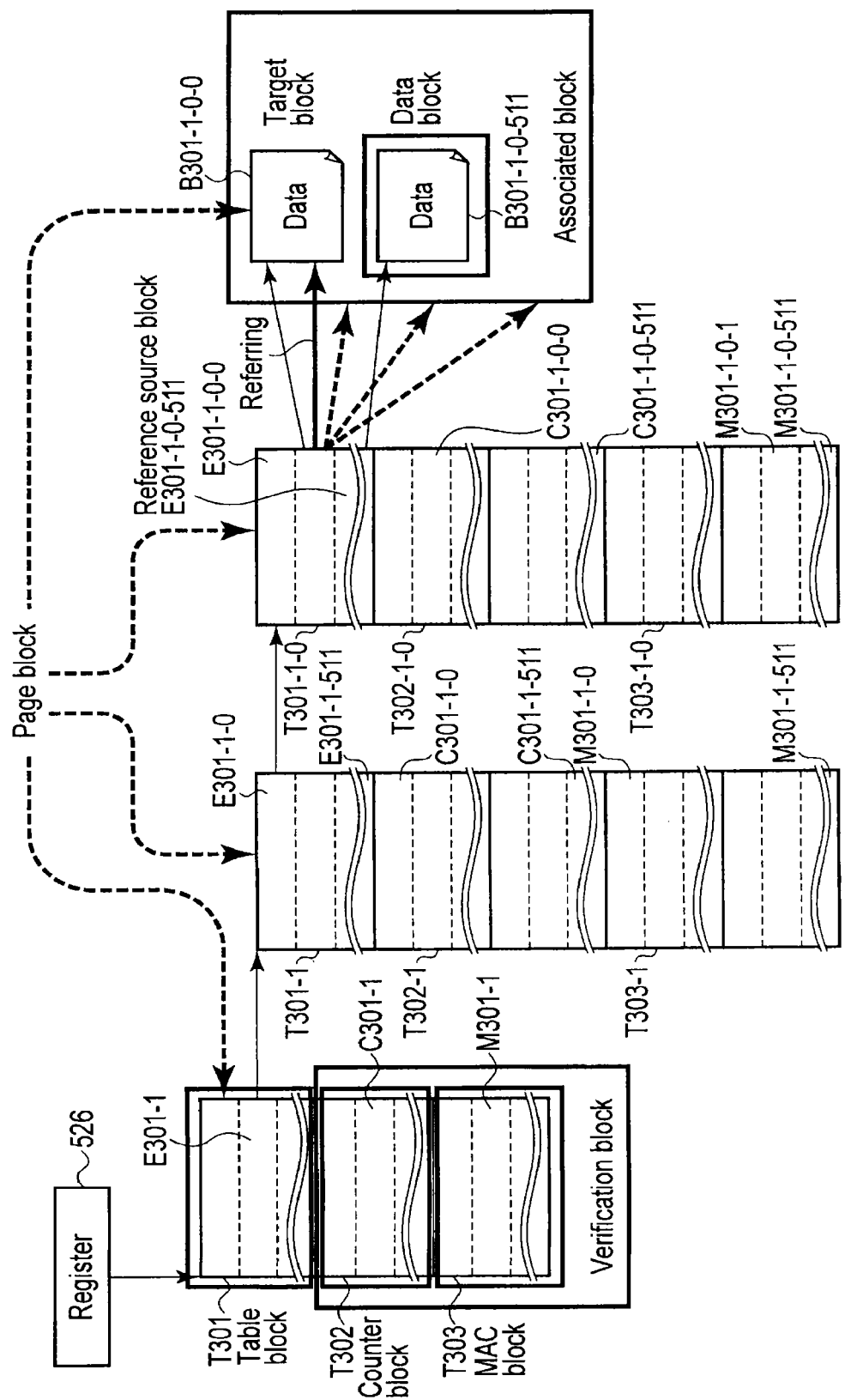
FIG. 5 is a conceptual diagram showing an example of definitions of blocks according to the second embodiment.

FIG. 5 is a conceptual diagram an example of definitions of blocks according to the present embodiment.

In the present embodiment, blocks corresponding to units of pages, which constitute the page table tree 9, verifier tree 10, secure page table tree 121 and secure verifier tree 122, are called page blocks. Both of a table block and a data block are called a page block.

A page table used for address resolution is called a table block.

Data to be actually read or written is called a data block.

A one-page block that can be referred to, using a certain table block, is called a target block.

All page blocks that can be referred to, using a certain table block, are called associated blocks.

A table block as the reference source of a certain page block is called a reference source block.

MAC values and counter values used for verification are collected in and managed by a respective corresponding table block.

MAC values and counter values used for verification are collected in and managed by a respective corresponding table block.

A block including collected MAC values is called a MAC block.

A block including collected counter values is called a counter block.

Combination of a MAC block and a counter block, which correspond to a certain page block, is called a verification block. If there is no counter block, a MAC block corresponding to a page block is set as a verification block.

A verification block corresponding to a certain page block has a format that enables the verification block itself to be associated with a reference source block corresponding to the page block.

(Details of Address Translation)

Referring to FIG. 4, a detailed description will be given of address translation, using, as an example, a case where a virtual address MA01=0x40000000 is issued.

An upper two bits of the virtual address MA01=0x40000000 are 01#b. A table entry E101-1 in the page table T101 indexed by the upper two bits 01#b of the virtual address MA01=0x40000000 is referred to.

Subsequently, address translation is advanced by a subsequent page table pointer included in table entry E101-1. When the virtual address MA01 is 0x40000000, the table entry selected in level 1 is E101-1, and the page table of level 2 referred to by table entry E101-1 is T101-1.

Subsequently, a table entry indexed by bits [29:21] of virtual address MA01 is selected from the page table T101-1 selected in level 2. Notation "bits [A:B]" in a virtual address is supposed to denote a range of from the $A^{th}$ bit of the virtual address to the $B^{th}$ bit. Since bits [29:21] of virtual address MA01 are all zeros, a table entry E101-1-0 is selected from the page table T101-1. A page table of level 3 referred to by the table entry E101-1-0 is T101-1-0.

From the page table T101-1-0 selected in level 3, a table entry indexed by bits [20:12] of the virtual address MA01 are selected. A table entry selected in level 3 is E101-1-0-0.

By the address translation as the above, an upper-level address of data B101-1-0-0 is finally determined.

(Virtualization of Page Table)

Virtualization of a page table will now be described in detail.

Firstly, a description will be given of a memory space and a page table size. The size of a page table that defines entire virtual address space of 4 gigabytes is 8 megabytes or more. Therefore, in order to fixedly allocate page tables to a physical memory, very large memory size is required. In view of this, the secure OS 517 and the secure VMM 516 virtualize page tables.

A page table virtualization is executed using valid/invalid bits in table entries. An example using the table entry E101-1 will be described. When a valid/invalid bit in table entry E101-1 designates an invalid state, the reference destination table T101-1 of the table entry E101-1 does not physically exist. Therefore, when access to this reference destination page is occurred, the MMU 506 generates a processor fault and executes processing of reading the reference destination page into a physical memory. Upon receipt of the fault, the secure OS 517 and the secure VMM 516 stores data corresponding to a reference destination table from the external device 503, such as a hard disk to a free page of the physical memory, thereby updating the valid/invalid bit in the table entry E101-1 to a valid state and resuming interrupted processing.

By executing the above control, the secure OS 517 and the secure VMM 516 can dynamically allocate a huge virtual address space to a physical memory, whereby a limited-capacity of a physical memory can be used effectively.

A structure and function of the secure page table tree 121 shown in FIG. 4 is applicable to various address translation mechanisms. As will be described later, in the present embodiment, a data structure necessary for memory integrity verification is used, and a memory integrity verification mechanism transparent to guest OSs is realized.

(Several Times of Reference to Page Tables Due to Virtualization and Address Translation Caches 509 and 510)

A description will now be given of several times of reference to a page table due to a virtualization and address translation caches 509 and 510.

In many types of architecture, the above-described page-table reference processing is executed by hardware such as an MMU. In a case of two-stage virtualization, the above-described address translation is executed twice, and access to a page table of a guest OS also becomes a target of address translation. For instance, when two-stage address translation is performed, reference to 4×3 page tables is needed at worst.

Whenever access to data is performed, such page-table reference is executed, and the address translation caches 509 and 510 are used for cache a result of translation in order to avoid an increase in overhead.

In the present embodiment, assume that a two-stage virtualization state by the address translation caches 509 and 510 is used.

When performing the two-stage address translation, the MMU 506 stores a guest-OS virtual address and a physical address, which is obtained after the virtual address is subjected twice to address translation, in the address translation caches 509 and 510 in association with each other. In this case, the virtual address is used as a tag. If at a time of subsequent data reference, a virtual address matches with the tag of the address translation cache 509 or 510, the MMU 506 can obtain a corresponding physical address (can realize address resolution) without performing address translation using the secure page table tree 121. When a plurality of secure page table trees 121 exist, the address translation caches 509 and 510 store identifiers for identifying the secure page table trees 121 in association with address translation information. For instance, as the identifiers, the highest-level addresses of the secure page table trees 121 may be used. As a result, even when a plurality of the same virtual addresses is occurred, a correct physical address can be obtained.

Since address translation is performed for each page, it is sufficient if the virtual and physical addresses have a bit which is upper than the page (12 bits), respectively.

Although the address translation cache 510 has the same function as the address translation cache 509, it is larger and slower than the address translation cache 509.

(Concept of Hierarchization)

A description will be given of a concept of hierarchization.

For instance, to increase a speed of data reference, cache memories are hierarchized in two levels. Further, for instance, a page table tree for address translation is hierarchized in three levels. For instance, virtualization control use a hierarchy of two levels, and address translation controlled by three-stage page tables is executed twice. Such cache-memory levels, a hierarchy of the page table, and times of address translation for a virtualization (stage number) are orthogonal concepts. Logically, arbitrary combination of the concepts is possible. For instance, cache memories may be hierarchized in three levels, each page table tree for address translation may be hierarchized in three levels, and address translation for virtualization may be executed in two stages.

FIG. 6 is a block diagram showing an example of a concept of a data acquisition and address translation by the information processing device 500 according to the present embodiment.

The instruction execution unit 505 acquires data from the internal memory 8 when the data is not stored in cache memory 507a, 507b or 507c.

The instruction execution unit 505 transmits a virtual address to the MMU 506 when address translation is necessary.

Based on address translation information stored in the address translation cache 509a or 509b, the MMU 506 executes two-stage address translation based on the secure page table tree 121, when a virtual address cannot be translated to a physical address.

In the address translation, when a page fault is occurred in a page table or data, this page table or data is copied from the external memory 7 to the internal memory 8, based on paging.

(Initial State of Information Processing Device 500)

Assuming that the above-described address translation and virtualization mechanism are used, an initial state of the information processing device 500 according to the present embodiment will be described.

In the initial state, the secure VMM 516, and the secure OS 517 and the non-secure OS 518, managed by the secure VMM 516, are in a dormant state. Namely, the secure VMM 516, the secure OS 517 and the non-secure OS 518 are retreated in the nonvolatile external memory 7.

In the present embodiment, key information and MAC value as a root of trust associated with integrity and secrecy of the secure VMM 516 and the secure OS 517 are stored in the processor 501. More specifically, the processor 501 includes a key storage unit 513. The key storage unit 513 stores a secret key and root verification information 13. When the processor 501 has no rewritable memory area, it may use a nonvolatile memory in an external trusted platform module (TPM) bound as a secure memory based on a fixed key stored in the key storage unit 513. Information of the TPM can be reliably associated with a particular processor by performing authentication between the TPM and the processor 501 of a host.

(Memory Map and Entities)

Figure 7:
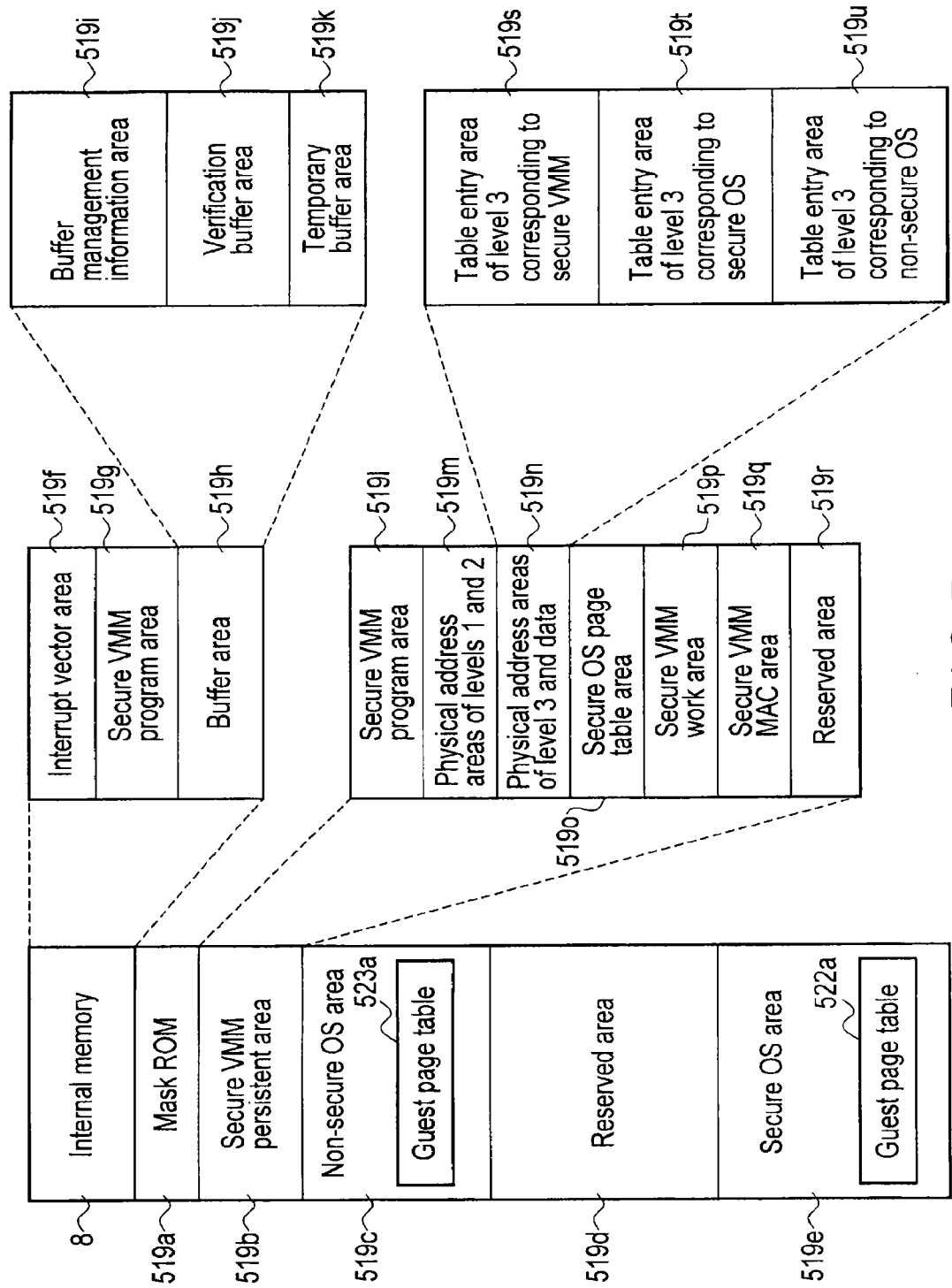
FIG. 7 is a view showing an example of a memory map according to the second embodiment.

FIG. 7 is a view showing an example of the memory map according to the present embodiment.

A memory in the information processing device 500 includes, for example, the internal memory 8, a mask read-only memory (ROM) 519a, a secure VMM persistent area 519b, a non-secure OS area 519c, a reserved area 519d and a secure OS area 519e. The internal memory 8 includes an interrupt vector area 519f, a secure VMM program area 519g, and a buffer area 519h. The buffer area 519h includes a buffer management information area 519i, a verification buffer area 519j and a temporary buffer area 519k. The secure VMM persistent area 519b, the non-secure OS area 519c, the reserved area 519d and the secure OS area 519e are allocated in the external memory 7.

The secure VMM persistent area 519b includes a secure VMM program area 519q, physical address areas 519m and 519n, a secure OS page table area 519o, a secure VMM working area 519p, a secure VMM MAC area 519q, and a reserved area 519r. The physical address area 519m stores page tables of levels 1 and 2, counter values and MAC values. The physical area 519n stores page tables of level 3, counter values and MAC values of the page tables. Further, the physical address area 519n stores data, and counter values and MAC values of the data. The physical address area 519n of level 3 includes an entry area 519s of level 3 corresponding to the secure VMM 516, an entry area 519t of level 3 corresponding to the secure OS 517, and an entry area 519u of level 3 corresponding to the non-secure OS 518.

The secure VMM 516 is booted securely. A kernel portion of the secure VMM 516 that executes verification is resident in a secure memory and protected from a falsification attack against the external memory 7. In the present embodiment, the internal memory 8 within the chip of the processor 501 is used as the secure memory. In the present embodiment, a memory verification function of the secure VMM 516 is realized by a memory verification program resident in the internal memory 8. A program, such as a program for realizing a device virtualization function, included in the secure VMM 516 and excluding the memory verification program, may be stored in the internal memory 8 in an on-demand manner by paging and verification described later, and executed.

The secure VMM 516 stored in the external memory 7 is verified at the time of, for example, activation, based on a program stored in the mask ROM 508, and is then stored in the program area 519g for the secure VMM 516 in the internal memory 8.

The verifier tree 10 is stored in the secure VMM persistent area 519b in the external memory 7. A portion of the verifier tree 10 verified by the secure VMM 516 is stored in the verification buffer area 519j in the buffer area 519h in the Internal memory 8.

The buffer area 519h is a data area used by the secure VMM 516. The buffer management information area 519i stores buffer management information, and a translation list used by the secure VMM 516. The verification buffer area 519j stores verification target data. An unused area in the verification buffer area 519j is called a verification buffer free area. The temporary buffer area 519k stores temporarily used data at a time of verification of the secure VMM 516. The buffer management information in the buffer area 519h designates a state of use of the buffer area 519h. For example, the buffer management information includes the type, amount, frequency of use, etc., of data stored or not stored.

The memory map further includes the storage area 519d of the non-secure OS 518, and the storage area 519e of the secure OS 517.

(Verification Calculation Method)

A method for verification calculation according to the present embodiment will be described.

A description will hereinafter be described, assuming that a page size is 4096 bytes, an address size is 8 bytes (64 bits), and a counter size is 16 bytes (128 bits). However, each size is not limited to the above, and may be set to other values.

Parameters used for the verification calculation will be described below.

Addr is a leading address in a verification target page table.

D[Addr] is data corresponding to i pages beginning with Addr, i being an arbitrary natural number.

Ctr[Addr] is a counter value associated with a page beginning with Addr.

K is a secret value used in common in the entire memory area, and is always stored within the processor 501.

Ek is a j-bit block ciphertext based on secret key K. In the present embodiment, it is assumed that encryption algorithm is AES128 where j=128. For instance, a block length is assumed to be 16 bytes (128 bits). However, encryption algorithm other than AES128 may be used.

"Padding" expresses padding.

For encryption calculation, notation "Y=MAC[Ek] (X)" is used. A MAC value of Y is calculated by applying fixed length CMAC algorithm of a common-key block base based on the secret key K to [X0, X1, . . . , Xn] obtained by dividing an input X into portions of a common-key block size. The data size of either of the MAC value Y and the secret key k is identical to the common-key block size. When the input X cannot be divided into portions of the common-key block size, Padding is used.

The MAC value Y of data D[Addr] corresponding to i pages beginning with the address Addr is calculated by the following expression, based on [D0, D1, D2 . . . D255i] obtained by dividing D[Addr] into portions of the common-key block size, and counter value Ctr[Addr] associated with D, address Addr and Padding:

Y=MAC[Ek]([D0, D1, . . . , D255i]||Ctr[Addr]||Addr||Padding)

D[Addr], Ctr[Addr] and Addr may be input in an arbitrary order. Padding may not be used if the input to the MAC function can be divided into portions of the common-key block size. The size of the data D[Addr] beginning with the address Addr may differ even in the same verifier tree, in accordance with a structure of a verifier tree.

Ctr[Addr] is used for version management of verification target data. Accordingly, when data is read in, Ctr[Addr] is used directly. When the data is rewritten, Ctr[Addr] is incremented and then used.

In the present embodiment, the address Addr will be described as an address for the external memory 7. However, the address Addr may be an intermediate address.

(Structure of Secure Verifier Tree 122)

A data structure of the secure verifier tree 122 will be described.

In the present embodiment, address resolution and data verification are simultaneously executed by matching a data structure of the secure page table tree 121 with a data structure of the secure verifier tree 122.

A tree structure (MAC tree structure) constituting page tables and MAC values will be described as a first data structure of the secure page table tree 121 and the secure verifier tree 122. A tree structure (MAC+counter structure) formed of page tables, MAC values and counter values for managing versions will be described as a second data structure of the secure page table tree 121 and the secure verifier tree 122.

In the present embodiment, it is supposed that one page is of 4 kilobytes, a counter value is of 8 bytes, and a MAC value is of 8 bytes. Further, although in the present embodiment, each table block and a corresponding counter block are allocated in a continuous address space, each table block and a corresponding counter block may be allocated in separated address spaces.

(MAC Tree Structure)

Figure 8:
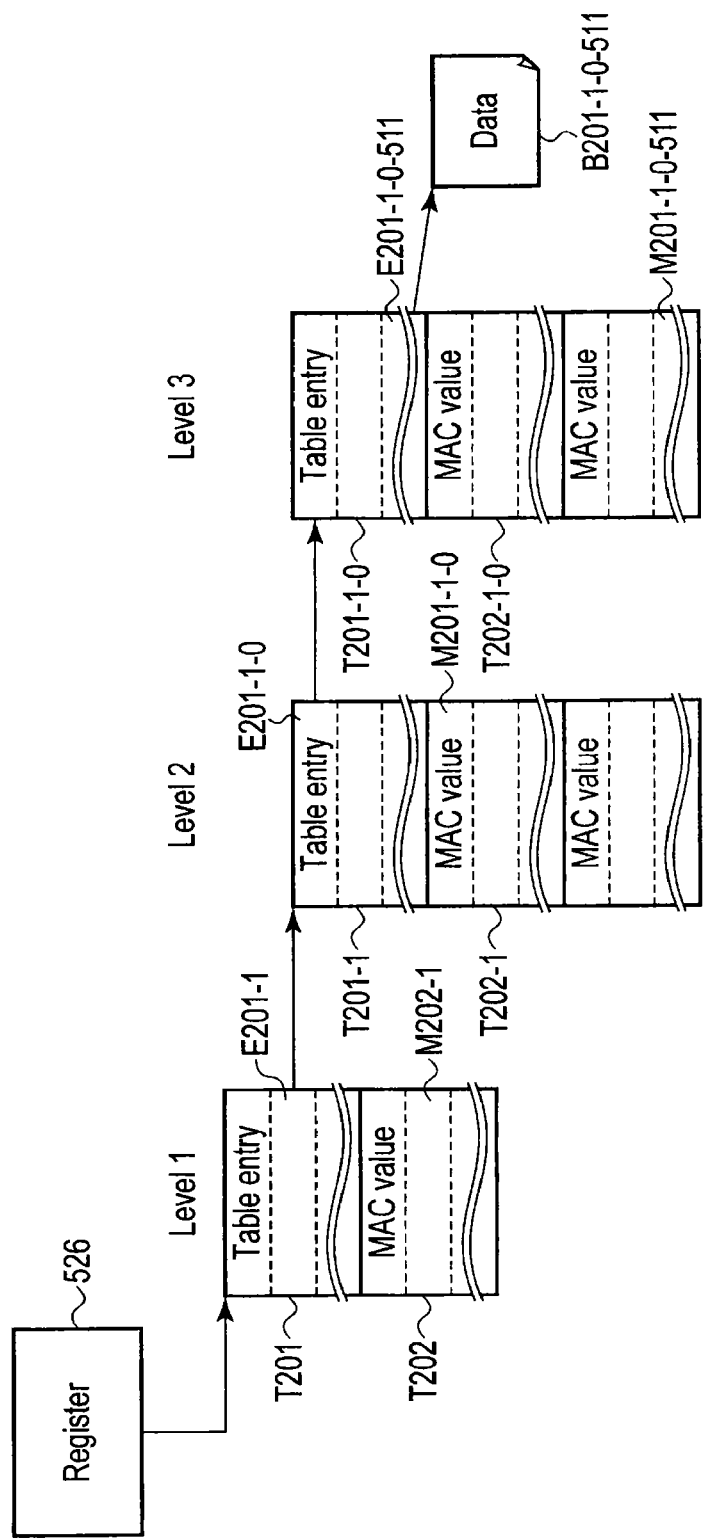
FIG. 8 is a data structure diagram showing an example of a MAC tree structure of a secure page table tree and secure verifier tree according to the second embodiment.

FIG. 8 is a data structure diagram showing an example of a MAC tree structure of the secure page table tree 121 and the secure verifier tree 122.

A MAC value of a respective data block is generated based on a content of the data block and its address, and the generated MAC value is managed by a MAC block associated with (related to) a reference source block that refers to the data block. As described above, the MAC block corresponds to a verification block.

On the other hand, a MAC value used for verification of a respective table block is generated based on a content of the table block, a content of a MAC block associated with the table block, and an address of the table block. The generated MAC value used for the verification of the table block is managed by a MAC block associated with a reference source block that refers to the table block, like the MAC value of the data block. By repeating this operation, a large-scale tree structure using one MAC block as a vertex is finally formed.

For instance, a MAC value M201-1-0-511 of data block B201-1-0-511 is generated based on a data block B201-1-0-511 and its address addr(B201-1-0-511).

Further, a MAC value M201-1-0 used for verification of a table block T201-1-0 is generated based on a table block T201-1-0, a MAC block T202-1-0 associated with a table block T201-1-0, and an address addr(T201-1-0) of the table block T201-1-0. A MAC value M201-1-0-511 of a data block B201-1-0-511 is included in a MAC block T202-1-0 associated with a reference source block T202-1-0, and a MAC value M201-1-0 of a table block T201-1-0 is included in a MAC block T202-1 associated with a reference source block T202-1.

To guarantee legitimacy in the MAC tree structure, a table block and a MAC block associated with the table block are simultaneously read-in and verified. For instance, when a table block T201-1-0 is read-in, a MAC block T202-1-0 is road in simultaneously with table block T201-1-0, and verification is executed using the table block T201-1-0 and MAC block T202-1-0. In the MAC tree structure, the legitimacy of a lower-level block (child block) is guaranteed by a MAC block associated with an upper-level block (parent block). Accordingly, when a lower-level block is verified, it is necessary that a MAC block associated with a corresponding upper-level block is already verified.

(MAC+Counter Structure)

Figure 9:
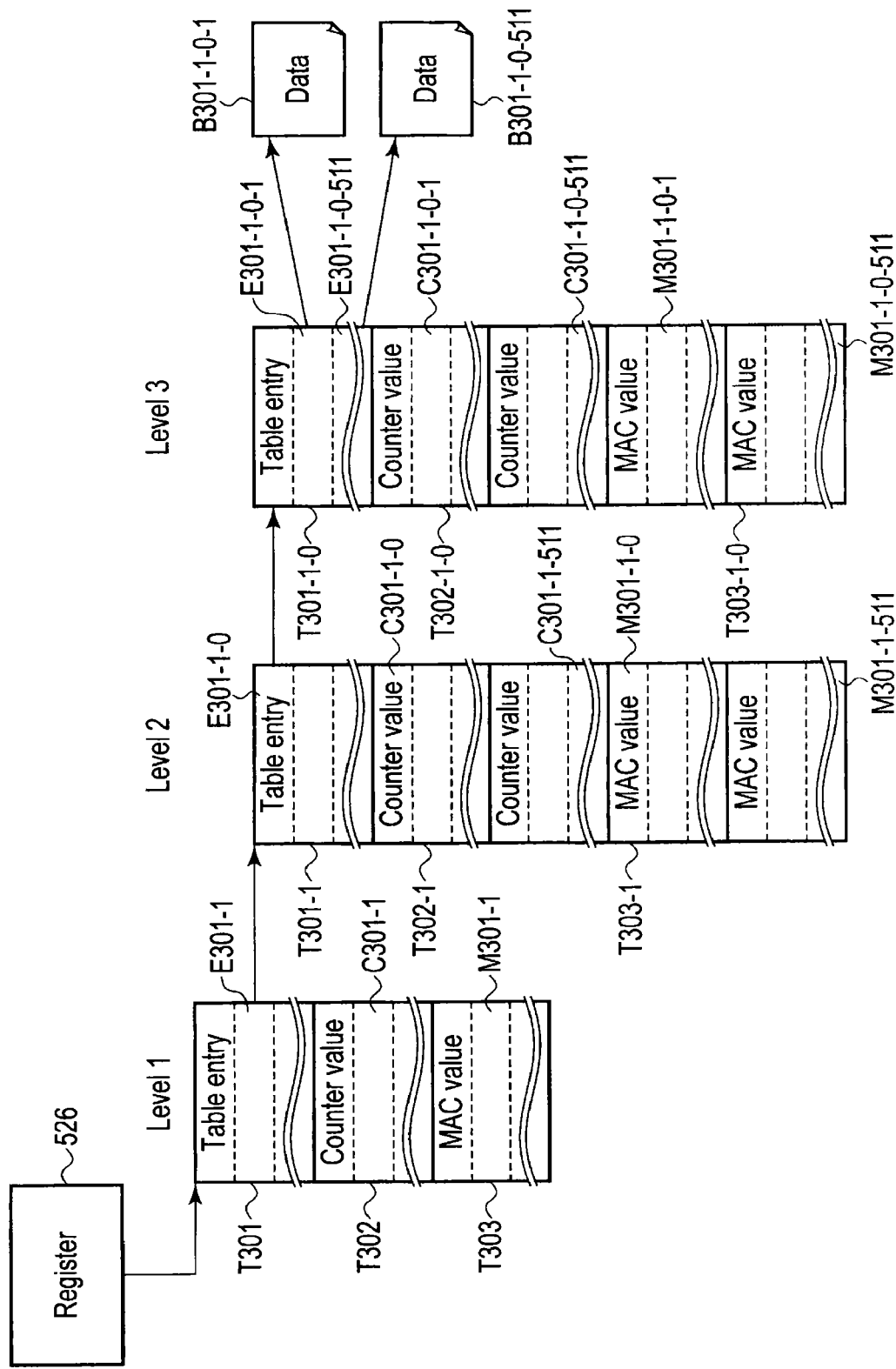
FIG. 9 is a data structure diagram showing an example of a MAC+counter structure of a secure page table tree and secure verifier tree according to the second embodiment.

FIG. 9 is a data structure diagram showing an example of a MAC+counter structure of the secure page table tree 121 and secure verifier tree 122 according to the present embodiment.

A counter value is set for each table entry, and is used for version management of a corresponding target block. It is sufficient if the counter value satisfies a condition that a duplication of values is avoided, and the counter value may be changed whenever data or a page table is updated. The counter value is not required to be counted up or down.

A MAC value of a respective data block is generated based on a content of a data block, and an allocated address and a counter value thereof. The used counter value and the generated MAC value of the data block are managed by a counter block and a MAC block associated with a corresponding reference source block. In contrast, a MAC value of a respective table block is generated based on the table block, a counter block associated with the table block, an allocated address of the table block, and a counter value of the table block. The used counter value and the generated MAC value of the table block are managed by a counter block and a MAC block associated with a corresponding reference source block. By repeating this operation, a small-scale tree data structure can be formed, in which version management is performed using a counter block included in a verification block associated with a one-level higher table block, and verification is executed using a MAC block.

For instance, a MAC value M301-1-0-511 of a data block B301-1-0-511 is generated based on the data block B301-1-0-511, an address addr(B301-1-0-511) and a counter value C301-1-0-511.

On the other hand, a MAC value M301-1-0 of a table block T301-1-0 is generated based on a table block T301-1-0, a counter block T302-1-0, an address addr(T301-1-0) and a counter value C301-1-0 of a table block T301-1-0.

A counter value C301-1-0-511 and MAC value M301-1-0-511 of data block B301-1-0-511 are included in a counter block T302-1-0 and MAC block T303-1-0 associated with a reference source block T301-1-0.

A counter value C301-1-0 and MAC value M301-1-0 of a table block T301-1-0 are included in a counter block T302-1 and MAC block T303-1 associated with a reference source block T301-1.

In the MAC+counter structure, when a table block is read-in, it is necessary to simultaneously read-in and verify the table block and a counter block associated with the table block. However, it is not necessary to simultaneously read-in or verify the table block and a MAC block associated with the table block. This is because to generate a correct MAC value for a certain page block, a counter value associated with the upper-level block of the page block is necessary, but a corresponding MAC block itself is irrelevant to a MAC value generation.

(Secure Page Table Tree 121 and Page Table Tree 9)

Figure 10:
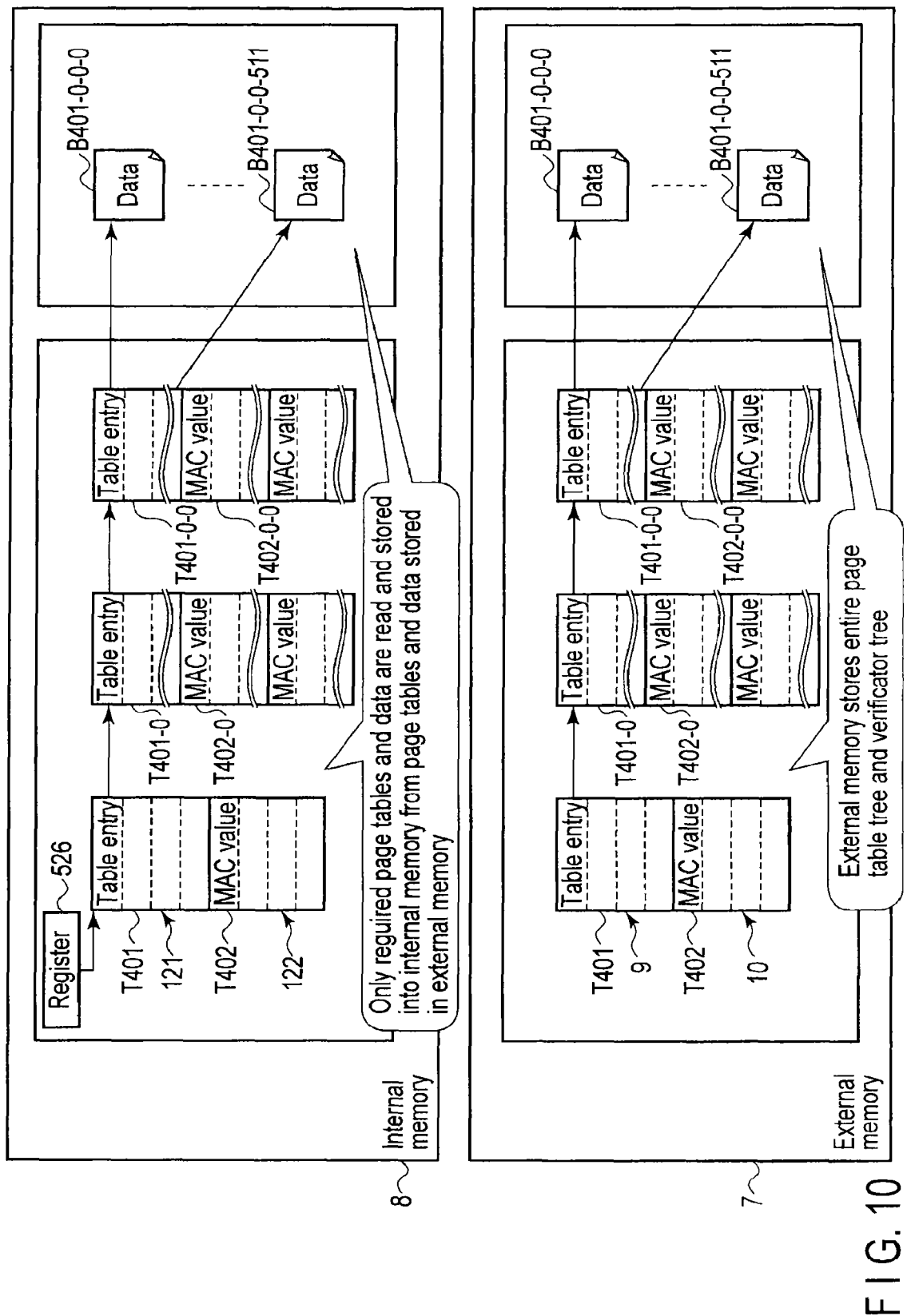
FIG. 10 is a data structure diagram showing an example of a relationship between a secure page table tree and page table tree according to the second embodiment.

FIG. 10 is a data structure diagram showing an example of a relationship between the secure page table tree 121 and page table tree 9.

The internal memory 8 stores the secure page table tree 121 used for address translation. The register 526 refers to a highest-level table T401 in the secure page table tree 121 in the internal memory 8. Based on a definition of the secure page table tree 121 to be referred to by the register 526, translation to a physical address is executed, and reference to a memory executed by the instruction execution unit 505.

Entire page table tree 9 as source data for generating the secure page table tree 121 in the internal memory 8 is stored in the external memory 7. In the present embodiment, the page table tree 9 stored in the external memory 7 is not directly referred to as an address translation table. The page table tree 9 does not have a special function except for that it is source data of the secure page table tree 121. Since it is possible that the page table tree 9 in the external memory 7 will be falsified, direct use of the page table tree 9 for address translation without verification is avoided in the present embodiment. Instead, the secure page table tree 121 stored in the internal memory 8 is used for address translation. The secure page table tree 121 is a subset of the page table tree 9.

The information processing device 500 according to the present embodiment copies, to the internal memory 8, necessary portions of the page table tree 9 and data stored in the external memory 7, and executes, on them, verification based on secure verifier tree 122, thereby adding the necessary portions to the secure page table tree 121 and the data already stored in the internal memory 8. If a page table or data that is not stored in the internal memory 8 is referred to, the information processing device 500 generates a page default to thereby cause the secure VMM 516 to the verify necessary portions of the page table tree 9 and data, and stores the necessary portions in the internal memory 8 if a verification result designates validity.

(Storage Destination and Address of Data Block, Structure of Page Table Tree 9 in External Memory 7)

The storage destination and address of a data block and the structure of the page table tree 9 in the external memory 7 will be described blow.

In the present embodiment, a page block stored in the external memory 7 is temporarily copied to the internal memory 8 protected from physical falsification, then processed and then returned to the external memory 7.

Because of this, the same page block may be stored in association with an address in the external memory 7 and with an address in the internal memory 8. For simplifying the description, an address of an area in the external memory 7 that stores a data block B401-0-0-511 is set to Eaddr(B401-0-0-511). An address of an area in the internal memory 8 that stores a data block B401-0-0-511 is set to Iaddr(B401-0-0-511). In a strict sense, an address in the internal memory 8 is dynamically allocated in the verification buffer area 519$j$. Accordingly, a value of Iaddr(B401-0-0-511) even for the same data block B401-0-0-511 varies whenever this block is read-in. However, in the following description given of a series of read-in and write-out operations, this change does not have to be considered, and then the address of the data block B401-0-0-511 in the internal memory 8 is simply expressed to as Iaddr(B401-0-0-511).

Each entry in a page table stored in the external memory 7 holds an address of a target block, such as Eaddr(B401-0-0-511), in the external memory 7. However, a page table entity recognized by the MMU 506 is not a page table stored in the external memory 7 but a page table stored in the internal memory 8 and already verified. For instance, in FIG. 10, an address of an entity referred to by the register 64 is Iaddr(T401). An address Eaddr(T401-0-0) in the external memory 7 to a page table T401-0-0 is set at the time of a page table construction, and address resolution can be executed by performing verification read-in in an order beginning with a highest-level page table T401. In contrast, an address Iaddr(T401-0-0) in the internal memory 8 to the page table T401-0-0 is determined when a memory is allocated in the temporary buffer area 519$k$ in the internal memory 8.

(Units of Verification of RO Data and RW Data)

In the present embodiment, RO data and RW data are verified by different levels of verification granularity and different verification methods. Accordingly, MAC calculation used for the RO data differs from that for the RW data. The RO data is verified cache-line-by-cache-line. Accordingly, MAC values are generated for the RO data cache-line-by-cache-line. The MAC value generated cache-line-by-cache-line is referred to as a cache-line MAC value. The RW data is verified page-by-page. The MAC value generated page-by-page is referred to as a cache-line MAC value. For instance, the number of cache-line MAC values corresponding to a certain page block is equal to the number of cache lines allocated to the page block. One block MAC value is allocated to each page block. Although a block MAC value always exists for data, a cache-line MAC value is not always necessary unless data is accessed as RO data.

(Tree Verification)

Tree verification on RW data will be described.

The tree verification of the present embodiment is executed, along with processing of reading a page block of RW data from the external memory 7, temporarily storing it in the internal memory 8 protected from physical falsification, executing processing therein, and transferring the processed page block from the internal memory 8 to the original external memory 7. The tree verification is executed based on the secure page table tree 121 comprehensively managed by the secure verifier tree 122, and anti-replay attack information as a reference destination of data, when the secure VMM 516 copies the data from the external memory 7 to the internal memory 8, or writes the data from the internal memory 8 to the external memory 7. The anti-replay attack information may be any information that cannot be falsified by an attacker and is updated whenever data is updated. In the secure verifier tree 122, the anti-replay attack information may be, for example, the MAC values of all page blocks in the MAC tree structure, or counter values in the MAC+tree structure. As described above, the data structure in which the secure page table tree 121 is verified using the MAC values of the secure verifier tree 122 is called the MAC tree structure. Further, the data structure in which the secure page table tree 121 is verified using the MAC values and counter values of the secure verifier tree 122 is called the MAC+tree.

The tree verification is executed by generating a page fault for data that does not exist in the internal memory 8 at the time of address resolution processing. The page fault is realized by presetting a table entry invalid, and verification is executed page-by-page using the corresponding block MAC value.

(Description of MAC Comparison Verification)

MAC comparison verification on RO data, which is regarded as simple verification, will now be described. The simple verification means, for example, a method of detecting data falsification by comparing a pre-generated MAC value with a MAC value generated during data reading, and the pre-generated MAC value is not especially protected.

The cache-line MAC value used for MAC comparison verification is generated using anti-replay attack information of the secure verifier tree 122 belonging to the lowest-level page table used for address resolution, and is stored in the external memory 7. Since the anti-replay attack information corresponding to RO data is stored in the internal memory 8, regarded as already verified data, at the time of address resolution processing of the RO data, and cannot be falsified by an attacker.

The MAC comparison verification is executed on data that is set to be subjected to the verification, when this data is read from the external memory 7 due to cache miss. Whether MAC comparison verification is needed is determined when address resolution processing is completed, and the verification is executed using dedicated hardware.

(Management of Verification State by MMU 506)

In the present embodiment, it is necessary to manage the state of verification to avoid duplicate verification, since access right, i.e., timing of verification, differs between RO access and RW access. In the present embodiment, the MMU 506 manages the verification state.

If the MMU 506 accesses an invalid table entry during address resolution processing, it checks an access right in the invalid table entry. If the checked access right designates RW access, the MMU 506 generates a page fault to execute tree verification, while if the checked access right designates RO access, the MMU 506 skips a page fault to avoid the tree verification.

If the RO data whose tree verification was avoided is cache-filled from the external memory 7 into the cache memory 508, the MMU 506 executes MAC comparison verification. In contrast, the MMU 506 transmits, to the instruction execution unit 505 without passing the cache memory 508, the data stored in the internal memory 8 by the tree verification. Accordingly, no MAC comparison verification is executed if tree verification is not avoided.

Since the MMU 506 executes the above-mentioned control, occurrence of two types of verification is prevented.

(Management Mechanism for Cache-Line MAC Values)

In the present embodiment, for verification, management of cache-line MAC values for verifying RO data is needed in addition to the management of the secure verifier tree 122. In the present embodiment, a mechanism for managing the cache-line MAC values is referred to as a cache-line MAC management mechanism. In general, since data of a cache-line size is collectively managed on a page-size basis, the cache-line MAC values are also managed on a page-size basis. A block in which cache-line MAC values are collected into a page size is referred to as a cache-line MAC block.

A first example of a method of managing cache-line MAC blocks is a page-table type management method in which a cache-line MAC block is managed along with a reference-source page table of a page block corresponding to the cache-line MAC block. A second example is an independent type management method in which dynamic management is performed like the management of a data block. The page-table type and the independent type differ from each other in memory arrangement and address management.

In the page-table type method, the cache-line MAC block is managed in the same memory space as the lowest-level table block. Therefore, although in the page-table type method, a fixedly allocated area in all memory space is large, the address of each cache-line MAC value can be solved using an offset from a corresponding table block.

For instance, in the page-table type method, the cache-line MAC block is located in physical address area 519*n* where a level-3 page table and a verification block belonging thereto are arranged.

In the independent type method, the cache-line MAC block is managed in the same memory space as a data block. Accordingly, in the independent type, dynamic memory allocation of cache-line MAC blocks is possible. However, to solve the address of each cache-line MAC block, it is necessary to employ another address solving means (such as an address translation table).

For instance, in the independent type, cache-line MAC blocks are arranged in secure OS area 519*e* where guest OS data is arranged.

In any of the above management methods, the method of generating cache-line MAC values themselves is the same, and each cache-line MAC value is generated based on the content and address of a corresponding cache line, and anti-replay attack information corresponding to a page block including the data of the corresponding cache line. Further, it is necessary to guarantee the integrity of the address of each cache-line MAC value, in order to prevent an attack of forging addresses. In general, this guarantee is realized by the tree verification.

In the present embodiment, even a management method other than the above-mentioned page-table type or independent type may be employed if the cache verification unit 514 acquires a cache-line MAC value during verification of RO data.

(Processing Up to Verification Processing)

Figure 12:
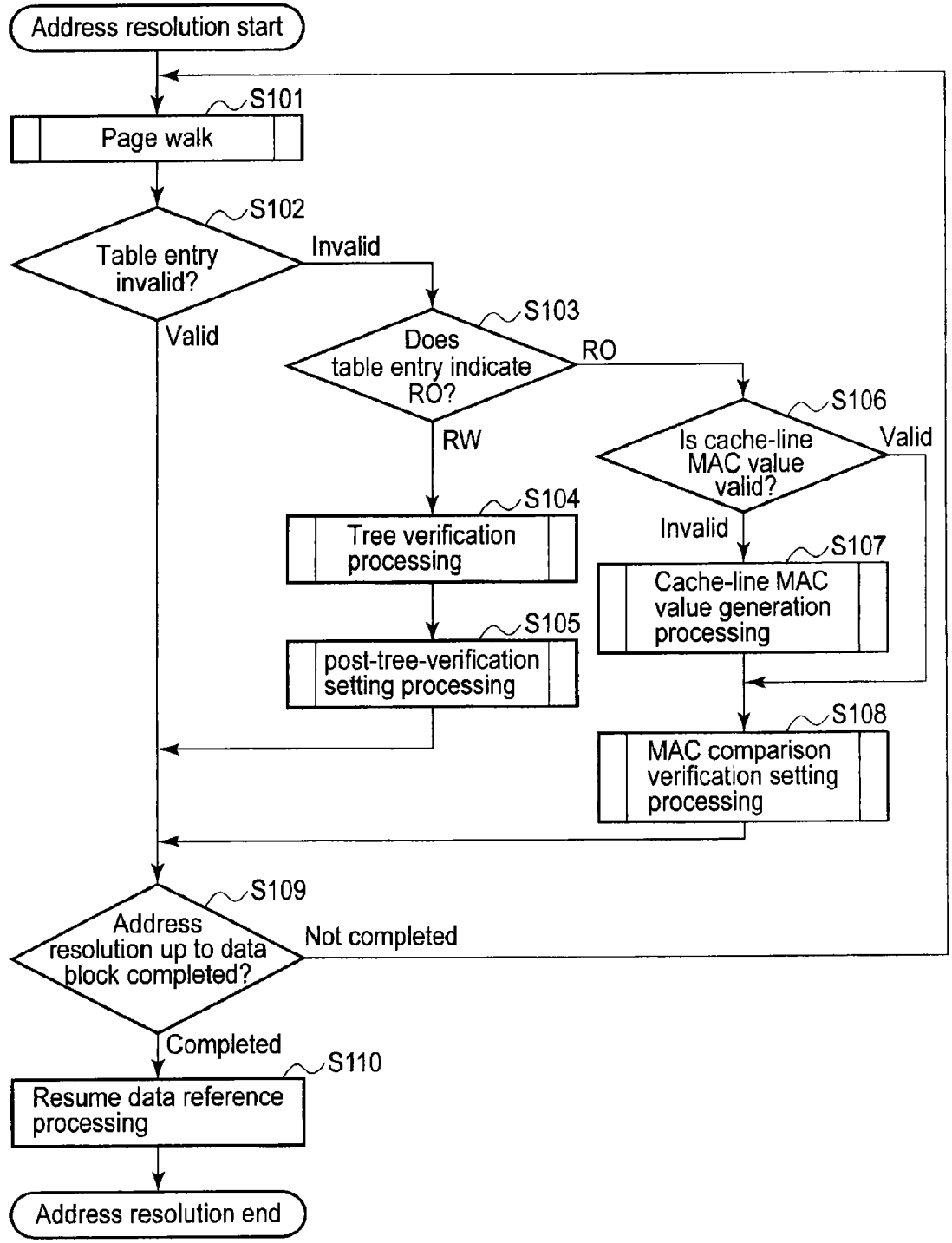
FIG. 12 is a flowchart showing an example of address resolution processing according to the second embodiment.
Figure 13:
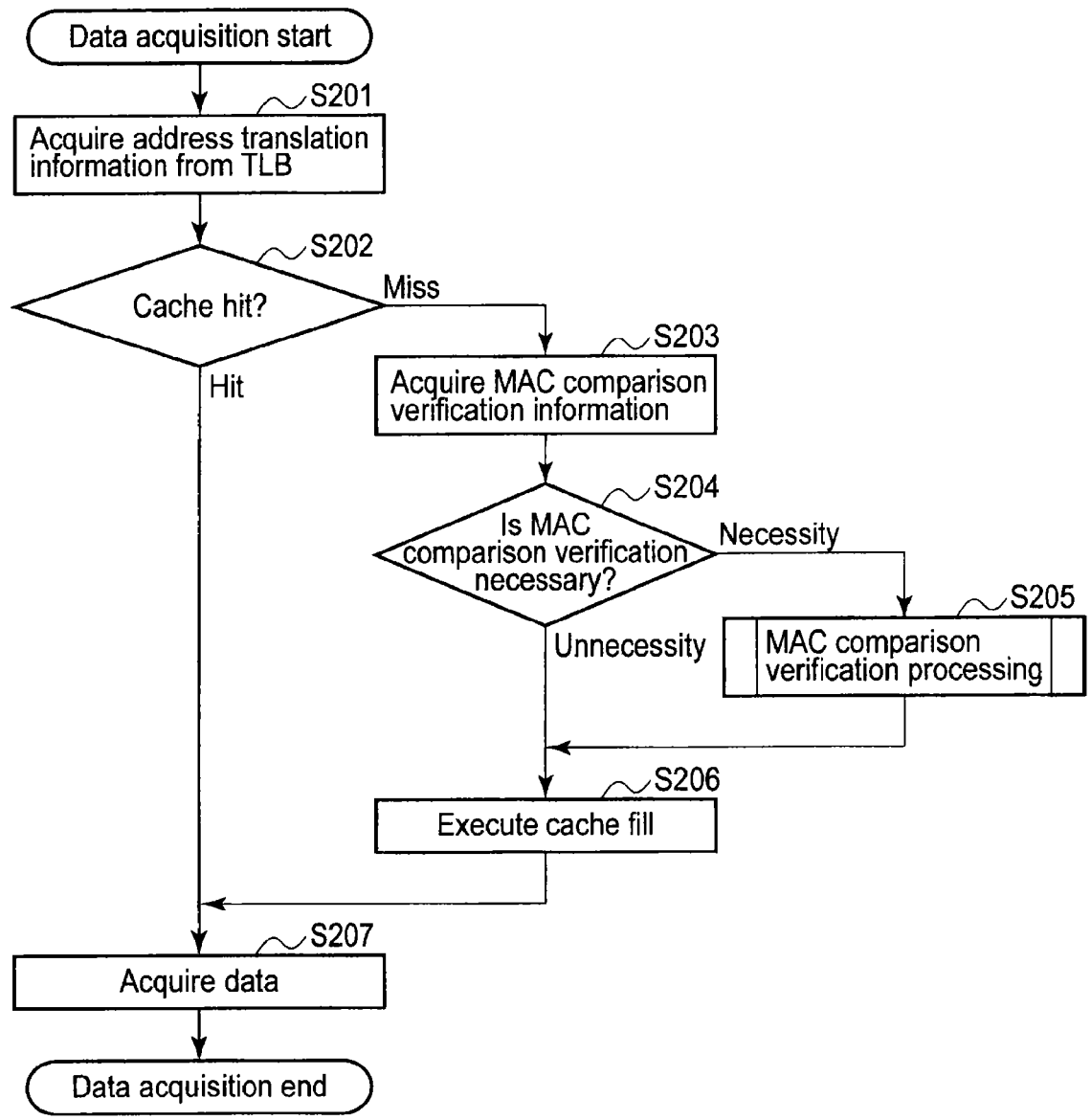
FIG. 13 is a flowchart showing an example of data acquisition processing according to the second embodiment.

Referring to FIGS. 11 to 13, a description will be given of processing performed until the occurrence of verification processing performed on RO data and RW according to the present embodiment. It is assumed that address translation performed later uses a stage-2 page table, and address translation using a stage-1 page table is already finished.

The data block below may be RO data or RW data. The table block below is set to RW data. However, even if the table block is RO data, it can be processed correctly.

Upon issue of a request to refer to RO data, an already tree-verified table block in the internal memory 8 is referred to, and a data block in the external memory 7 corresponding to the RO data is referred to via the cache memory 508.

FIG. 11 is a flowchart showing an example of data reference processing according to the present embodiment.

The instruction execution unit 505 issues a data reference request to the MMU 506 in step S001.

In step S002, the MMU 506 confirms whether the address translation cache 509 and/or 510 caches address translation information for translating virtual and physical addresses.

If the address translation information is cached in the address translation cache 509 and/or 510 (TLB hit), the processing proceeds step S006.

If the address translation information is not cached in the address translation cache 509 and/or 510 (TLB miss), the MMU 506 executes address resolution processing in step S003, and caches the resultant address translation information in the address translation cache 509 and/or 510 in step S004.

In step S005, the MMU 505 caches, in the address translation cache 509 and/or 510, MAC comparison verification information obtained by the address resolution processing. The MAC comparison verification information includes data designating whether MAC comparison verification is necessary (this data may hereinafter be referred to as "verification necessity/unnecessity designating information"), anti-replay attack information, etc.

In step S006, the MMU 506 executes data acquisition processing of acquiring data requested to be referred to, from physical addresses solved already.

FIG. 12 is a flowchart showing an example of address resolution processing according to the present embodiment.

The address resolution processing shown in FIG. 12 occurs during data reference processing.

In step S101, when address resolution processing is started, the MMU 506 executes address resolution using a page walk.

In step S102, the MMU 506 checks, during the page walk, whether a table entry designates a valid state.

If the table entry is valid, the table entry designates a valid state, the processing proceeds to steps S109.

In contrast, if the table entry is invalid, the MMU 506 checks an access right in the table entry in step S103.

If the table entry designates RW access, control is transferred from the MMU 506 to the secure VMM 516, and the secure VMM 516 executes tree verification in step S104. After finishing the tree verification, the secure VMM 516 validates the verified table entry invalid before the verification, whereby control is transferred from the secure VMM 516 to the MMU 506.

In step S105, the MMU 506 executes post-tree-verification setting processing, thereby setting data designating unnecessity of verification as the verification necessity/unnecessity designating information included in the MAC comparison verification information.

If in step S103, the table entry designates RO access, the MMU 506 checks in step S106 whether a cache-line MAC value is valid.

If the cache-line MAC value is valid, the processing proceeds to step S108.

In contrast, if the cache-line MAC value is invalid, the secure VMM 516 and the secure DMA controller 511 execute cache-line MAC value generation processing in step S107.

In step S108, the MMU 506 executes MAC comparison verification setting processing. In the MAC comparison verification setting processing, the MMU 506 validates the table entry, sets anti-replay attack information as the MAC comparison verification information, and sets verification necessity as the verification necessity/unnecessity designating information.

In step S109, the MMU 506 checks whether address has been solved up to a data block.

If the address is not yet solved, the processing returns to step S101. As a result, the page walk is repeated until address is solved.

If the address has been solved, the MMU 506 resumes data reference processing in step S110, thereby finishing the address resolution processing.

As described above, the tree verification processing is sequentially executed by the secure VMM 516 during address resolution processing based on a page fault of the stage-2 page table tree.

FIG. 13 is a flowchart showing an example of data acquisition processing according to the present embodiment. The data acquisition processing as shown in FIG. 13 occurs during data reference processing.

The data acquisition processing is executed for instruction execution unit 505 to acquire data. If data is cached in cache memory 507a and/or 507b, the instruction execution unit 505 acquires the data from cache memory 507a and/or 507b. If data is not cached in cache memory 507a or 507b, the instruction execution unit 505 checks whether data is cached in the cache memory 508. If no data is cached in the cache memory 508, the instruction execution unit 505 acquires RW data from the internal memory 8, and RO data from the external memory 7 via the cache memory 508.

Alternatively, in the present embodiment, if data is not cached in cache memory 507a or 507b, the instruction execution unit 505 may acquire RW data from the internal memory 8, and RO data from the cache memory 508.

The instruction execution unit 505 starts data acquisition processing, and acquires, in step S201, address translation information associated with the physical address of a data acquisition destination and a corresponding virtual address, based on the address translation cache 509 and/or 510.

In step S202, the instruction execution unit 505 confirms whether data corresponding to the acquisition destination address is cached in cache memory 507a, 507b and/or 508.

If the data corresponding to the acquisition destination address is cached in cache memory 507a, 507b and/or 508 (cache hit), the processing proceeds to step S207.

In contrast, if data corresponding to the acquisition destination address is not cached in cache memory 507a, 507b or 508 (cache miss), the cache verification unit 514 acquires MAC comparison verification information in step S203.

In step S204, the cache verification unit 514 checks whether verification should be performed, based on the verification necessity/unnecessity designating information.

If it is determined that no verification is necessary, the processing proceeds to step S206.

If it is determined that verification is necessary, the cache verification unit 514 executes MAC comparison verification processing in step S205. The MAC comparison verification will be described later in detail.

If no verification is necessary or if the MAC comparison verification processing has finished normally, the cache verification unit 514 executes cache fill in step S206 to read data from an area corresponding to the acquisition destination address into cache memory 507a, 507b and/or 508.

If in step S202, it is determined that the data corresponding to the acquisition destination address is cached in cache memory 507a, 507b and/or 508 (cache hit), or after the execution of cache fill in step S206, the instruction execution unit 505 acquires data from cache memory 507*a*, 507*b* and/or 508 in step S207, thereby finishing the data acquisition processing.

Different verification methods can be applied to the RO data and RW data, respectively, by managing RO data and RW data appropriately, by the MMU 506. An implementation of page walk, in which paging of the table block and the data block is executed simultaneously, may be employed. In this case, the number of times of transfer between the secure VMM 516 and the MMU 506 is reduced.

(Structure of Information Processing Device 500)

Figure 14:
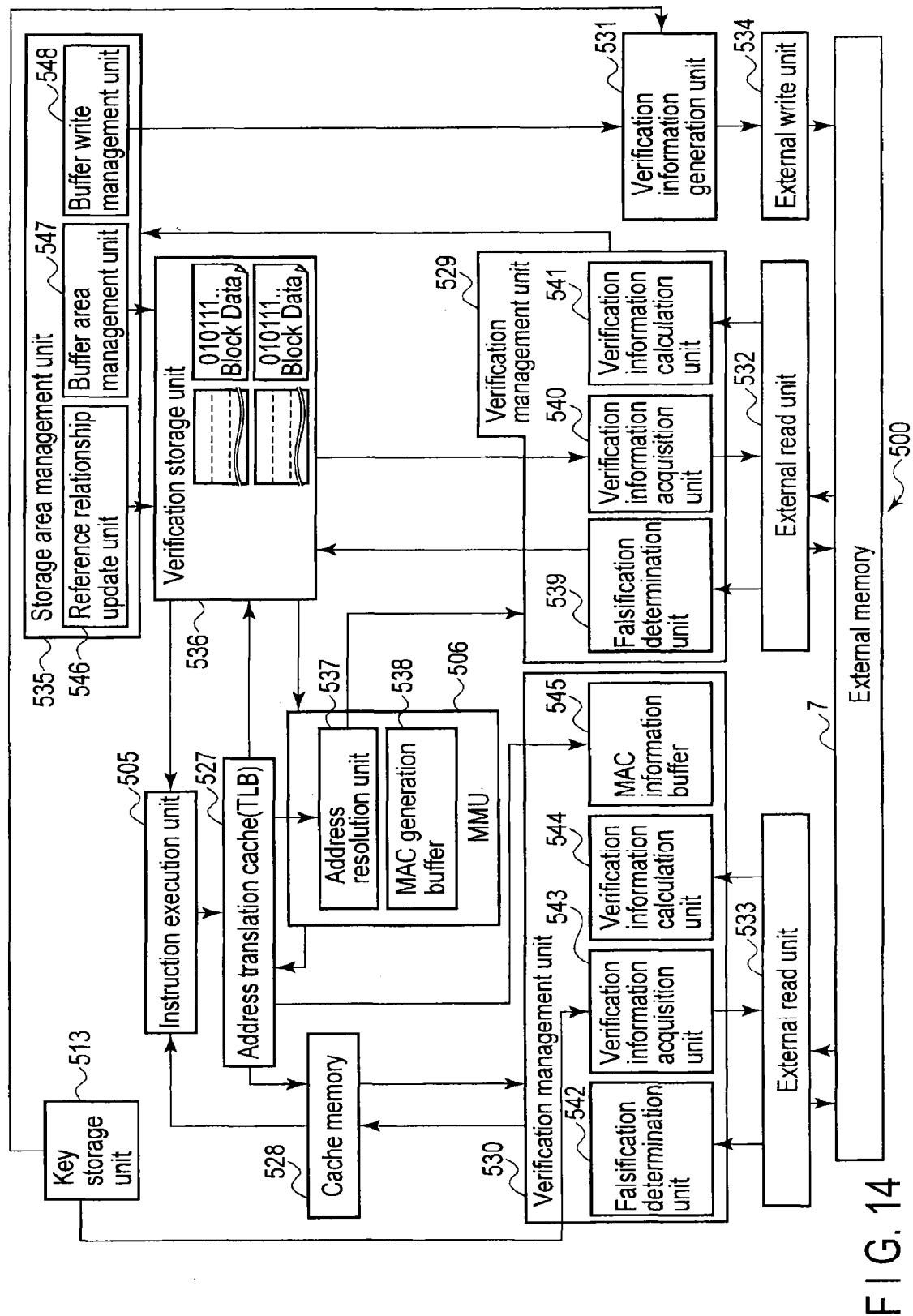
FIG. 14 is a block diagram showing an example of a structure of the information processing device according to the second embodiment.

FIG. 14 is a block diagram showing an example of a structure of the information processing device 500 of the present embodiment.

The information processing device 500 includes the instruction execution unit 505, an address translation cache 527, the MMU 506, a cache memory 528, verification management units 529 and 530, a verification information generation unit 531, external read units 532 and 533, an external write unit 534, a storage area management unit 535, a verification storage unit 536, the key storage unit 513 and the external memory 7.

The MMU 506 includes an address resolution unit 537 and a MAC generation buffer (MAC comparison verification information generation buffer) 538. The MMU 506 corresponds to the address translation unit 3 shown in FIG. 1.

The verification management unit 529 includes a falsification determination unit 539, a verification information acquisition unit 540 and a verification information calculation unit 541. The verification information calculation unit 541 corresponds to the verification calculation unit 4 of FIG. 1. The falsification determination unit 539 corresponds to the verification unit 5 of FIG. 1.

The verification management unit 530 includes a falsification determination unit 542, a verification information acquisition unit 543, a verification information calculation unit 544, and a MAC information buffer (MAC comparison verification information buffer) 545. The verification information calculation unit 544 corresponds to the verification calculation unit 42 of FIG. 1. The falsification determination unit 542 corresponds to the verification unit 43 of FIG. 1.

The storage area management unit 535 includes a reference relationship update unit (page table reference relationship update unit) 546, a buffer area management unit 547, and a buffer write management unit (verification buffer write management unit) 548. The reference relationship update unit 546 corresponds to the update unit 6 of FIG. 1. The buffer area management unit 547 and the buffer write management unit 548 correspond to the replacement management unit 40 of FIG. 1.

The address translation cache 527 corresponds to the above-described address translation caches 44, 509 and 510.

The cache memory 528 corresponds to cache memory 45, 597*a*, 507*b* and 508.

The verification information generation unit 531 corresponds to the verification calculation units 4 and 42 of FIG. 1.

The verification storage unit 536 corresponds to the internal memory 8.

The external read units 532 and 533 and the external write unit 534 correspond to the external input/output unit 2 of FIG. 1.

(Relationship Between Data Reference Processing and Structure of Information Processing Device 500)

A description will be given of the relationship between each structural element of FIG. 14 and the flowcharts of FIGS. 11 to 13.

The instruction execution unit 505 issues a data reference request in step S001, and inquires of the address translation cache 527 in step S002 whether the address translation cache 527 caches a physical address corresponding to the virtual address of a guest OS.

If the address translation cache 527 does not cache the physical address corresponding to the virtual address requested to be referred to, the address resolution unit 537 in the MMU 506 executes address resolution processing in step S003.

In address resolution processing, the MMU 506 executes a page walk in step S101, and checks, in step S102, a target table entry stored in the verification storage unit 536.

If the table entry is valid, the processing proceeds to steps S109. In contrast, if the table entry is invalid, the MMU 506 checks an access right of the table entry in step S103.

If the table entry designates RW access, the MMU 506 informs the verification management unit 529 of the result designating RW access. Upon receipt of the result, the verification management unit 529 executes tree verification processing on a page block to be referred to by the table entry, and reads data corresponding to the page block. After finishing the tree verification processing, the verification management unit 529 informs the reference relationship update unit 546 of this, and the reference relationship update unit 546 validates the currently invalid table entry. Subsequently, the verification management unit 529 determines that reading has been completed, and returns control to the MMU 506.

Upon receipt of a notification designating the completion of reading, the MMU 506 sets, in step S105, verification unnecessity as MAC comparison verification information in the MAC generation buffer 538, based on the post-tree-verification setting processing.

If the table entry designates RO access, the MMU 506 checks in step S106 whether the cache-line MAC value is valid.

If the cache-line MAC value is valid, the processing proceeds to step S108.

In contrast, if the cache-line MAC value is invalid, the MMU 506 executes cache-line MAC value generation processing in step S107, using the secure VMM 516 and the secure DMA controller 511 of FIG. 1.

In step S108, the MMU 506 validates the table entry, includes anti-replay attack information, acquired from the verification storage unit 536, in the MAC comparison verification information stored in the MAC generation buffer 538, and executes MAC comparison verification setting processing for setting a verification necessity as the verification necessity/unnecessity designating information.

In step S109, the MMU 506 checks whether address resolution processing has been completed up to a data block, thereby repeating the page walk of step S101 until address is solved.

After the address is solved, the MMU 506 resumes data reference processing in step S110, thereby finishing the address resolution processing.

If the table entry designates RO access, after the address resolution processing is completed, the verification management unit 529 and the storage area management unit 535 store page tables, already verified and needed for address resolution, in buffer area 519*h* dynamically secured in the verification storage unit 536. However, in this stage, data corresponding to the reference destination is not stored in the verification storage unit 536.

In step S004, the MMU 506 caches, in the address translation cache 527, address translation information as the result of the address resolution processing.

In step S005, the MMU 506 caches, in the address translation cache 527, MAC comparison verification information obtained by the address resolution processing.

If a physical address corresponding to a virtual address requested to be referred to is stored in the address translation cache 527, or if address resolution has been performed by address resolution processing, the instruction execution unit 505 acquires reference-requested data in step S006.

In step S201, the instruction execution unit 505 acquires the address of a data acquisition destination from the address translation cache 527.

The instruction execution unit 505 checks whether data corresponding to the address of the data acquisition destination is cached in the cache memory 528.

If data is cached in the cache memory 528, the processing proceeds to step S207.

If the cache memory 528 caches no data, it informs the verification management unit 530 of this. Upon receipt of the notification, the verification management unit 530 acquires MAC comparison verification information from the address translation cache 527 and stores it in the MAC information buffer 545 in step S203. In step S204, the verification management unit 530 checks the verification necessity/unnecessity designating information included in the MAC comparison verification information.

If the verification necessity/unnecessity designating information designates unnecessity of verification, the verification management unit 530 acquires data from the external memory 7 via the external read unit 533, and executes cache fill in step S206.

If the data designates necessity of verification, the verification management unit 530 executes MAC comparison verification processing in step S205, and executes cache fill on the verified data in step S206.

After finishing the cache fill processing, the instruction execution unit 505 acquires data in step S207.

(Tree Verification Processing)

Tree verification processing is executed on data page-by-page. If data causing a page fault is RW data, the secure VMM 516 reads the RW data from the external memory 7 into the internal memory 8, and executes tree verification on the RW data. In the tree verification processing, replacement processing and flush processing occur when necessary. The tree verification may be executed during the address resolution processing shown in FIG. 12.

FIG. 15 is a flowchart showing an example of tree verification processing according to the present embodiment.

In step S301, the secure VMM 516 starts verification processing of RW data, checks whether verification buffer area 519j in the internal memory 8 includes a free area. If verification buffer area 519j includes no free area, the secure VMM 516 executes replacement processing in step S302, thereby releasing an area.

Subsequently, in step S303, the secure VMM 516 copies to-be-verified data from the external memory 7 to the free area of verification buffer area 519j in the internal memory 8. At this time, the secure DMA controller 511 generates a MAC value corresponding to the read data, based on a MAC generation method defined by a MAC tree structure or a MAC+counter structure.

In step S304, the secure VMM 516 compares the generated MAC value with a corresponding MAC value stored in the external memory 7 to execute falsification verification.

In the falsification verification, if it is necessary to read a MAC value from the external memory 7, the secure VMM 516 reads, from the external memory 7, a MAC value corresponding to verification target data, and stores the read MAC value in temporary buffer area 519k in the internal memory 8. When using a MAC value stored in the internal memory 8, the secure VMM 516 reads a MAC value corresponding to verification target data from the internal memory 8, and stores the read MAC value in temporary buffer area 519k. Subsequently, the secure VMM 516 compares the MAC value stored in temporary buffer area 519k with the MAC value generated by the secure VMM 516. The MAC value read from the external memory 7 does not have to be newly verified, since the integrity of the read MAC value is guaranteed by the anti-replay attack information of an upper-level verification block.

If in step S305, the MAC values do not match each other, the secure VMM 516 determines that the verification has failed, and transfers control to post-verification-failure processing in step S306. In step S306, the secure VMM 516 executes, for example, error processing in the post-verification-failure processing, thereby finishing the verification processing.

In contrast, if in step S305, the MAC values match each other, the secure VMM 516 determines that the verification has succeeded. In this case, in step S307, the secure VMM 516 writes, as the reference destination address in the table entry regarded as invalid, an address in the internal memory 8 corresponding to the verification target data. At this time, the data address in the external memory 7 is stored in buffer management information area 519i buffer-block-by-buffer-block. Thereafter, the secure VMM 516 finishes the verification processing.

In the tree verification, different types of processing are performed between the time when the verification target is a data block and when it is a table block.

(Replacement Processing)

FIG. 16 is a flowchart showing an example of replacement processing according to the present embodiment. The replacement processing of FIG. 16 may occur during the tree verification processing shown in FIG. 15.

In the replacement processing, the same type data as a replacement source is selected as a replacement target, based on replacement algorithm. Namely, for replacement of a table block, a table block is selected. Similarly, for replacement of a data block, a data block is selected. As the replacement algorithm, Least Recently Used (LRU) is used. However, a replacement target may be selected using another replacement algorithm. In the present embodiment, a description will be given of an example case where when a table block is selected as the replacement target, the table block as the replacement target and associated blocks dependent on the replacement target table block are set as flush targets.

The secure VMM 516 starts replacement processing, and selects, in step S401, a replacement target in the internal memory 8, based on, for example, LRU. Further, if the replacement target is a table block, the secure VMM 516 determines the replacement target table block and associated blocks dependent on the replacement target table block as flush targets.

In step S402, the secure VMM 516 selects one of the flush targets. If there exist a table block and a data block as flush targets, the secure VMM 516 preferentially selects the data block.

In step S403, the secure VMM 516 executes flush processing.

After finishing the flush processing, the secure VMM 516 checks, in step S404, checks whether another replacement target exists in the internal memory 8.

If the internal memory 8 contains another flush target, the processing in step S402 et seq. is repeated until the internal memory 8 contains no more flush target. When there is no more flush target, the secure VMM 516 finishes the replacement processing.

After finishing the above-described replacement processing, a free area corresponding to flushed data is secured in verification buffer area 519*j* in the internal memory 8.

(Flush Processing)

FIG. 17 is a flowchart showing an example of flush processing according to the present embodiment. The flush processing shown in FIG. 17 occurs in the replacement processing of FIG. 16.

For instance, buffer management information area 519*i* of the internal memory 8 stores a translation list that associates addresses in the external memory 7 corresponding to data and page tables, with addresses in the internal memory 8 corresponding to data and page. The translation between address Iaddr in the internal memory 8 and address Eaddr in the external memory 7 may be executed using a method, such as a reverse page walk, other than the method using the translation list.

The secure VMM 516 starts flush processing, and confirms in step S501 whether the content of a flush target is updated. If it is not updated, the processing proceeds to step S505.

In contrast, if it is updated, the secure VMM 516 executes MAC update processing of the flush target in step S502. The secure DMA controller 511 generates a new MAC value for the flush target based on a MAC-value generation method defined by the MAC tree structure or the MAC+counter structure.

After that, in step S503, the secure VMM 516 determines, using the translation list in the internal memory 8, an address in the external memory 7 as a destination to which the flush target is to be written.

In step S504, the secure DMA controller 511 writes the flush target and the MAC value generated for the flush target to the external memory 7.

If the replacement target is not updated in the internal memory 8, or if write of the flush target has been executed, the secure VMM 516 rewrites, in step S505, the reference destination address of a table entry which designates the flush target, as an address in the external memory 7, thereby invalidating the table entry. Subsequently, the secure VMM 516 deletes control information associated with the flush target stored in buffer management information area 519*i*, thereby releasing an area of buffer management information area 519*i* in which the flush target is stored. By this processing, a free area corresponding to the flushed data is secured in buffer management information area 519*i*. Then, the secure VMM 516 finishes the flush processing.

(Relationship Between Functionality Configuration of Information Processing Device 500 and Tree Verification Processing)

A description will be given of the above-described tree verification processing in association with the configuration of the information processing device 500 shown in FIG. 14.

In step S301, the verification management unit 529 inquires of the buffer area management unit 547 in the storage area management unit 535 whether the verification storage unit 536 has a free buffer area. If there is no free area, the verification management unit 529 requests, in step S302, the storage area management unit 535 to release an already read buffer area.

Upon receipt of the request, the buffer area management unit 547 selects, in step S401, a replacement target from the verification storage unit 536 in accordance with the replacement algorithm. At this time, if the replacement target is a table block, the buffer area management unit 547 selects the table block and associated blocks of this table block as replacement targets. In step S402, the buffer area management unit 547 selects one of the flush targets, and requests the buffer write management unit 548 to execute flush processing.

Upon receipt of this request, the buffer write management unit 548 confirms in step S501 whether the content of the flush target is updated. If it is not updated, the processing proceeds to step S505.

In contrast, if it is updated, the buffer write management unit 548 requests, in step S502, generation of a new MAC value for the flush target, based on the MAC value generation method defined by the MAC tree structure or the MAC+counter structure. The verification information generation unit 531 generates the new MAC.

In step S503, the reference relationship update unit 546 determines a write destination address based on the translation list in the verification storage unit 536, and informs the verification information generation unit 531 of the write destination address.

The verification information generation unit 531 sends the flush target, data to be written, and the write destination address to the external write unit 534. In step S504, the external write unit 534 executes write processing, based on the flush target and the write destination address. Subsequently, in step S505, the reference relationship update unit 546 rewrites an address in the external memory 7 as the reference destination address of the target table entry in the verification storage unit 536, thereby invalidating the entry. Subsequently, the buffer area management unit 547 deletes control information associated with the flush target stored in the verification storage unit 536, thereby releasing an area in the verification storage unit 536, in which the flush target is stored.

In step S404, the buffer area management unit 547 repeats the flush target selection in step S402 and flush processing in step S403 until all selected flush targets are flushed from the verification storage unit 536.

After flushing all flush targets, a free area corresponding to the flushed data is secured in the verification storage unit 536.

In step S303, the verification information acquisition unit 540 in the verification management unit 529 acquires the anti-replay attack information of the verification target data stored in the verification storage unit 536, and requests the external read unit 532 to read data used for other verification. The external read unit 532 reads the requested data from the external memory 7, and sends verification target data of the read data to the verification information calculation unit 541.

In step S304, the verification information calculation unit 541 generates a MAC value for the read data, based on the verification target data, using a MAC generation method defined by the MAC tree structure or the MAC+counter structure. The falsification determination unit 539 compares the MAC value calculated by the verification information calculation unit 541 with a pre-generated MAC value.

If in step S305, the MAC values do not match each other (i.e., the verification has failed), the verification management unit 529 informs the instruction execution unit 505 of the verification failure in step S306, thereby stopping the later processing.

In contrast, if in step S305, the MAC values match each other (i.e., the verification has succeeded), the verification management unit 529 informs the reference relationship update unit 546 of reading success. In step S307, the reference relationship update unit 546 writes, as the reference destination address in the table entry regarded as invalid, an address in the verification storage unit 536 corresponding to the verification target data. At this time, the reference relationship update unit 546 stores an address in the external memory 7 corresponding to the verification target data, into the verification storage unit 536 buffer-block-by-buffer-block.

(MAC Comparison Setting Processing and MAC Comparison Verification Processing)

In MAC comparison verification processing, verification processing is executed on data arranged cache-line-by-cache-line. The MAC comparison verification processing is executed based on data set by MAC comparison setting processing executed in address resolution processing.

Firstly, the MAC comparison setting processing will be described.

As described in the address resolution processing of FIG. 12, the MMU 506 checks whether a cache-line MAC value is valid. If the cache-line MAC value is invalid, the secure VMM 516 generates a cache-line MAC value. Subsequently, the MMU 506 sets, in the MAC comparison setting processing, MAC comparison verification information to validate a corresponding table entry.

The MMU 506 reads, from the internal memory 8, anti-replay attack information corresponding to verification target data, adds the anti-replay attack information to the MAC comparison verification information in the MMU 506, and sets, verification necessity/unnecessity designating information that designates MAC comparison verification is necessary as MAC comparison verification information. Thus, the MMU 506 validates the table entry to suppress occurrence of a page fault.

The MAC comparison verification processing will be described.

FIG. 18 is a flowchart showing an example of MAC comparison verification processing according to the present embodiment. This MAC comparison verification processing may occur in the data acquisition processing of FIG. 13.

The cache verification unit 514 receives a request to execute MAC comparison verification processing from the cache memory 508, starts the MAC comparison verification processing, and executes address resolution processing by a predetermined method in step S601, thereby acquiring the cache-line MAC value of a verification target.

In step S602, the cache verification unit 514 reads verification target data from the external memory 7, and generates a MAC value, based on the verification target data and anti-replay attack information acquired by the data acquisition processing.

In step S603, the cache verification unit 514 compares the generated MAC value with the cache-line MAC value acquired from the external memory 7.

If the MAC values match each other, the cache verification unit 514 determines that the verification has succeeded and terminates the processing in success.

In contrast, if the MAC values do not match each other, the cache verification unit 514 determines that the verification has failed, and executes post-verification-failure processing, such as error processing, in step S605, thereby terminating the processing in failure.

The above-mentioned MAC comparison verification processing will be described in association with the configuration of the information processing device 500 of FIG. 14.

The verification management unit 530 receives a MAC comparison verification request from the cache memory 528 and starts MAC comparison verification processing.

In step S601, the verification management unit 530 requests the verification information acquisition unit 543 to acquire data used for verification, and the verification information acquisition unit 543 requests the external read unit 533 to acquire a cache-line MAC value and verification target data. The external read unit 533 sends, to the falsification determination unit 542, the cache-line MAC value read from the external memory 7, and sends the verification target data to the verification information calculation unit 544.

In step S602, the verification information calculation unit 544 acquires the verification target data from the external read unit 533, and generates a MAC value, based on the verification target data and anti-replay attack information stored in the MAC information buffer 545.

In step S603, the falsification determination unit 542 compares the generated MAC value with the acquired cache-line MAC value.

If the MAC values match each other, the falsification determination unit 542 determines that the verification has succeeded, and finishes the verification processing normally.

If the MAC values do not match each other, the verification management unit 530 informs, in step S605, the instruction execution unit 505 of verification failure, thereby stopping the later processing.

(Relationship Between MAC+Counter Structure and Cache Line)

Figure 19:
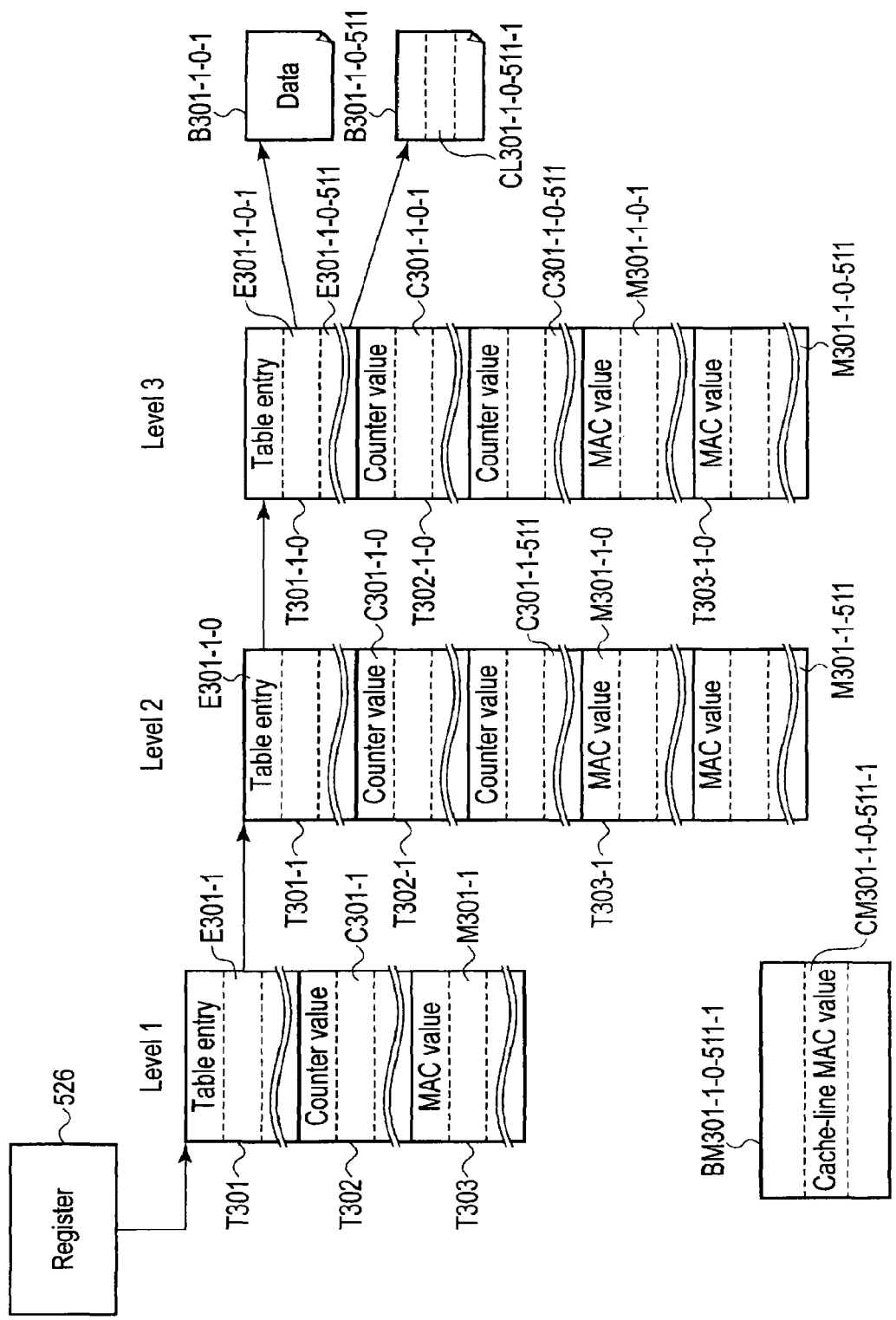
FIG. 19 is a data structure diagram showing an example of a relationship between a MAC+counter structure and a cache-line MAC value according to the second embodiment.

FIG. 19 is a data structure diagram showing an example of a relationship between a MAC+counter structure and a cache-line MAC value according to the present embodiment.

In FIG. 19, data CL301-1-0-511-1 obtained by dividing data block B301-1-0-511 into a cache-line size is stored in a cache line. The cache-line MAC value of the data stored in the cache line is CM301-1-0-511-1. Cache-line MAC block BM301-1-0-511-1 includes cache-line MAC value CM301-1-0-511-1 of data CL301-1-0-511-1 of the cache-line size. Cache-line MAC block BM301-1-0-511-1 is a block in which a plurality of cache-line MAC values are collected up to a page size.

(Verification of RO Data)

Verification of RO data is executed before cache fill. However, address resolution processing is executed before the RO data verification. Accordingly, when a request to refer to RO data has been issued, it is necessary to execute only address resolution processing and not to execute tree verification processing. Further, after address resolution processing, it is necessary that information necessary for RO data verification must be stored in the address translation caches 509 and 510, as well as address resolution information.

Referring now to the data reference processing of FIG. 11, the address resolution processing of FIG. 12, the data acquisition processing of FIG. 13 and the MAC comparison verification processing of FIG. 18, verification of RO data will be described.

In various types of processing described with reference to FIG. 9, information associated with data block B301-1-0-511 does not initially exist in the processor 501. In other words, in the initial state, the address translation caches 509 and 510, cache memories 507a and 507b and the cache memory 508 do not store data block B301-1-0-511, or the address translation information of data block B301-1-0-511.

Further, in the various types of processing described with reference to FIG. 9, it is assumed that table blocks of up to level 2 and counter blocks of up to level 2 in the secure page table tree 121 and the secure verifier tree 122, are stored in the internal memory 8. For instance, if the memory size of the protected external memory 7 is 4 gigabytes, the size of data stored in the internal memory 8 is 52 kilobytes, and the memory size of the internal memory 8 is 1 megabyte, the internal memory 8 has a capacity sufficient to cache table blocks of up to level 2 and counter blocks of up to level 2, which are included in the verifier tree.

In the various types of processing described with reference to FIG. 9, it is assumed that buffer management information area 519i in the internal memory 8 stores a translation list for translation of addresses between the external memory 7 and the internal memory 8. Namely, the secure VMM 516 recognizes the correspondence relationship between address Iaddr(B301-1-0-511) in the internal memory 8 and address Eaddr(B301-1-0-511) in the external memory 7, which correspond to data block B301-1-0-511. Translation between address Iaddr in the internal memory 8 and address Eaddr in the external memory 7 may be executed using a method, such as a reverse page walk, instead of the method using the translation list.

In the replacement processing, it is assumed that the same type data as a replacement source is selected as a replacement target in accordance with replacement algorithm.

The instruction execution unit 505 generates a data reference request in step S001. Upon receipt of the data reference request, the MMU 506 confirms in step S002 whether the address translation caches 509 and 510 cache address translation information including the virtual address and physical address of data block B301-1-0-511.

Since in this case, address translation information is not cached, the MMU 506 executes address resolution processing in step S003.

In step S101, the MMU 506 executes address resolution using a page walk.

In step S102, the MMU 506 checks table entry E301-1 of table block T301. Since table entry E301-1 is valid, the MMU 506 refers to it.

In step S109, the MMU 506 checks whether the address of data block B301-1-0-511 has been solved. Since the address is not solved, the page walk in step S101 is repeated.

In contrast, if the MMU 506 detects in step S102 that table entry E301-1-0-511 of table block T301-1-0 is invalid, it checks the access right of table entry E301-1-0-511 in step S103. Since in table entry E301-1-0-511, RO data access is set, the MMU 506 checks in step S106 whether the cache-line MAC value is valid. If the cache-line MAC value is invalid, the MMU 506 generates, in step S107, a cache-line MAC value, using the secure VMM 516 and the secure DMA controller 511 of FIG. 2. In subsequent step S108, the MMU 506 validates table entry E301-1-0-511 by MAC comparison verification setting processing, thereby setting, as MAC comparison verification information, counter value C301-1-0-511 used as anti-replay attack information, and verification necessity/unnecessity designating information.

In step S109, the MMU 506 checks whether addresses up to data block B301-1-0-511 have been solved. Since in this case, the addresses have been solved, the MMU 506 resumes data reference processing in step S110, thereby finishing the address resolution processing.

In step S004, the MMU 506 caches, in the address translation caches 509 and 510, address translation information that associates the solved virtual and physical addresses.

In step S005, the MMU 506 caches, in the address translation caches 509 and 510, MAC comparison verification information corresponding to table block B301-1-0-511 and obtained by the address resolution processing.

After the address resolution is achieved by the address resolution processing, the MMU 506 acquires, using a solved address, data CL301-1-0-511-1 stored in a cache line in reference-requested data block B301-1-0-511.

In step S201, the instruction execution unit 505 translates a virtual address into a physical address of cache-line data CL301-1-0-511-1, to thereby determine the address of an acquisition destination, based on the address translation caches 509 and 510.

Since data block B301-1-0-511 is RO data, the acquisition destination address is address Eaddr(CL301-1-0-511-1) in the external memory 7.

In step S202, the instruction execution unit 505 confirms whether data of acquisition destination address Eaddr (CL301-1-0-511-1) is cached in cache memory 507a, 507b and/or 508.

Since data of acquisition destination address Eaddr (CL301-1-0-511-1) is not cached in cache memory 507a, 507b and/or 508, the cache verification unit 514 acquires, in step S204, MAC comparison verification information from the address translation cache 509 or 510, and checks verification necessity/unnecessity designating information included in the MAC comparison verification information.

Since MAC comparison verification is needed, the cache verification unit 514 executes MAC comparison verification processing in step S205.

In step S601, the cache verification unit 514 executes address resolution processing using a predetermined method to acquire cache-line MAC value CM301-1-0-511 of a verification target.

In step S602, the cache verification unit 514 reads, from the external memory 7, cache-line data CL301-1-0-511-1 as a verification target, and generates a MAC value, based on the read data and anti-replay attack information obtained by data acquisition processing.

In step S603, the cache verification unit 514 compares the generated MAC value with the acquired cache-line MAC value CM301-1-0-511.

In step S604, the cache verification unit 514 determines that the verification has succeeded and finishes the verification processing normally, if the generated MAC value matches the cache-line MAC value CM301-1-0-511 acquired from the external memory 7, and executes post-verification-failure processing in step S605 if the MAC values do not match each other.

After normally finishing the MAC comparison verification, the cache verification unit 514 executes cache fill in step S206, thereby reading data from an area corresponding to acquisition destination address Eaddr(CL301-1-0-511-1) into cache memory 507a, 507b and/or 508.

After finishing the cache fill, the instruction execution unit 505 acquires data from cache memory 507a, 507b and/or 508 in step S207, thereby finishing the data acquisition processing.

(Processing of Generating Cache-Line MAC Value)

As described above referring to FIG. 12, if the cache-line MAC value is invalid, the secure VMM 516 and the secure DMA controller 511 generate a cache-line MAC value. Since cache-line MAC values are managed collectively in each cache-line MAC block associated with a corresponding data block, the secure VMM 516 and the secure DMA controller 511 collectively generate cache-line MAC values. Namely, if access to cache-line data belonging to a certain page has occurred, and a corresponding cache-line MAC value is invalid, the secure VMM 516 and the secure DMA controller 511 generate cache-line MAC values corresponding to all cache-line data included in the page. For instance, if certain cache-line data is accessed, and a cache-line MAC block including a cache-line MAC value corresponding to the data is invalid, the secure VMM 516 and the secure DMA controller 511 generate cache-line MAC values corresponding to all cache-line data included in the page. Subsequently, the secure VMM 516 validates the cache-line MAC block.

For instance, when the internal memory 8 contains an already updated data block, a page table as the reference source of the data block is of an RW attribute, and the data block is changed to an RO attribute, the secure VMM 516 may copy the data block to the external memory 7, generate a cache-line MAC value, and change the attribute of the data block to the RO attribute. When page data having its copy finished and access to page data changed to the RO attribute occurs, read and verification of the page data are executed via cache memory 507a, 507b and/or 508.

The secure VMM 516 instructions the secure DMA controller 511 to generate and write the cache-line MAC value, and the instructed secure DMA controller 511 executes it. The secure VMM 516 and the secure DMA controller 511 do not have to simultaneously do the same processing, and part of the processing of the secure VMM 516 may be transferred to the secure DMA controller 511.

Management associated with validity/invalidity of a cache-line MAC value may be executed cache-line-MAC-value-by-cache-line-MAC-value or cache-line-MAC-block-by-cache-line-MAC-block. A description will be given of an example case where validity/invalidity is managed cache-line-MAC-block-by-cache-line-MAC-block.

A cache-line MAC block is invalid when RO access to a corresponding data block does not occur, or when the corresponding data block has been updated. In any case, the MAC-value generation processing has the following same procedure:

FIG. 20 is a flowchart showing an example of generation processing of the cache-line MAC value. As described above referring to FIG. 12, it is determined in step S106 whether the processing of generating the cache-line MAC value is necessary. In step S106, the MU 506 checks validity/invalidity of the cache-line MAC value. If the cache-line MAC value is valid, the MU 506 executes MAC comparison verification processing in step S108, whereas if it is invalid, the secure VMM 516 and the secure DMA controller 511 execute the cache-line MAC generation processing shown in FIG. 20.

When generation of a cache-line MAC value is necessary, firstly, the secure VMM 516 executes tree verification of a data block as a MAC-value generation target in step S701. The data block as the generation target, in the external memory 7, is verified by this tree verification, and is read into the internal memory 8. Subsequently, the secure VMM 516 requests the secure DMA controller 511 to generate a cache-line MAC value.

In step S702, the secure DMA controller 511 acquires the generation target data block already verified by the tree verification, and anti-replay attack information needed for generating the cache-line MAC value of the data block.

In step S703, the secure DMA controller 511 generates cache-line MAC values corresponding to cache-line data included in a data block as a generation target.

In step S704, the secure DMA controller 511 writes the generated cache-line MAC values to address in the external memory 7 determined by a predetermined method.

In step S705, the secure DMA controller 511 determines whether cache-line MAC values corresponding to all cache-line data have been generated, and repeats steps S703 and S704 until all cache-line MAC values are generated.

By generating cache-line MAC values corresponding to all cache lines, a cache-line MAC block as a set of cache-line MAC values corresponding to a data block is generated.

When all cache-line MAC values corresponding to the data block as a generation target have been generated, the secure DMA controller 511 informs the secure VMM 516 of the finish of the generation.

In step S706, the informed secure VMM 516 validates the cache-line MAC block.

Subsequently, in step S707, the secure VMM 516 invalidates the data block as the generation target, and sets the attribute of this data block to RO.

Thus, generation and writing of a cache-line MAC block is realized by causing the secure VMM 516 to execute integrity verification on a data block as a generation target, and causing the secure DMA controller 511 to generate cache-line MAC values and to write the cache-line MAC values to a predetermined area cache-line-MAC-block-by-cache-line-MAC-block. A write destination address of the cache-line MAC values differs among different cache-line MAC value management methods.

(Verification of RW Data and Table Block)

Using the secure page table tree 121 and the secure verifier tree 122 of the MAC+counter structure shown in FIG. 9, a description will be given of an example of an operation performed when a request to refer to data block B301-1-0-511 as RW data has been issued.

In the internal memory 8, paging is executed on table blocks of level 3 or less. A description will be given of a case where the internal memory 8 contains all table blocks needed for address resolution of data block B301-1-0-511, and a case where it does not contain all table blocks. Further, since the data block and the table block differ from each other in data structure and verification processing, the data block and the table block will be described, individually.

<Hierarchical Tree Verification Processing>

An outline of hierarchical verification processing will be described below.

A series of operations performed from the time when a data reference request is issued, to the time when data is acquired can be divided into data reference processing, address resolution processing, verification processing, replacement processing and flush processing. The processing have an inset relationship, and each processing except for data reference processing does not occur unless it is necessary.

In the present embodiment, when address resolution is performed, resolved data is verified. Accordingly, the verification processing is performed hierarchically. For instance, when a data reference request for certain data is issued, the address resolution processing based on a page walk will occur. If an upper-level table block (parent table block) needed for the address resolution is not verified, the verification processing is firstly performed on the upper-level table block. After the verified table block is read into the secure internal memory 8, a lower-level table block (child table block) is verified. Thus, blocks from a highest level to a lowest level (data block) are sequentially subjected to verification.

<Occurrence of Verification Processing and Details of Verification Processing>

Occurrence of verification processing and details of the verification processing will be described below.

Specifically, a description will be given of an operation example when a data reference request associated with data block B301-1-0-511, which is the RW data, is occurred, using the verifier tree of the MAC+counter structure shown in FIG. 9.

For a table block of level 3 or less, paging is executed in the internal memory 8. In view of this, a description will be given of a case where all table blocks necessary for address resolution of data block B301-1-0-511 exist in the internal memory 8, and a case where all table blocks necessary for the address resolution do not exist in the internal memory 8. Since a data block differ from a table block in each data structure and verification processing, the data block and the table block will be described separately.

<Verification Processing of Data Block>

Firstly, a description will be given of a case where all page tables necessary for address resolution of the data block B301-1-0-511 are stored in the internal memory 8, namely, where verification of only data block B301-1-0-511 is occurred. Assume that the table blocks T301, T301-1 and T301-1-0, and the counter blocks T302, 1302-1 and T302-1-0 associated with the table blocks are stored in the verification buffer area 519j of the internal memory 8.

<Details of Address Resolution Processing for RW Data>

Referring to FIG. 12, address resolution processing will be described. The address resolution processing in FIG. 12 occurs during the data reference processing in FIG. 11.

The MMU 506 starts address resolution processing of the data block B301-1-0-511. In step S101, the MMU 506 executes address resolution processing by a page walk.

In step S102, the MMU 506 checks the table entry E301-1 of the table block T301, thereby detecting valid, and hence referring to the table entry E301-1.

In step S104, the MMU 506 checks whether the address resolution of the data block B301-1-0-511 is completed. Since in this case, the address resolution is not completed, the page walk is repeated in step S101.

When having detected in step S102 that table entry E301-1-0-511 of table block T301-1-0 is invalid, the MMU 506 checks the access right of table entry E301-1-0-511 in step S103.

Since table entry E301-1-0-511 designates RW access, control is transferred from the MMU 506 to the secure VMM 516. In step S104, the secure VMM 516 executes tree verification processing of data block B301-1-0-511 referred to by table entry E301-1-0-511, thereby validating table entry E301-1-0-511 regarded as invalid before the verification processing, and returning control from the secure VMM 516 to the MMU 506. In step S105, the MMU 506 executes post-tree-verification setting information designating unnecessity of verification as verification necessity/unnecessity designating information included in the MAC comparison verification information.

In step S109, the MMU 506 checks whether addresses up to data block B301-1-0-511 have been solved. If the addresses have been solved, data reference processing is resumed in step S110, thereby finishing address resolution processing.

Referring back to FIG. 11, the data reference processing will be described, and referring back to FIG. 12, address resolution processing occurring in the data reference processing will be described.

In step S001, the instruction execution unit 505 issues a data reference request to the MMU 506. In step S002, the MMU 506 inquires of the address translation cache 527 whether a physical address corresponding to the virtual address of a guest OS is cached. If the address translation cache 527 caches the corresponding physical address, the MMU 506 reads data in step S006, using the corresponding physical address.

If the address translation information is stored in the address translation cache 527, and if the data is already referenced, verified data is stored in the verification storage unit 536, and the address of the verified data in the verification storage unit 536 is stored in the address translation cache 527. Then, a translated physical address is sent from the address translation cache 527 to the verification storage unit 536, and then, in step S006, the verified data stored in the verification storage unit 536 is returned to the instruction execution unit 505.

If there is a TLB miss, the address resolution unit 537 in the MMU 506 executes address resolution processing in step S003. For address resolution, the MMU 506 executes a page walk as shown in step S101 of FIG. 12.

In step S102, the MMU 506 checks table entry E301-1 of table block T301 stored in the verification storage unit 536, and refers to table entry E301-1 if it is valid. In step S109, the MMU 506 checks whether the address of data block B301-1-0-511 has been solved. If it is not solved, the page walk in step S101 is repeated.

Upon detecting in step S102 that table entry E301-1-0-511 of table block T301-1-0 is invalid, the MMU 506 checks the access right of table entry E301-1-0-511 in step S103.

Since the table entry designates RW access, the MMU 506 informs the verification management unit 529 of this.

In step S104, the verification management unit 529 executes tree verification processing of data block B301-1-0-511 referred to by table entry E301-1-0-511. After finishing the verification processing, the verification management unit 529 informs the reference relationship update unit 546 of the completion of the verification, and the reference relationship update unit 546 validates table entry E301-1-0-511 regarded as invalid. The verification management unit 529 informs the MMU 506 of the completion of reading. As a result, the secure VMM 516 returns control to the MMU 506.

In step S105, the MMU 506 executes post-tree-verification setting processing, thereby setting information designating unnecessity of verification as verification necessity/unnecessity designating information included in the MAC comparison verification information.

In step S109, the MMU 506 checks whether addresses up to data block B301-1-0-511 have been solved. If the addresses have been solved, data reference processing is resumed in step S110, thereby finishing address resolution processing.

When the address resolution processing has been completed, all page tables and the reference destination data needed for the executed address resolution processing are verified, and stored in the buffer area dynamically allocated in the internal memory 8 by the verification management unit 529 and the storage area management unit 535. The MMU 506 caches address translation information as the result of the address resolution processing in the address translation cache 527, and executes data acquisition in step S006.

<Details of Verification Processing for RW Data>

Referring again to FIG. 15, a description will be given of tree verification processing of data block B301-1-0-511 as RW data.

The secure VMM 516 starts verification processing of data block B301-1-0-511, and checks in step S301 whether the verification buffer area 519j in the internal memory 8 has a free area. If the verification buffer area 519j has no free area, the secure VMM 516 releases an area by replacement processing in step S302.

Subsequently, in step S303, the secure VMM 516 copies to-be-used data for verifying from the external memory 7 to the free area in the verification buffer area 519j in the internal memory 8. At this time, the secure DMA controller 511 generates a MAC value corresponding to read data, based on the MAC generation method defined by the MAC tree structure or the MAC+counter structure.

Subsequently, in step S304, the secure VMM 516 compares the generated MAC value with a corresponding MAC value stored in the external memory 7 to execute falsification verification of data block B301-1-0-511. In the falsification verification, the secure VMM 516 reads, from the external memory 7, MAC value M301-1-0-511 corresponding to data block B301-1-0-511, stores the read MAC value in temporary buffer area 519k in the internal memory 8, and compares the read MAC value M301-1-0-511 with a MAC value generated by the secure DMA controller 511. The read MAC value M301-1-0-511 is included in MAC block T303-1-0 of the external memory 7. A MAC value corresponding to a correct upper-level counter value cannot be calculated without a secret key. The upper-level counter value is already verified along with the upper-level table. Accordingly, it is not necessary to verify the read MAC value M301-1-0-511.

If in step S305, the MAC values do not match each other, the secure VMM 516 determines that the verification is failed, and transfers control to post-verification-failure processing in step S306. In step S306, the secure VMM 516 performs, for example, error processing in the post-verification-failure processing, and thereafter leads the verification processing to abnormal termination.

If in step S305, the MAC values match each other, the secure VMM 516 determines that the verification is succeeded. In this case, in step S307, the secure VMM 516 writes, as a reference destination address of the table entry E301-1-0-511 determined as invalid, the address Iaddr(B301-1-0-511) in the internal memory 8 corresponding to the verification target data block B301-1-0-511. At this time, the address Eaddr(B301-1-0-511) in the external memory 7 in the data block B301-1-0-511 is stored in the buffer management information area 519i in a unit of buffer block. Thereafter, the secure VMM 516 finishes the verification processing.

The verification processing described FIG. 15 and the structure of the information processing device 500 shown in FIG. 14 will be described in association with each other.

In step S301, the verification management unit 529 refers to the buffer area management unit 519i in the storage area management unit 535 so as to detect whether the verification storage unit 536 has a free area. When there is no free area, the verification management unit 529 requests, in step S302, the storage area management unit 535 to release an already-read buffer area and acquire a free-area address.

In step S303, the verification information acquisition unit 540 in the verification management unit 529 acquires data used for verification from the external memory 7 via the external read unit 532, and copies the data to a free area in verification buffer area 519j of the verification storage unit 536.

In step S304, the verification information calculation unit 541 calculates a MAC value, based on the verification target data block B301-1-0-511, the counter value C301-1-0-511 and a secret key stored in the key storage unit 513. The falsification determining unit 539 compares the calculated MAC value with the already acquired MAC value M301-1-0-511.

When the MAC values do not match each other and verification is failed, in Step S306, the verification management unit 529 notifies the instruction execution unit 505 of verification failure, thereby stopping subsequent processing.

When the MAC values match each other and the verification is succeeded, in Step S307, the verification management unit 529 notifies the reference relationship update unit 546 of a read-in success. The reference relationship update unit 546 stores, as the reference destination address in the table entry E301-1-0-511 determined as invalid, the address Iaddr(B301-1-0-511) in the internal memory 8 corresponding to the verification target data block B301-1-0-511. Further, the reference relationship update unit 546 stores the address Eaddr(B301-1-0-511) in the external memory 7 corresponding to the verification target data block B301-1-0-511, to the buffer management data area 519j in a unit of buffer block, thereby finishing the verification processing.

<Details of Replacement Processing for RW Data>

Replacement processing of RW data will described using FIG. 16.

A description will be given, assuming that data block B301-1-0-511 is a data block for which the replacement processing is performed, and data block B301-1-0-1 is a least used data block.

The secure VMM 516 starts the replacement processing, and selects a replacement target data from the internal memory 8 in step S401. Specifically, the secure VMM 516 selects the data block B301-1-0-1 as a replacement target to be replaced with the data block B301-1-0-511, based on replacement algorithm, such as LRU.

In step S402, the secure VMM 516 selects the data block B301-1-0-1 as a flush target to be flushed from the internal memory 8.

In step S403, the secure VMM 516 executes flush processing.

After finishing the flush processing, the secure VMM 516 checks, in step S404, whether the replacement target data block B301-1-0-1 exists in the internal memory 8. Since in this case, the replacement target data block B301-1-0-1 does not exist in the internal memory 8, the replacement processing is terminated. The reason why it is checked whether a replacement target exists in the internal memory 8 lies in that if the replacement target is a table block as described later, a target block must be flushed depending upon a policy of buffer management, and such flush may be required several times. In the above example, flush processing is completed only by one time.

After finishing the above-described replacement processing, a free area is secured in the verification buffer area 519j in the internal memory 8.

The replacement processing shown in FIG. 16 and the information processing device 500 shown in FIG. 14 will be described in association with each other.

In step S401, upon receipt of a request from the verification management unit 529, the buffer area management unit 547 selects, as a replacement target, the data block B301-1-0-1 which is least used. When the replacement target is a page table, the page table as the replacement target and associated blocks belonging thereto are selected as replacement targets. Accordingly, the buffer area management unit 547 selects, in step S402, a flush target from replacement target data block B301-1-0-1 and the associated blocks, and executes flush processing in step S303.

After finishing the flush processing, the secure VMM 516 checks in step S404 whether other replacement target exists in the verification storage unit 536.

When other replacement target exists in the verification storage unit 536, the processing in step S402 et seq. is repeated until the verification storage unit 536 no more contains a replacement target. When the verification storage unit 536 no more contains a replacement target, the replacement processing is terminated.

<Details of Flush Processing for Data Block>

Flush processing of RW data will described using FIG. 17.

A description will be given, using data block B301-1-0-1 as a flush target. Counter value C301-1-0-1 of the data block B301-1-0-1 is stored in the internal memory 8. MAC value M301-1-0-1 of the data block B301-1-0-1 is stored in the external memory 7. The MAC value M301-1-0-1 in the external memory 7 is a MAC value of the data block B301-1-0-1 stored in the external memory 7. Accordingly, when the data block B301-1-0-1 updated in the internal memory 8 is returned (copied) to the external memory 7, the MAC value M301-1-0-1 must be updated. In contrast, when the data block B301-1-0-1 is not updated in the internal memory 8, the MAC value M301-1-0-1 does not have to be updated, since contents of the data block B301-1-0-1 are not difference between the external memory 7 and the internal memory 8.

The secure VMM 516 starts the flush processing of data block B301-1-0-1, and confirms in step S501 whether a content of the data block B301-1-0-1 as a flush target is updated. When it is not updated, the processing proceeds to step S505.

When it has been updated, the secure VMM 516 executes MAC update processing of the flush target data block B301-1-0-1 in step S502. Specifically, the secure VMM 516 increments the counter value C301-1-0-1 included in the counter block T302-1-0 as an upper-level verification block for the flush target data block B301-1-0-1. The secure DMA controller 511 generates a new MAC value M301-1-0-1 for the flush target data block B301-1-0-1, based on the flush target data block B301-1-0-1, the address Eaddr(B301-1-0-1) of the external memory 7 translated using a translation list, and the incremented counter value C301-1-0-1.

After that, in step S503, the secure VMM 516 determines, using the translation list of the internal memory 8, the address Eaddr(B301-1-0-1) of the external memory 7 as a destination to which the data block B301-1-0-1 is to be written.

In step S504, the secure DMA controller 511 writes the flush target data block E301-1-0-1 to a position designated by the address Eaddr(B301-1-0-1) of the external memory 7, and writes the generated MAC value M301-1-0-1 to a predetermined position in the MAC block T303-1-0 in the external memory 7.

When the flush target data block B301-1-0-1 is not updated in the internal memory 8, or When MAC updating and writing of the flush target is executed, the secure VMM 516 replaces, in step S505, a reference destination address in the table entry E301-1-0-1, which designates the flush target data block B301-1-0-1, with the address Eaddr(B301-1-0-1) of the external memory 7, thereby invalidating the flush target table entry E301-1-0-1. Subsequently, the secure VMM 516 deletes control information associated with the flush target data block B301-1-0-1 from the buffer management information area 519$i$ in the internal memory 8, thereby releasing an area of the verification buffer area 519$j$ in which the data block B301-1-0-1 was stored. By this processing, a free area of the data block size is secured in the verification buffer area 519$j$. Then, the secure VMM 516 terminates the flush processing.

The flush processing shown in FIG. 17 and the structure of the information processing device 500 shown in FIG. 14 will be described in association with each other.

The buffer write management unit 548 starts flush processing of the flush target data block B301-1-0-1. In step S501, the buffer write management unit 548 confirms whether the content of data block B301-1-0-1 as the flush target is updated.

When it is not updated, the buffer write management unit 548, in step S505, discards data to release a corresponding portion of the buffer area in the internal memory 8, and the reference relationship update unit 546 performs rewriting processing of a table entry.

When it is updated, the buffer write management unit 548 requests, in step S502, the verification information generation unit 531 to execute MAC update processing of the flush target data block B301-1-0-1. The verification information generation unit 531 increments the counter value C301-1-0-1 included in the counter block T302-1-0 which is the upper-level verification block of flush target data block B301-1-0-1, and generates new MAC value M201-1-0-1 for the flush target data block B301-1-0-1, based on the flush target data block B301-1-0-1, the address Eaddr(B301-1-0-1) of the external memory 7 translated using a translation list, and the incremented counter value C301-1-0-1.

After that, in step S503, the buffer write management unit 548 determines, using the translation list in the internal memory 8, the address Eaddr(B301-1-0-1) of the external memory 7 as a destination to which the data block B301-1-0-1 is to be written. In step S504, the buffer write management unit 548 requests the external write unit 534 to write the flush target data block B301-1-0-1 to an area of the external memory 7 designated by the address Eaddr(B301-1-0-1), and to write the generated MAC value M301-1-0-1 to an area designated by a predetermined address of the MAC block T303-1-0 in the external memory 7.

When the MAC updating and data writing is executed, the reference relationship update unit 546 replaces, in step S505, a reference destination address of the table entry E301-1-0-001 designating the flush target data block B301-1-0-1 with the address Eaddr(B301-1-0-1) of the external memory 7, thereby invalidating the entry. Further, the buffer area management unit 547 deletes control information stored in the buffer management information area 519$i$ of the internal memory 8 and corresponding to the flush target data block B301-1-0-1, and releases an area of the verification buffer area 519$j$ storing the flush target data block B301-1-0-1 so far. By this processing, a free area of a data block size is secured in the verification buffer area 519$j$. Then, the buffer write management unit 548 terminates the flush processing.

The above-described processing is processing for a data block when all upper-level table blocks of the data block, needed for the address resolution processing, verification processing, replacement processing and flush processing, are already stored in the internal memory 8.

<Verification Processing of Table Block>

A description will now be given of a case where a part of the table blocks needed for address resolution of the data block B301-1-0-511 do not exist in the internal memory 8, in other words, where table blocks are verified.

Assume here that table blocks T301 and T301-1, and counter blocks T302 and T302-1 associated with the table blocks are stored in the verification buffer area 519j in the internal memory 8. The verification buffer area 519j is included in the verification storage unit 536. Assume that table block T301-1-0 and counter block T302-1-0 associated with the table block are not stored in the internal memory 8.

<Address Resolution Processing for Table Block>

Referring again to the flowchart of FIG. 12, address resolution processing for a table block will be described.

The MMU 506 starts address resolution processing of the data block B301-1-0-511, and executes address resolution using a page walk in step S101.

In step S102, the MMU 506 checks the table entry E301-1 in the table block T301.

When the table entry E301-1 is valid, the MMU 506 refers to the table entry E301-1.

In step S109, the MMU 506 checks whether the address resolution processing of the data block B301-1-0-511 is completed. When the address resolution is not completed, the MMU 506 repeats the page walk in step S101.

When the MMU 506 is detected in step S102 that the table entry E301-1-0 in the table block T301-1 is invalid, it checks an access right of the table entry E301-1-0 in step S103.

Since the table entry E301-1-0 designates RW access (access to a table block), control is transferred from the MMU 506 to the secure VMM 516, whereby the secure VMM 516 executes, in step S104, tree verification processing of the table block T301-1-0 referred by the table entry E301-1-0. After the tree verification, the table entry E301-1-0 invalid before the verification processing has become valid, whereby the secure VMM 516 returns control to the MMU 506. In step S105, the MMU 506 executes post-tree-verification setting processing to set information designating unnecessity of verification as the verification necessity/unnecessity designating information included in the MAC comparison verification information.

In step S109, the MMU 506 checks whether address resolution processing is completed up to the data block B301-1-0-511. When the address resolution processing is not yet completed, the MMU 506 again executes the page walk of step S101, thereby repeating the above processing.

In contrast, when address resolution processing is completed up to the data block B301-1-0-511, the MMU 506 resumes data reference processing in step S110, thereby finishing the address resolution processing.

The above address resolution processing of a page table will be described in association with the structure of the information processing device 500 shown in FIG. 14.

The instruction execution unit 505 issues a data reference request to the MMU 506. The MMU 506 determines a cache miss in the address translation cache 527, since table block T301-1-0 is not read in. At this time, address resolution unit 537 of the MMU 506 executes address resolution. In step S101, address resolution unit 537 of the MMU 506 executes a page walk.

In step S102, the MMU 506 checks table entry E301-1 of table block T301 stored in the verification storage unit 536, and refers to table entry E301-1 since table entry E301-1 is valid.

In step S109, the MMU 506 checks whether address resolution processing of data block B301-1-0-511 is completed. Since in this case, the address resolution processing is not yet completed, the page walk of step S101 is repeated.

When detecting in step S102 that table entry E301-1-0 of table block T301-1 is invalid, the MMU 506 checks the access right of table entry E301-1-0 in step S103.

Since table entry E301-1-0 designates RW access (access to a table block), the MMU 506 informs the verification management unit 529 of this.

In step S104, the verification management unit 529 executes tree verification processing of data block B301-1-0 referred to by table entry E301-1-0. After finishing the verification processing, the verification management unit 529 notifies the reference relationship update unit 546 of the completion of the verification. The reference relationship update unit 546 validates table entry E301-1-0 determined as invalid. The verification management unit 529 notifies the MMU 506 of the completion of the reading.

In step S105, the MMU 506 executes post-tree-verification setting processing to set information designating unnecessity of verification as the verification necessity/unnecessity designating information included in the MAC comparison verification information.

In step S109, the MMU 506 checks whether an address up to data block B301-1-0-511 is solved. When the address is not solved, a page walk in step S101 is executed, thereby repeating processing similar to the above.

If in step S104, the MMU 506 determines that the address up to data block B301-1-0-511 is solved, it resumes data reference processing in step S110, thereby finishing the address resolution processing.

When address resolution processing is completed, the page tables needed for address resolution are verified by the verification management unit 529, and are stored in a verified state by the storage area management unit 535 in a buffer dynamically secured in the verification storage unit 536. The MMU 506 caches the result of the address resolution processing in the address translation cache 527.

<Details of Tree Verification Processing for Page Table>

Referring again to the verification processing shown in FIG. 15, tree verification processing for a page table will be described. More specifically, verification processing of table block T301-1-0 will be described.

The secure VMM 516 starts verification processing of table block T301-1-0, and checks in step S301 whether the verification buffer area 519j in the internal memory 8 has a free area.

When the verification buffer area 519j has no free area, the secure VMM 516 releases an area by replacement processing in step S302.

Subsequently, in step S303, the secure VMM 516 copies to-be-verified table block T301-1-0 from address Eaddr (T301-1-0) of the external memory 7 to the free area of the verification buffer area 519j in the internal memory 8. At this time, the secure DMA controller 511 generates a MAC value for reading data, based on a MAC generation method defined by the MAC tree structure or the MAC+counter structure.

Then, in step S304, the secure VMM 516 executes falsification verification of verification target table block T301-1-0, based on the generated MAC value. The secure VMM 516 reads, from the external memory 7, MAC value M301-1-0 corresponding to verification target table block T301-1-0, and stores read MAC value M301-1-0 in the temporary buffer area 519k of the internal memory 8. After that, the secure VMM 516 compares MAC value M301-1-0 stored in the temporary buffer area 519k with the MAC value generated by the secure DMA controller 511. MAC value M301-

1-0 is included in MAC block T303-1 of the external memory 7. A MAC value corresponding to a correct upper-level counter value cannot be calculated without a secret key. The upper-level counter value is already verified along with the upper-level table. Accordingly, read MAC M301-1-0 does not have to be verified.

If in step S305, the MAC values do not match each other, the secure VMM 516 determines that the verification has failed, and transfers control to post-verification-failure processing in step S306. In step S306, the secure VMM 516 performs, for example, error processing in the post-verification-failure processing, and thereafter leads the verification processing to abnormal termination.

If in step S305, the MAC values match each other, the secure VMM 516 determines that the verification has succeeded. In step S307, the secure VMM 516 writes, as the reference destination address in table entry E201-1-0 regarded as invalid, address Iaddr(T301-1-0) of the internal memory 8 corresponding to verification target table block T301-1-0. At this time, address Eaddr(T301-1-0) of the external memory 7 corresponding to verification target table block T301-1-0 is stored in the buffer management information area 519$i$ in a buffer block unit. Thereafter, the secure VMM 516 finishes the verification processing.

The above table-block verification processing will be described in association with the flowchart of FIG. 12 for the address resolution processing and the structure of the information processing device 500 of FIG. 14.

Address resolution unit 537 of the MMU 506 starts address resolution processing of data block B301-1-0-511, and executes address resolution using a page walk in step S101.

In step S102, address resolution unit 537 refers to the verification storage unit 536 to check table entry E301-1 of table block T301. Since table entry E301-1 is valid, it is referred to.

In step S109, the MMU 506 checks whether address resolution processing of data block B301-1-0-511 has been completed up to a data block. Since the address resolution processing is not yet completed, the page walk of step S101 is repeated.

When detecting in step S102 that table entry E301-1-0 of table block T301-1 is invalid, the MMU 506 checks the access right of table entry E301-1-0 in step S103.

Since table entry E301-1-0 designates RW access (access to a table block), the MMU 506 informs the verification management unit 529 of this.

The verification management unit 529 requests the storage area management unit 535 to secure a free area. Buffer area management unit 547 of the storage area management unit 535 determines in step S301 whether the verification storage unit 536 has a free area, and executes replacement processing of step S302 if there is no free area.

In step S303, the verification information acquisition unit 540 acquires anti-replay attack information as verification target data from the verification storage unit 536, and requests the external read unit 532 to read in data used for other verification. The external read unit 532 reads requested data from the external memory 7, and sends verification target data included in the read data to the verification information calculation unit 541.

In step S304, the verification information calculation unit 541 generates a MAC value corresponding to the read data from the verification target data, using a MAC generation method defined by the MAC tree structure or the MAC+counter structure. The falsification determination unit 539 compares the MAC value calculated by the verification information calculation unit 541 with a pre-generated MAC value.

When the MAC values do not match each other (verification has failed), the verification management unit 529, step S306, informs the instruction execution unit 505 of verification failure, thereby stopping subsequent processing.

In contrast, if the MAC values match each other (verification has succeeded), the verification management unit 529 informs reference relationship update unit 546 of reading success in step S307. Reference relationship update unit 546 writes, as the reference destination address in table entry E301-1-0 regarded as invalid, address Iaddr(T301-1-0) of the verification storage unit 536 corresponding to verification target page block T301-1-0. Further, reference relationship update unit 546 stores address Eaddr(T301-1-0) of the external memory 7 corresponding to verification target page block T301-1-0 in Buffer area management unit 547 in a buffer block unit, thereby finishing the verification processing.

<Details of Replacement Processing for Page Table>

Referring again to the replacement processing flowchart of FIG. 16, replacement processing for a page table will be described. In this description, table block T301-1-0 is assumed to be a data block for which replacement processing is performed, and table block T301-1-511 is assumed to be a least used one. When a table block is replaced, blocks associated with the table block are also flushed from the internal memory 8 to the external memory 7. Specifically, when table block T301-1-511 is a replacement target, data blocks B301-1-511-0 to B301-1-511-511 that can be referred to from table block T301-1-511 and existing in the internal memory 8 are also selected as replacement targets, along with table block T301-1-511. In this case, the secure VMM 516 invalidates table entry E301-1-511 included in upper-level table block T301-1 of table block T301-1-511. However, in the present embodiment, it is not always necessary to set all associated blocks as replacement targets. For instance, when appropriate buffer management has been executed, data blocks B301-1-511-0 to B301-1-511-511 may exist in the internal memory 8 even after table block T301-1-511 is flushed. As a data management method in which some of associated blocks are cached, a method for use in a directory cache in a file system can be used.

The secure VMM 516 starts replacement processing, and selects a replacement target table block in the internal memory 8 in step S401. Based on replacement algorithm, the secure VMM 516 selects table block T301-1-511 as the replacement target of table block T301-1-0.

In step S402, the secure VMM 516 selects, as flush targets to be flushed from the internal memory 8, data blocks that exist in the internal memory 8 and are included in replacement target table block T301-1-511 and associated data blocks B301-1-511-0 to B301-1-511-511, and executes flush processing in step S403.

After finishing the flush processing, the secure VMM 516 checks in step S404 whether another replacement target exists in the internal memory 8. The processing of step S402, et seq. is repeated until no more replacement target is detected in the internal memory 8. When no more replacement target is detected in the internal memory 8, the secure VMM 516 finishes the replacement processing.

After finishing the above-described replacement processing, a free area that corresponds to table block T301-1-511, a corresponding counter block, and associated blocks existing in the internal memory 8 is secured in the verification buffer area 519$j$ of the internal memory 8.

The above replacement processing for a table block will be described in association with the information processing device 500 of FIG. 14.

Upon receipt of a request from the verification management unit 529, in step S401, buffer area management unit 547 selects, as replacement targets, least-used table block T301-1-511 and associated blocks arranged under table block T301-1-511.

In step 4302, buffer area management unit 547 selects, as a flush target, one of table block T301-1-511 and the associated blocks. In step S403, buffer area management unit 547 executes flush processing of the flush target.

In step S404, buffer area management unit 547 repeats the flush processing until all replacement targets are flushed from the internal memory 8.

<Details of Flush Processing for Table Block>

Referring again to the flowchart of FIG. 17, flush processing for a table block will be described. Assume, for example, that the flush target is table block T301-1-511. Counter value C301-1-511 of table block T301-1-511 is stored in the internal memory 8. MAC value M301-1-511 of table block T301-1-511 is stored in the external memory 7. MAC value M301-1-511 of the external memory 7 is the MAC value of table block T301-1-511 stored in the external memory 7. Accordingly, when table block T301-1-511 updated in the internal memory 8 is copied to the external memory 7, update processing of MAC value M301-1-511 is needed. In contrast, when table block T301-1-511 in the internal memory 8 is not updated, MAC value M301-1-511 does not have to be updated, because there is no difference in the content of table block T301-1-511 between the external memory 7 and the internal memory 8.

The secure VMM 516 starts flush processing of table block T301-1-511, and confirms in step S501 whether the content of table block T301-1-511 as the flush target is updated.

If the content is not updated, the secure VMM 516 proceeds to processing of step S505 for releasing an area in the internal memory 8.

If the content is updated, the secure VMM 516 executes, in step S502, MAC update processing of table block T301-1-511. More specifically, the secure VMM 516 increments counter value C301-1-511 in counter block T302-1 of the upper-level verification block of table block T301-1-511. The secure DMA controller 511 generates new MAC value M301-1-511 for table block T301-1-511, based on table block T301-1-511, address Eaddr(T301-1-511) of the external memory 7 translated using a translation list, and incremented counter value C301-1-511.

Thereafter, in step S503, the secure VMM 516 determines address Eaddr(T301-1-511) of the external memory 7 to be the write destination of table block T301-1-511, using the translation list of the internal memory 8.

In step S504, the secure DMA controller 511 writes table block T301-1-511 to an area of the external memory 7 to which address Eaddr(T301-1-511) is allocated, and writes generated MAC value M301-1-511 to a predetermined area in MAC block T303-1-511 of the external memory 7.

If table block T301-1-511 is not updated, or if MAC update and roll out of data have been executed, the secure VMM 516 replaces, in step S505, the reference destination address of table entry E301-1-511, which designates table block T301-1-511, with address Eaddr(T301-1-511) of the external memory 7, thereby invalidating table entry E301-1-511. Subsequently, the secure VMM 516 deletes control information associated with table block T301-1-511 from the buffer management information area 519i, thereby releasing an area of the verification buffer area 519j in which table block T301-1-511 was stored.

By this processing, a free area of the table block size and counter block size is left in the verification buffer area 519j. This is the termination of the flush processing by the secure VMM 516.

The above flush processing for a table block will be described in association with the structure of the information processing device 500 of FIG. 14.

Buffer area management unit 547 starts flush processing of table block T301-1-511, and determines in step S501 whether the content of table block T301-1-511 as a flush target is updated. If the content is not updated, the processing proceeds to step S505 where an area in the internal memory 8 is released.

If the content has been updated, the verification information generation unit 531 executes MAC update processing of table block T301-1-511 in step S502. The secure VMM 516 increments counter value C301-1-511 included in counter block T302-1 of the upper-level verification block of table block T301-1-511. The verification information generation unit 531 generates new MAC value M201-1-511 for table block T301-1-511, based on table block T301-1-511 itself, address Eaddr(T301-1-511) of the external memory 7 translated using a translation list, and incremented counter value C301-1-511.

After that, in step S503, reference relationship update unit 546 determines, using the translation list of the verification storage unit 536, address Eaddr(T301-1-511) of the external memory 7 as a destination to which table block T301-1-511 is to be written. In step S504, the external write unit 534 writes table block T301-1-511 to an area of the external memory 7 to which address Eaddr(T301-1-511) is allocated, and writes generated MAC value M301-1-511 to a predetermined area in MAC block T303-1 of the external memory 7.

If table block T301-1-511 is not updated, or if MAC update and roll out of data have been completed, reference relationship update unit 546 replaces, in step S505, the reference destination address of table entry E301-1-511, which designates table block T301-1-511, with address Eaddr(T301-1-511) of the external memory 7, thereby invalidating table entry E301-1-511. Subsequently, buffer area management unit 547 deletes control information associated with table block T301-1-511 from the buffer management information area 519i, thereby releasing an area of the verification buffer area 519j in which table block T301-1-511 is stored. By this processing, a free area of the table block size is left in the verification buffer area 519j. This is the termination of the flush processing by buffer area management unit 547.

The above-described various types of processing for a table block are executed when a table block necessary for address resolution, verification, replacement and flush of a data block is not stored in the internal memory 8.

As described above, in the present embodiment, the secure page table tree 121 and the secure verification tree 122 for falsification verification are made to match each other in graph structure, and the storage state of the internal memory 8 is managed in a secure manner, whereby verification processing can be executed efficiently. As a result, the information processing device 500 can be protected completely from falsification attacks against the external memory 7.

In the present embodiment, a table block and a verification block are simultaneously read from the external memory 7 into the internal memory 8, and are simultaneously validated. As a result, the information processing device 500 can reliably and efficiently store, in the internal memory 8 with the integrity of content guaranteed, the page table tree 9, the verifier tree 10 and data stored in the external memory 7 that can be falsified illegally, and can reliably and efficiently use them.

In the present embodiment, when the secure page table tree 121 or data updated in the internal memory 8 is written to the external memory 7, a verifier is calculated from the written page table or data, and the secure verifier tree 122 of the internal memory 8 is updated based on the verifier. As a result, falsification of a page table or data can be detected when the page table or data is read into the internal memory 8, after updating.

In the present embodiment, a page table is transferred from the internal memory 8 to the external memory 7, and is thereafter transferred from the external memory 7 to the internal memory 8. If a page table or data to be referred to by the table entry of the first-mentioned page table is not yet stored in the internal memory 8, the table entry is managed to exhibit an invalid state. As a result, reference processing and verification processing of a lower-level page table or data can be executed correctly.

The information processing device 500 has address transparency for guest OSs, and detects reading of non-verified data. The information processing device 500 enables verification of large-scale data. The information processing device 500 has an appropriate protection level, and suppresses increases in verification overhead.

In the present embodiment, address translation is executed using the secure page table tree 121 stored in the internal memory 8, and all page tables, verifiers and data are guaranteed using the secure verifier tree 122. In the tree verification, the greater the amount of data accessed by the processor 501, the greater the number of pagings and the number of verification. More specifically, for example, when tree verifications are executed page-by-page, for all protected data, the number of pagings and the number of verification increase in accordance with an increase in a data area to be accessed. In each of tree verification, the secure page table tree 121 is matched with the secure verifier tree 122 in hierarchical structure to reduce verification processing load. Further, in the present embodiment, an overhead (hereinafter referred to as a verification overhead) due to verification per one instruction is reduced. As a result, the embodiment can be applied to a large-scale system, where even when the data access area is increased, an increase in the number of tree verification can be suppressed.

To suppress the increase in the number of tree verification, in the present embodiment, part of data is excluded from the tree verification, and other verification is executed on the excluded part.

The data stored in the external memory 7 includes RO data that can be read only, and RW data that can be read and rewritten. In the present embodiment, tree verification is executed against replay attacks on the RW data that can be updated. In contrast, the RO data, which cannot be updated can be sufficiently protected by simpler verification than the tree verification, and is excluded from the tree verification target in the present embodiment. The RO data excluded from the tree verification can be excluded from the internal memory 8 occupying a greater part of the OS data by being read therefrom via the cache memory 45, 507a, 507b, 508 and/or 528, whereby the number of tree verifications can be significantly reduced.

For instance, the OS data includes data that is switched between RO data and RW data depending upon time. Therefore, in the present embodiment, protection against replay attacks may be realized also for the RO data.

In the present embodiment, to overcome the replay attacks, a verifier is generated using anti-replay attack information as a value varied whenever data is updated, and hence unknown to attackers. In the tree verification, the anti-replay attack information is imparted page-by-page and matched in hierarchical structure with the page table, and the amount of data necessary for the verification is compressed, thereby suppressing verification overhead. If the anti-replay attack information is imparted to simple verification executed via the cache memory 45, 507a, 507b, 508 and/or 528, the verification overhead may become greater than that in the case where all data is subjected to tree verification, depending upon the storage place and/or management method of the anti-replay attack information. In view of this, in the present embodiment, simple verification in cooperation with the tree verification is executed only on the RO data via the cache memory 45, 507a, 507b, 508 and/or 528, thereby realizing integrity protection of the data in the external memory 7. Namely, the verifier tree 10 associated with all data has a structure that matches the page table tree 9, the RW data is verified by the tree verification via the internal memory 8, and the RO data is verified using a verifier dedicated to the RO data, via the cache memory 45, 507a, 507b, 508 and/or 528.

For both the RO data and RW data, verifiers are generated using the anti-replay attack information imparted page-by-page protected by the tree verification. Verifiers for the RW data exists page-by-page, and verifiers for the RO data exist cache-line-by-cache-line. Namely, the target verified cache-line-by-cache-line is RO data. In other words, for certain data, verification is executed cache-line-by-cache-line during RO access, and verification and data update are executed page-by-page during RW access.

In the present embodiment, since a unit of access to RO data is small, the data use efficiency for each of verification can be enhanced. The smaller the unit of access, the lower the probability of useless reading. Accordingly, in the present embodiment, the data use efficiency per one access can be enhanced. In integrity verification processing, the occurrence of verification overhead can be suppressed by limiting the number of data verification.

Third Embodiment

A present embodiment is a modification of the above-described second embodiment, wherein verification management is performed by the secure VMM 516.

In the second embodiment, different types of verification are executed between different access rights of data, thereby enhancing the use efficiency of the internal memory 8 and realizing high-speed falsification verification of the external memory 7. Further, in the second embodiment, the MMU 506 executes the verification management by controlling the hardware, and reduces the number of times of transfer to the secure VMM 516 due to a page fault, thereby reducing verification overhead. However, an MMU directed to a general installation device does not incorporate such a control mechanism. Accordingly, to realize the second embodiment, it is necessary to customize the MMU. Since the MMU is closely related to memory management, there is a case where customization of the MMU requires higher cost than addition of the cache verification unit 514.

In consideration of this, the present embodiment is directed to a structure in which verification management is executed by software control without changing the MMU. In the present embodiment, a description will be given of a case where verification management is performed by software control by, for example, the secure VMM 516. However, similar verification management may be realized by another type of software.

Figure 21:
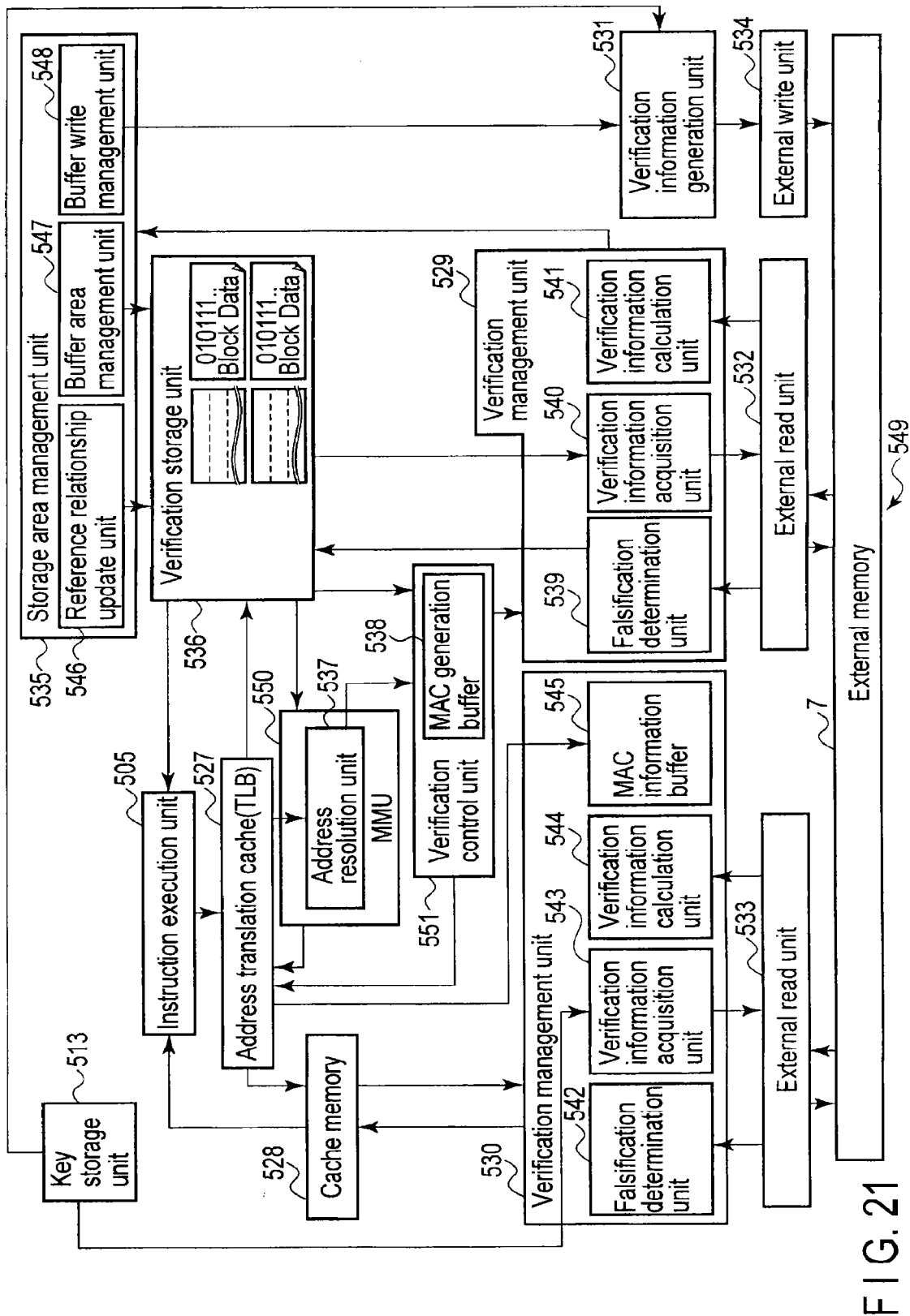
FIG. 21 is a block diagram showing an example of a structure of an information processing device according to a third embodiment.

FIG. 21 is a block diagram showing an example of a structure of an information processing device according to the present embodiment.

As shown, an information processing device 549 has substantially the same configuration as the information processing device 500 of FIG. 14, except that the former comprises a typical MMU 550 and a verification control unit 551.

In the present embodiment, verification control is performed not by the MMU 550, but by the verification control unit 551 corresponding to the secure VMM 516. In the present embodiment, the verification control unit 551 includes a MAC generation buffer 538.

The secure VMM 516 manages verification states in order to avoid duplicate verification. To this end, during address resolution, the MMU 550 generates a page fault whenever it accesses an invalid table entry, regardless of the access right of the invalid table entry.

As a result, control is switched from the MMU 550 to the secure VMM 516, and the secure VMM 516 confirms the access right of the table entry.

If the access right of the table entry is RW access, the secure VMM 516 executes tree verification, and generates MAC comparison verification information for RW data, after the tree verification, thereby storing the generated MAC comparison verification information in the MAC generation buffer 538 and returning control to the MMU 550.

In contrast, if the access right of the table entry is RO access, the secure VMM 516 generates MAC comparison verification information for RO data, thereby storing the generated MAC comparison verification information in the MAC generation buffer 538 and returning control to the MMU 550.

By operating the secure VMM 516 as the above, verification similar to that of the second embodiment can be realized by the secure VMM 516.

A description will be given of address resolution processing of RO data and RW data according to the present embodiment, using the address resolution processing shown in FIG. 12. The assumption of the address resolution processing of the present embodiment, which will now be described, is similar to that of the second embodiment. Various types of processing that will not be described in the present embodiment are substantially the same as those of the second embodiment. The address resolution processing may occur during data reference processing.

The MMU 550 starts address resolution processing, and executes address resolution using a page walk in step S101.

In step S102, the MMU 550 checks a table entry.

If the table entry is valid, the processing proceeds to step S109.

In contrast, if the table entry is invalid, the MMU 550 generates a page fault, whereby control is switched from the MMU 550 to the secure VMM 516.

In step S103, the secure VMM 516 checks the access right of the table entry.

If the table entry designates RW data, the secure VMM 516 executes tree verification processing in step S104.

After finishing the tree verification processing, the secure VMM 516 validates the table entry as the verification target, and executes, in step S105, post-tree-verification setting processing to set verification unnecessity designating information as verification necessity/unnecessity designating information included in the MAC comparison verification information. After finishing the post-tree-verification setting processing, the secure VMM 516 returns control to the MMU 550.

If the table entry designates RO data, the secure VMM 516 checks validity/invalidity of a cache-line MAC value in step S106.

If the cache-line MAC value is valid, the processing proceeds to step S108.

In contrast, if the cache-line MAC value is invalid, the secure VMM 516 and the secure DMA controller 511 execute processing of generating a cache-line MAC value in step S107.

In step S108, the secure VMM 516 executes MAC comparison verification setting processing. In the MAC comparison verification setting processing, the secure VMM 516 validates the table entry, and sets verification necessity designating information as the verification necessity/unnecessity designating information included in the MAC comparison verification information. After the MAC comparison verification setting processing, the secure VMM 516 returns control to the MMU 550.

In step S109, the MMU 550 checks whether addresses up to a data block have been solved, and repeats the page walk until the addresses have been solved.

After finishing the address resolution, the MMU 550 resumes, in step S110, data reference processing to finish the address resolution processing.

A description will now be given of the relationship between the configuration of the information processing device 549 shown in FIG. 21 and the address resolution processing shown in FIG. 12.

The address resolution unit 537 of the MMU 550 starts address resolution processing upon receipt of an address resolution request from the address translation cache 527.

In step S101, the MMU 550 executes a page walk.

In step S102, the MMU 550 checks a corresponding table entry stored in the verification storage unit 536.

If the table entry is valid, the processing proceeds to steps S109.

In contrast, if the table entry is invalid, the MMU 550 generates a page fault, and informs the verification control unit 551 of this. Upon receipt of it, the verification control unit 551 checks the access right of the table entry in step S103.

If the access right of the table entry designates RW access, the verification control unit 551 informs the verification management unit 529 of the result, and the verification management unit 529 executes, in step S104, tree verification processing and data reading in association with a page block to be referred to by the table entry. After finishing the verification processing, the verification management unit 529 informs the reference relationship update unit 549 of it, and the reference relationship update unit 549 validates the invalid table entry.

Subsequently, the verification management unit 529 determines that the reading has been completed, and returns control to the verification control unit 551.

After being informed of the completion of the reading, the verification control unit 551 sets, in step S105, verification unnecessity designating information as the verification necessity/unnecessity designating information of the MAC comparison verification information in the MAC generation buffer 538, in the post-tree-verification setting processing.

After executing post-tree-verification setting processing, the verification control unit 551 returns control to the MMU 550.

If the access right of the table entry designates RO access, the verification control unit 551 checks in step S106 whether a cache-line MAC value is valid.

If the cache-line MAC value is valid, the processing proceeds to step S108.

In contrast, if the cache-line MAC value is invalid, the verification control unit 551 executes cache-line MAC value generation processing in step S107.

In step S108, the verification control unit 551 validates the table entry, sets anti-replay attack information acquired from the verification storage unit 536 as the MAC comparison verification information in the MAC generation buffer 538, and executes MAC comparison verification setting processing to set verification necessity designating information as the verification necessity/unnecessity designating information. After the MAC comparison verification setting processing, the verification control unit 551 returns control to the MMU 550.

In step S109, the MMU 550 checks whether addresses up to a data block have been solved, and repeats the page walk until the address resolution processing is completed.

After the address resolution, the MMU 550 resumes data reference processing in step S110, thereby terminating address resolution processing.

In the above-described third embodiment, without customizing the MMU 550, the same advantage as in the second embodiment can be obtained at low cost.

Fourth Embodiment

In the above-described second and third embodiments, different types of verification processing are managed by hardware or software, based on the access right.

A present embodiment is a modification of the second and third embodiments, and comprises a MAC tree structure including a page-table type data structure for managing cache-line MAC values.

FIG. 22 is a data structure diagram showing an example of a secure verifier tree according to the present embodiment.

The secure verifier tree has a page-table type MAC tree structure. The page-table type MAC tree structure is a data structure obtained by adding, to the MAC tree structure, a page-table type data structure for managing cache-line MAC values.

In the present embodiment, one page is set to 4 kilobytes, one MAC value is set to 8 bytes, and one cache line is set to 32 bytes. In the present embodiment, it is assumed that one cache-line MAC block is allocated to each data block. However, one cache-line MAC block may be allocated to a plurality of data blocks. Further, a block associated with a certain page table may contain both RO data and RW data.

In the page-table type MAC tree structure shown in FIG. 22, the cache-line MAC block is allocated associated with the reference source table block of a data block corresponding thereto.

Each cache-line MAC value in the page-table type MAC tree structure is generated based on cache-line data, a cache-line address thereof, the MAC value (anti-replay attack information) of a page block including the cache-line data. The MAC value of the page block including the cache-line data is anti-replay attack information in the secure verification tree 122, and has its integrity guaranteed by tree verification.

For instance, the MAC value of cache-line data CL201-1-0-511-1 included in data block B201-1-0-511 is generated based on cache-line data CL201-1-0-511-1, address addr (CL201-1-0-511-1) thereof, and MAC value M201-1-0-511 of data block B201-1-0-511 including cache-line data CL201-1-0-511-1. MAC value M201-1-0-511 is anti-replay attack information in the secure verification tree 122, and is included in MAC block T202-1-0 belonging to reference source table block T201-1-0 of data block B201-1-0-511. Cache-line MAC value CM201-1-0-511-1 to be compared with the generated MAC value exists in cache-line MAC block T203-1-0 belonging to reference source table block T201-1-0 of data block B201-1-0-511 including cache-line data CL201-1-0-511-1.

In the page-table type MAC tree structure, it is not necessary to use any special address resolution processing for a cache-line MAC value. In the page-table type MAC tree structure, each cache-line MAC value is managed in association with the reference source page block of a corresponding cache line. Therefore, each cache-line MAC value is acquired based on an offset of the reference source page table.

Using the page-table type MAC tree structure of the present embodiment, a description will be given of an operation example performed when a data reference request has been issued for cache-line data CL201-1-0-511-1 included in data block B201-1-0-511. Assume here that the MMU 506 executes verification management for each access right.

Although in the present embodiment, tree verification for RW data is characterized in that a cache-line MAC block is associated with a page table of level 3, the present embodiment is similar in basic operation to the second and third embodiments. More specifically, when tree verification for table block T201-1-0 has occurred, a MAC value is generated based on table block T201-1-0, address Eaddr(T201-1-0) thereof in the external memory 7, and MAC block T202-1-0 associated therewith. The generated MAC value is compared for verification with a MAC value M201-1-0 included in a verification block higher by one level. In this case, cache-line MAC block T203-1-0 belonging to page table T201-1-0 is not a tree verification target. The integrity of the address of cache-line MAC block T203-1-0 is guaranteed by an already-verified page table.

In verification of RO data, the MAC value of data block B201-1-0-511 including cache-line data CL201-1-0-511-1 is set as anti-replay attack information, and MAC comparison verification information including the anti-replay attack information is cached in the address translation cache 509 and/or 510. The other processing is similar to that in the second embodiment.

The above-described present embodiment, which uses a secure verifier tree of the page-table type MAC tree structure, can provide the same advantage as that obtained in each of the aforementioned embodiments.

Fifth Embodiment

A present embodiment is a modification of the second and third embodiments, and comprises a MAC+counter structure including an independent type data structure for managing cache-line MAC values.

Figure 23:
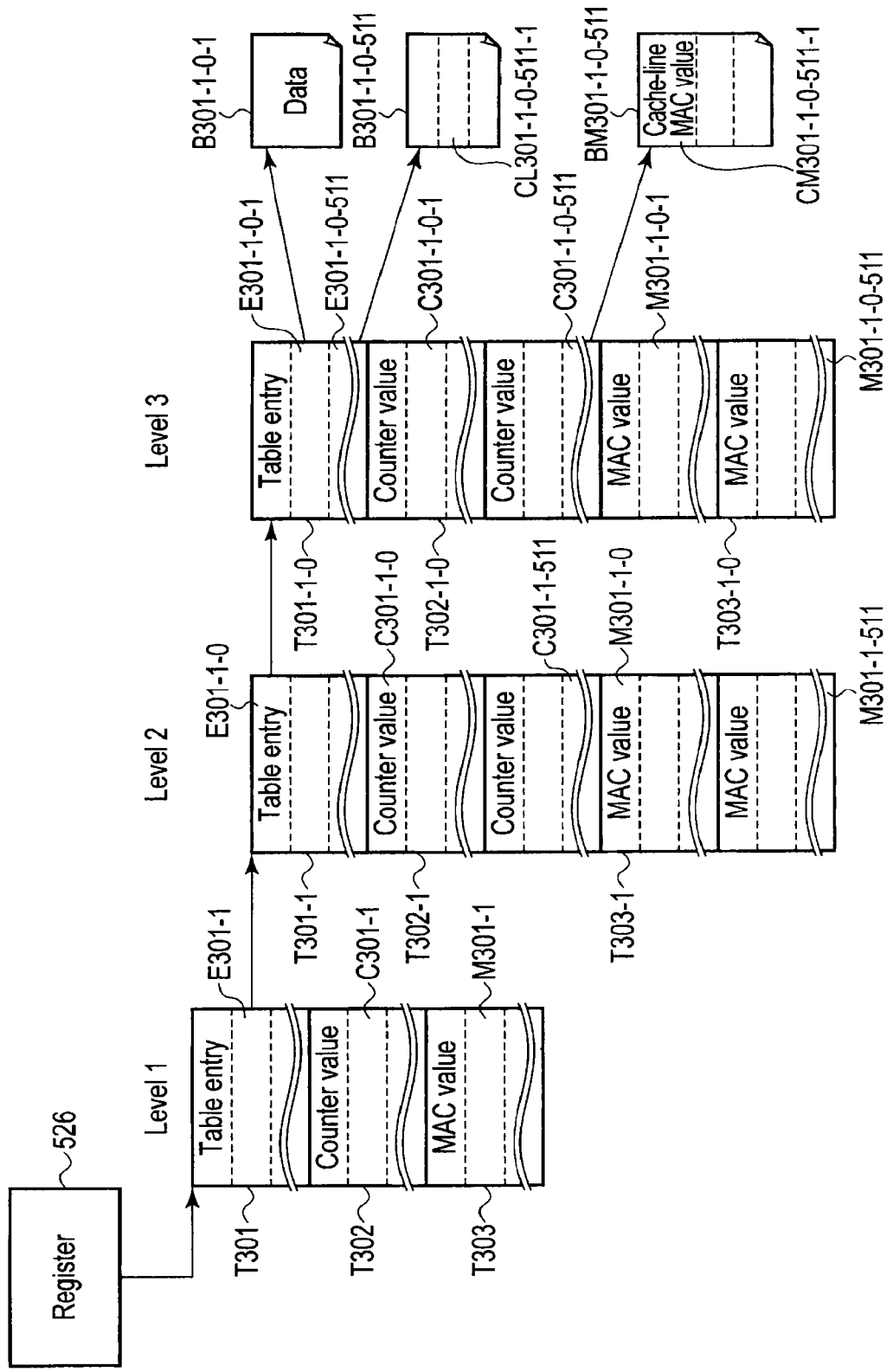
FIG. 23 is a data structure diagram showing an example of a secure verifier tree according to a fifth embodiment.

FIG. 23 is a data structure diagram showing an example of a secure verifier tree according to the present embodiment.

Figure 24:
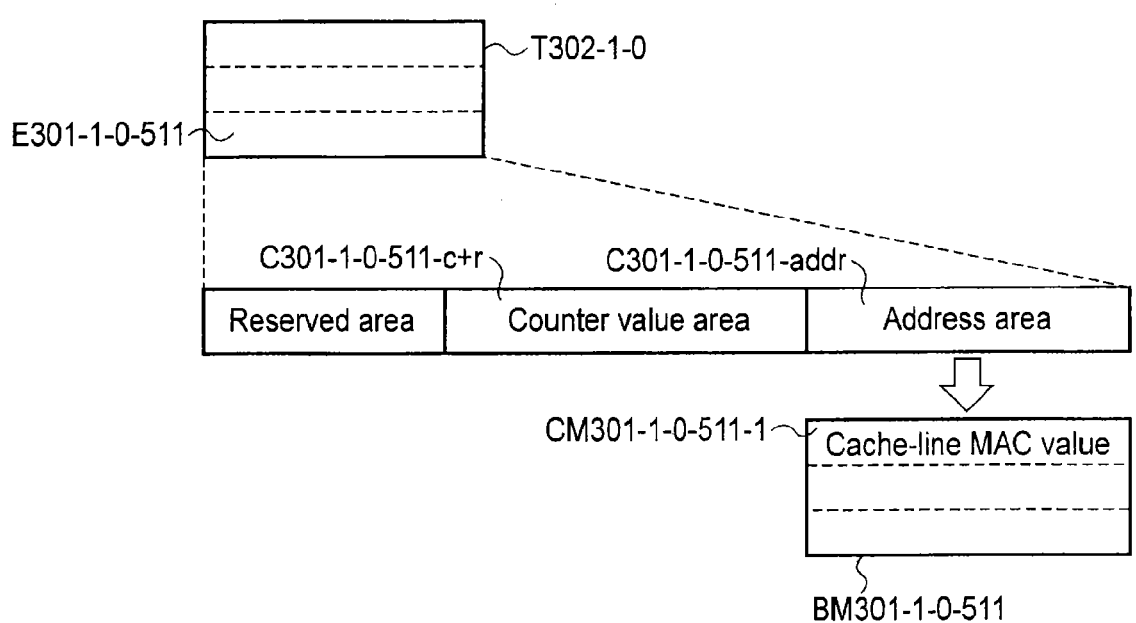
FIG. 24 is a block diagram showing an example of a relationship between a cache-line MAC block and a counter block associated with a upper page table of the cache-line MAC block, according to the fifth embodiment.

FIG. 24 is a block diagram showing an example of a relationship between a cache-line MAC block and a counter block associated with a upper page table of the cache-line MAC block, according to the present embodiment.

The secure verifier tree of the present embodiment has a data structure obtained by adding, to the MAC+counter structure, an independent type data structure for managing cache-line MAC values.

In the present embodiment, one page is set to 4 kilobytes, one counter value is set to 8 bytes, one MAC value is set to 8 bytes, and one cache line is set to 32 bytes. In the present embodiment, it is assumed that one cache-line MAC block is allocated to each data block. However, one cache-line MAC block may be allocated to a plurality of data blocks. Further, a block associated with a certain page table may contain both RO data and RW data.

Each cache-line MAC block and a corresponding data block are arranged in the same hierarchical layer. The address of each cache-line MAC block is stored in the data field of a counter block associated with a corresponding reference source table block.

The entries of a counter block corresponding to a certain page block include a preparatory area, a counter value area, and a cache-line MAC value address area.

In the present embodiment, entry E301-1-0-511 of counter block T302-1-0 includes counter value C301-1-0-511-ctr and cache-line MAC value address C301-1-0-511-addr. Entry E301-1-0-511 also includes an address area storing cache-line MAC value address C301-1-0-511-addr. Accordingly, the counter value area storing counter value C301-1-0-511-ctr is short. However, assuming that a counter size is, for example, 128 bits, even if the counter area in entry E301-1-0-511 is of 64 bits, the information processing device 500 (549) can update each page $2^{64-1}$ times. In the case of the information processing device 500 (549) in which the internal memory 8 is a nonvolatile memory and hence a counter value is not easily cleared by reactivation, no problems will occur for general use, if an update count of $2^{64-1}$ is guaranteed. Further, when the counter value overflows, it is sufficient if the counter value is reset to reconstruct the secure verifier tree.

Each cache-line MAC value in the independent-type MAC+counter structure of the present embodiment is generated based on data of a cache line, the address of the cache line, and the counter value (anti-replay attack information) of a data block including the cache line data. The counter value of a page block including cache-line data is anti-replay attack information in the secure verifier tree, and the integrity of the counter value is guaranteed by tree verification.

More specifically, a cache-line MAC value including, for example, data CL301-1-0-511-1 of data block B301-1-0-511 is generated based on cache line data CL301-1-0-511-1, address addr(CL301-1-0-511-1) thereof, and counter value C301-1-0-511-ctr of data block B301-1-0-511 including cache-line data CL301-1-0-511-1. Counter value C301-1-0-511-ctr is anti-replay attack information in the secure verification tree, and is included in counter block T302-1-0 associated with the reference source table block T301-1-0 of data block B301-1-0-511. Cache-line MAC value CM301-1-0-511-1 to be compared with the generate MAC value exists in cache-line MAC block BM301-1-0-511 in the external memory 7.

In address resolution processing of a cache-line MAC value in the present embodiment, it is necessary to manage the address of the cache-line MAC value, in order to access the cache-line MAC value. Address management of cache-line MAC values can be realized by various methods. In the present embodiment, the data area of a counter block of the MAC+counter structure is used.

The address of a cache-line MAC block corresponding to a certain data block is stored in the data area of a counter block corresponding to the reference source table entry of the data block. For instance, the address of cache-line MAC value CM301-1-0-511-1 of cache-line data CL301-1-0-511-1 is C301-1-0-511-addr included in counter value C301-1-0-511. Address C301-1-0-511-addr can be obtained along with counter value C301-1-0-511-ctr during address resolution processing of cache-line data CL301-1-0-511-1. The cache verification unit 514 can acquire, as MAC comparison verification information, address C301-1-0-511-addr of the cache-line MAC value and counter value C301-1-0-511-ctr.

Using the independent-type MAC+counter structure, a description will be given of an operation example performed when a data reference request has been issued to refer to data CL301-1-0-511-1 that is part of data block B301-1-0-511 and included in a cache line. In the present embodiment, the MMU 506 executes verification management for each access right.

Even if the data area of a counter block is changed and a data block and a cache-line MAC block are arranged in the same hierarchical layer as in the present embodiment, the same tree verification as in the second embodiment is executed on RW data. Namely, when tree verification of table block T301-1-0 has occurred, a MAC value is generated based on table block T301-1-0, address Eaddr(T301-1-0) thereof in the external memory 7, and a counter block T302-1-0 associated therewith, and is compared with MAC value M301-1-0 included in a verification block higher by one level. At this time, since the address of the cache-line MAC block is also verified, the address of the cache-line MAC block can be prevented from being forged.

Verification of RO data using the independent-type MAC+counter structure is performed by setting the counter value of a data block including a cache-line data as anti-replay attack information, and cashing, in the address translation cache 509 or 510, MAC comparison verification information that includes the anti-replay attack information and the address of a cache-line MAC value. The other processing is the same as that in the second embodiment.

The above-described present embodiment, which uses a secure verifier tree of the independent-type MAC+counter structure, can provide the same advantage as that obtained in each of the aforementioned embodiments.

Sixth Embodiment

A present embodiment is a modification of the fourth and fifth embodiments, and comprises a MAC tree structure including an independent type data structure for managing cache-line MAC values.

Figure 25:
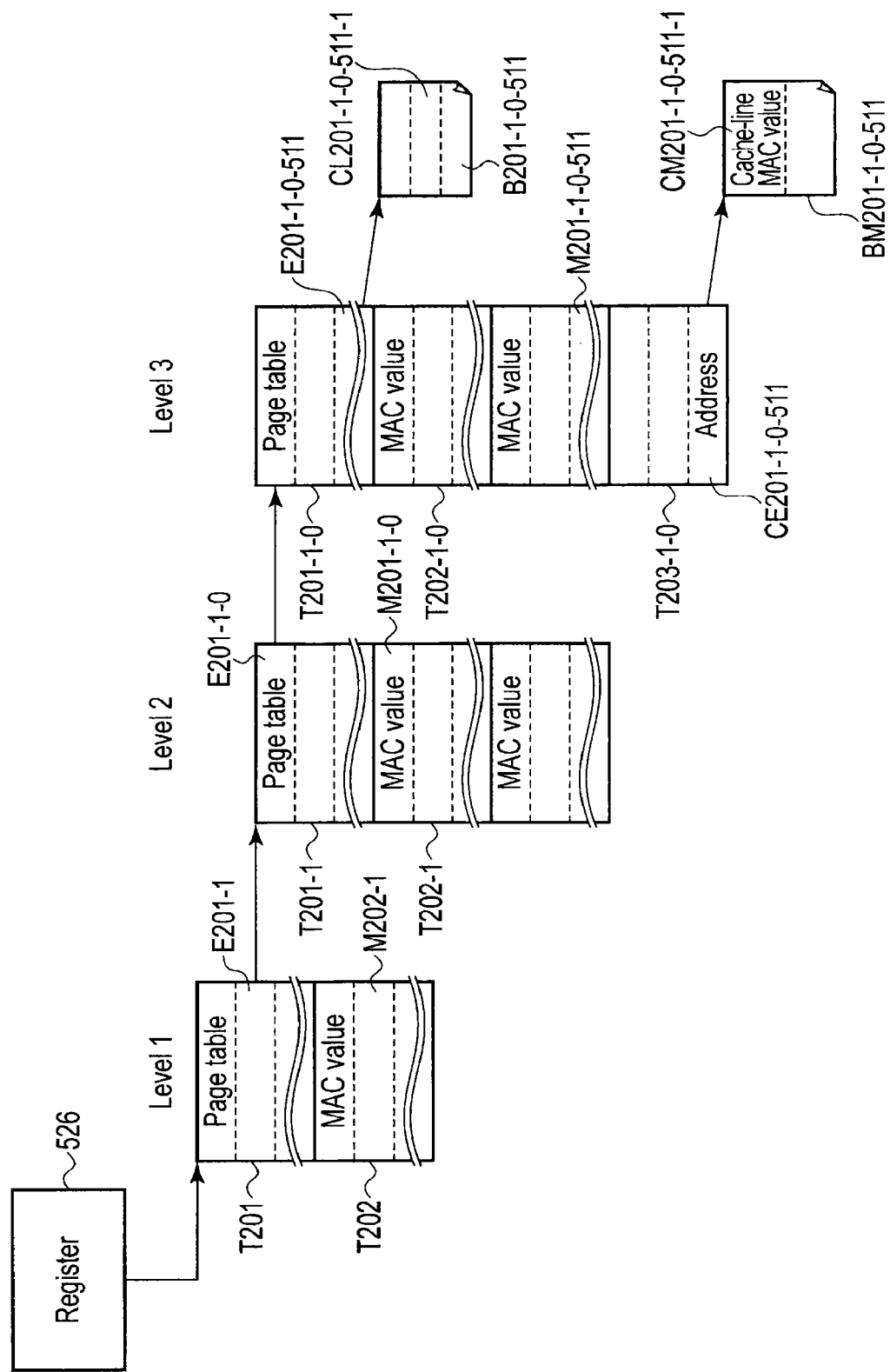
FIG. 25 is a data structure diagram showing an example of a secure verifier tree according to a sixth embodiment.

FIG. 25 is a data structure diagram showing an example of a secure verifier tree according to the present embodiment.

The secure verifier tree of the present embodiment includes a MAC tree structure, and an independent type data structure for managing cache-line MAC values.

In the present embodiment, one page is set to 4 kilobytes, one MAC value is set to 8 bytes, and one cache line is set to 32 bytes. In the present embodiment, it is assumed that one cache-line MAC block is allocated to each data block. However, one cache-line MAC block may be allocated to a plurality of data blocks. Further, a block associated with a certain page table may contain both RO data and RW data.

Each cache-line MAC block and a corresponding data block are arranged in the same hierarchical layer. An address of each cache-line MAC block is stored in a page table (hereinafter referred to as a cache-line MAC table block) for managing cache-line MAC addresses.

Each cache-line MAC table block is associated with a corresponding table block that refers to a data block. Each cache-line MAC table block manages the address of the cache-line MAC value of a data block as the reference destination of a table block.

The data block as the reference destination of a table block is corresponded to a cache-line MAC block as the reference destination of a cache-line MAC table block associated with the table block.

Each cache-line MAC value in the independent-type MAC tree structure is generated based on data of a corresponding cache line, the address of the cache line, the MAC value (anti-replay attack information) of a data block including the cache-line data. The MAC value of a data block including the cache-line data is anti-replay attack information in the secure verification tree, and the integrity of the MAC value is guaranteed by tree verification.

More specifically, the MAC value of cache-line data CL201-1-0-511-1 as part of data block B201-1-0-511 is generated based on cache-line data CL201-1-0-511-1, address addr(CL201-1-0-511-1) of this data, MAC value M201-1-0-511 of data block B201-1-0-511 including cache-line data CL201-1-0-511-1. MAC value M201-1-0-511 is anti-replay attack information in the secure verification tree, and is included in MAC block T202-1-0 associated with reference source table block T201-1-0 of data block B201-1-0-511. Cache-line MAC value CM201-1-0-511-1 to be compared with the generated MAC value exists in cache-line MAC block BM201-1-0-511 designated by table entry CE201-1-0-511 of cache-line MAC table block T203-1-0.

Cache-line MAC value CM201-1-0-511-1 is compared with the generated MAC value. Cache-line data CL201-1-0-511-1 is included in data block B201-1-0-511. Reference source table block T201-1-0 refers to data block B201-1-0-511. Cache-line MAC table block T203-1-0 belongs to reference source table block T201-1-0. Entry CE201-1-0-511 in cache-line MAC table block T203-1-0 includes an address designating cache-line MAC block BM201-1-0-511.

In the present embodiment, an address management page table is used for address resolution of a cache-line MAC value. An address of a cache-line MAC block corresponding to a certain data block is stored in a cache-line MAC page table associated with the reference source page table of the data block.

For instance, the address of cache-line MAC value CM201-1-0-511-1 of cache-line data CL201-1-0-511-1 is stored in entry CE201-1-0-511 of cache-line MAC table block T203-1-0. Cache-line MAC table block T203-1-0 belongs to reference source table block T201-1-0 of data block B201-1-0-511 including cache-line data CL201-1-0-511-1. Cache-line MAC table block T203-1-0 is read by tree verification into the internal memory 8, along with table block T201-1-0 and MAC block T202-1-0. Accordingly, the address of cache-line MAC block BM201-1-0-511 can be acquired during address resolution processing of cache-line data CL301-1-0-511-1, along with MAC value M201-1-0-511.

Using the independent-type MAC tree structure according to the present embodiment, a description will be given of an operation example performed when a data reference request has been issued for cache-line data CL201-1-0-511-1 included in data block B201-1-0-511. Assume here that the MMU 506 executes verification management for each access right.

In tree verification of RW data, since a cache-line MAC page table belongs to a page table of level 3, MAC-value calculation and verification for this cache-line MAC page table are executed. More specifically, when tree verification of table block T201-1-0 has occurred, a MAC value is generated based on table block T201-1-0, address Eaddr (T201-1-0) thereof in the external memory 7, MAC block T202-1-0 belonging thereto, cache-line MAC table block T203-1-0 belonging thereto. The generated MAC value is compared with MAC value M201-1-0 included in a verification block higher by one level. Since the address of cache-line MAC block BM201-1-0-511 is verified by thus generating the MAC value, the address of cache-line MAC block BM201-1-0-511 can be prevented from being forged by an attacker. The other operations are basically similar to those in the second embodiment.

In verification of RO data using the independent-type MAC tree structure, MAC value M201-1-0-511 of data block B201-1-0-511 including target cache-line data CL201-1-0-511-1 is used as anti-replay attack information, and this anti-replay attack information is set as MAC comparison verification information and cached in the address translation buffer 509 or 510. The other processing is similar to that of the second embodiment.

The present embodiment, which uses a secure verifier tree of the independent-type MAC tree structure, can provide the same advantage as that of each embodiment described above.

Seventh Embodiment

A present embodiment is a modification of the above-described third to fifth embodiments, and includes a MAC+counter structure including a page-table-type data structure for managing cache-line MAC values.

The present embodiment employs a data structure in which each table block of the MAC+counter structure is associated with a corresponding page-table-type cache memory MAC block. This structure can also provide the same advantage as that of each embodiment described above.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory management device comprising:
a processor, the processor configured to:
execute reading and writing for a first storage, the first storage storing a table tree including a parent table and a child table, and a verifier tree including a parent verifier associated with the parent table and a child verifier associated with the child table, the parent verifier being used for verifying the child table and child verifier;
translate a first address into a second address, based on a secure table tree which is a part of the table tree and is stored in a secure second storage, the secure second storage storing a secure verifier tree which is a part of the verifier tree;

calculate first verification information, when a first child table included in the table tree and needed for translating the first address into the second address is not included in the secure table tree, based on the first child table in the table tree and a first child verifier included in the verifier tree and associated with the first child table;

execute first verification, based on the first verification information and a first parent verifier included in the secure verifier tree and associated with a first parent table referring to the first child table;

incorporate the first child table and the first child verifier into the secure table tree and the secure verifier tree, respectively, when a result of the first verification designates validity;

determine whether data as a reference target is first data having a read-only attribute or second data having a read/write attribute;

calculate second verification information, based on the first data read from the first storage and a secure value which varies according as the first data is updated, if the data is the first data; and execute second verification, based on a verifier stored in at least one of the first and second storages and corresponding to the first data, and the second verification information, and store the first data in a third storage when a result of the second verification designates validity.

2. The memory management device according to claim 1, wherein
the processor calculates the verifier corresponding to the first data, based on the first data and the secure value, when the processor determines that the verifier corresponding to the first data is in an invalid state, and stores the verifier corresponding to the first data in at least one of the first and second storages; and
the processor updates, to the read-only attribute, an entry in a table included in the secure table tree, the entry referring to the first data.

3. The memory management device according to claim 1, wherein
the processor stores, in a secure fourth storage, comparison verification information including verification necessity/unnecessity information and the secure value, the verification necessity/unnecessity information designating verification necessity if the data is determined to be the first data, and designating verification unnecessity if the data is determined to be the second data; and
the processor calculates the second verification information, based on the first data and the comparison verification information.

4. The memory management device according to claim 1, wherein the verifier is associated with a table referring to the first data.

5. The memory management device according to claim 1, wherein an address designating the verifier is associated with a table referring to the first data.

6. A non-transitory computer readable recording medium storing a program which is executed by a computer, the program configured to:
execute reading and writing for a first storage, the first storage storing a table tree including a parent table and a child table, and a verifier tree including a parent verifier associated with the parent table and a child verifier associated with the child table, the parent verifier being used for verifying the child table and child verifier;

translate a first address into a second address, based on a secure table tree which is a part of the table tree and is stored in a secure second storage, the secure second storage storing a secure verifier tree which is a part of the verifier tree;

calculate first verification information, when a first child table included in the table tree and needed for translating the first address into the second address is not included in the secure table tree, based on the first child table in the table tree and a first child verifier included in the verifier tree and associated with the first child table;

execute first verification, based on the first verification information and a first parent verifier included in the secure verifier tree and associated with a first parent table referring to the first child table;

incorporate the first child table and the first child verifier into the secure table tree and the secure verifier tree, respectively, when a result of the first verification designates validity;

determine whether data as a reference target is first data having a read-only attribute or second data having a read/write attribute;

calculate second verification information, based on the first data read from the first storage and a secure value which varies according as the first data is updated, if the data is the first data; and execute second verification, based on a verifier stored in at least one of the first and second storages and corresponding to the first data, and the second verification information, and store the first data in a third storage when a result of the second verification designates validity.

7. A memory management device comprising:
a nonvolatile first storage;
a volatile second storage; and
a processor, wherein
the nonvolatile first storage stores data, a table tree designating reference relationship from a first address to the data, and a verifier tree including verifiers corresponding to respective data unit and respective table unit in the table tree, and having a same graph structure as the table tree,
the processor reads, from the first storage, a first table needed for address translation for the data, and a first verifier associated with the first table,
the processor executes first verification for the first table and the first verifier read from the first storage,
the volatile second storage stores the first table and the first verifier when a result of the first verification designates validity,
the processor translates the first address into a second address designating the data, based on a verified table tree stored in the second storage, when a reference request of the data is received,
the processor stores the data without storing the verifier,
the processor executes second verification based on first verification information in an already verified verifier tree stored in the second storage when the data has a read/write attribute, and stores the data in the second storage when a result of the second verification designates validity, and
the processor does not execute the second verification based on the already verified verifier tree stored in the second storage, when the data has a read-only attribute, but executes third verification based on second verification information and a secure value, and stores the data in the third storage when a result of the third verification designates validity, the second verification information being calculated based on the data and the secure value and being stored in the first storage, the secure value varying according as the data is updated.

* * * * *